(12) United States Patent
Ghosh et al.

(10) Patent No.: US 12,544,453 B2
(45) Date of Patent: Feb. 10, 2026

(54) AMPHOTERICIN B CONJUGATED STABILIZED GOLD NANOPARTICLES AND USES THEREOF

(71) Applicant: Max-Planck-Gesellschaft zur Förderung der Wissenschaften e.V., Munich (DE)

(72) Inventors: Chandradhish Ghosh, Berlin (DE); Peter Seeberger, Kleinmachnow (DE)

(73) Assignee: Max-Planck-Gesellschaft zur Forderung der Wissenschaften e.V., Munich (DE)

( * ) Notice: Subject to any disclaimer, the term of this patent is extended or adjusted under 35 U.S.C. 154(b) by 769 days.

(21) Appl. No.: 17/784,155

(22) PCT Filed: Dec. 12, 2020

(86) PCT No.: PCT/EP2020/085870
§ 371 (c)(1),
(2) Date: Jun. 10, 2022

(87) PCT Pub. No.: WO2021/116475
PCT Pub. Date: Jun. 17, 2021

(65) Prior Publication Data
US 2023/0061519 A1 Mar. 2, 2023

(30) Foreign Application Priority Data

Dec. 12, 2019 (EP) ..................................... 19215765
Aug. 5, 2020 (EP) ..................................... 20189716

(51) Int. Cl.
*A61K 47/69* (2017.01)
*A61K 31/4196* (2006.01)
(Continued)

(52) U.S. Cl.
CPC ...... *A61K 47/6929* (2017.08); *A61K 31/4196* (2013.01); *A61K 31/513* (2013.01); *A61K 31/7036* (2013.01); *A61K 47/549* (2017.08)

(58) Field of Classification Search
CPC ............ A61K 47/6929; A61K 31/4196; A61K 31/513; A61K 31/7036; A61K 47/549;
(Continued)

(56) References Cited

FOREIGN PATENT DOCUMENTS

BR 102016029885 A2 * 7/2018

OTHER PUBLICATIONS

Varela-Aramburu et al, Supporting Information for Straightforward and robust synthesis of monodisperse surface-functionalized gold nanoclusters, 2016, pp. S1-S17 (Year: 2016).*
(Continued)

*Primary Examiner* — Frederick F Krass
*Assistant Examiner* — Joshua A Atkinson
(74) *Attorney, Agent, or Firm* — Amin, Turocy & Watson, LLP

(57) ABSTRACT

Conjugates of amphotericin B and gold nanoparticles stabilized with thiohexoses or thiopentoses, and a method to produce said nanoparticles are described. As the conjugates of amphotericin B to the stabilized gold nanoparticles show several advantages over amphotericin B alone, pharmaceutical compositions comprising said nanoparticles, and to their use for treat fungal and leishmanial infection are described. These amphotericin B stabilized gold nanoparticles are dispersible in water and are not toxic for mammalian cells differently from free amphotericin B and other currently used amphotericin B preparations. Importantly, the conjugates of amphotericin B and stabilized gold nanoparticles are more efficacious in treating all forms of Cryptococcal infections (planktonic, intracellular and biofilms) than amphotericin B.

15 Claims, 18 Drawing Sheets

(51) Int. Cl.
*A61K 31/513* (2006.01)
*A61K 31/7036* (2006.01)
*A61K 47/54* (2017.01)

(58) Field of Classification Search
CPC .... A61K 31/7048; A61K 45/06; A61K 47/61; A61K 47/6923; Y02A 50/30; A61P 31/10; A61P 33/02
See application file for complete search history.

(56) References Cited

OTHER PUBLICATIONS

BR 102016029885 A2 English translation (Year: 2018).*
International Search Report and Written Opinion for International Patent Application No. PCT/EP2020/085870 dated Mar. 5, 2021, 14 pages.
Prakash Kumar et al, "Synthesis, characterization, and mechanistic studies of a gold nanoparticle-amphotericin B covalent conjugate with enhanced antileishmanial efficacy and reduced cytotoxicity11", International Journal of Nanomedicine, vol. 14, Aug. 1, 2019 (Aug. 1, 2019) pp. 6073-6101.
Silvia Varela-Aramburu et al, "Straightforward and robust synthesis of monodisperse surface-functionalized gold nanoclusters", Beilstein Journal of Nanotechnology, vol. 7, Aug. 17, 2016 (Aug. 17, 2016), pp. 1278-1283.
Silvia Varela-Aramburu et al, "Carbohydrate-based Nanomaterials for Imaging and Drug Delivery", Inaugural-Dissertation to obtain the academic degree Doctor rerum naturalium (Dr. rer. nat.), Mar. 1, 2018 (Mar. 1, 2018), KP055703507, Retrieved from the Internet: URL:https://refubium.fu-berlin.de/bitstream/handle/fub188/22666/Dissertation -Varela- Aramburu.pdf?sequence=3 [retrieved on Jun. 10, 2020].

* cited by examiner

A)

B)

C)

A)

B)

Figure 4 *(continue)*
C)
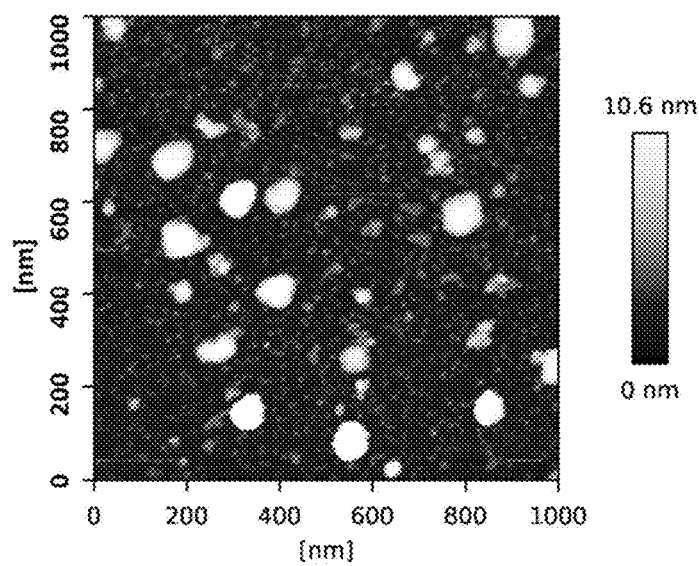
D)
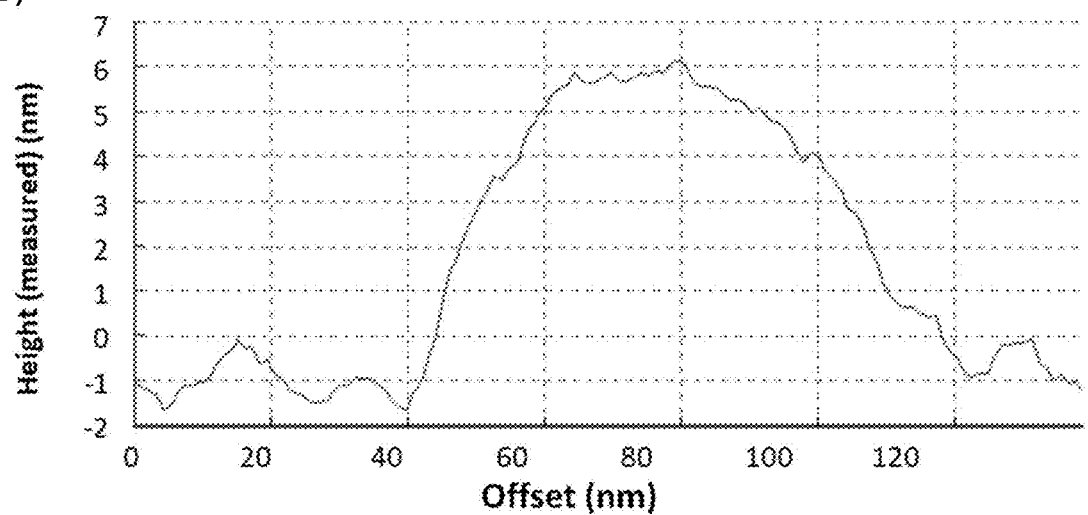
E)
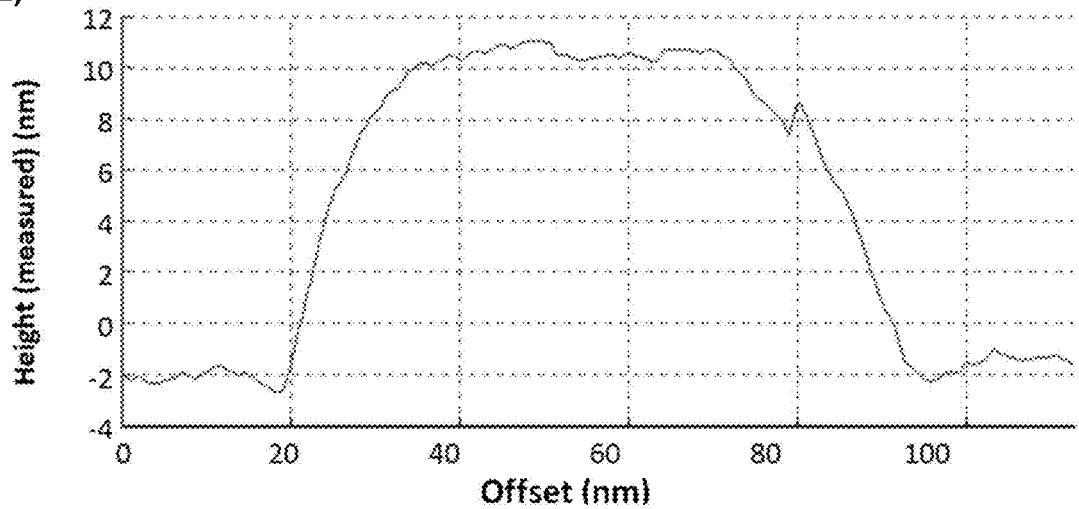

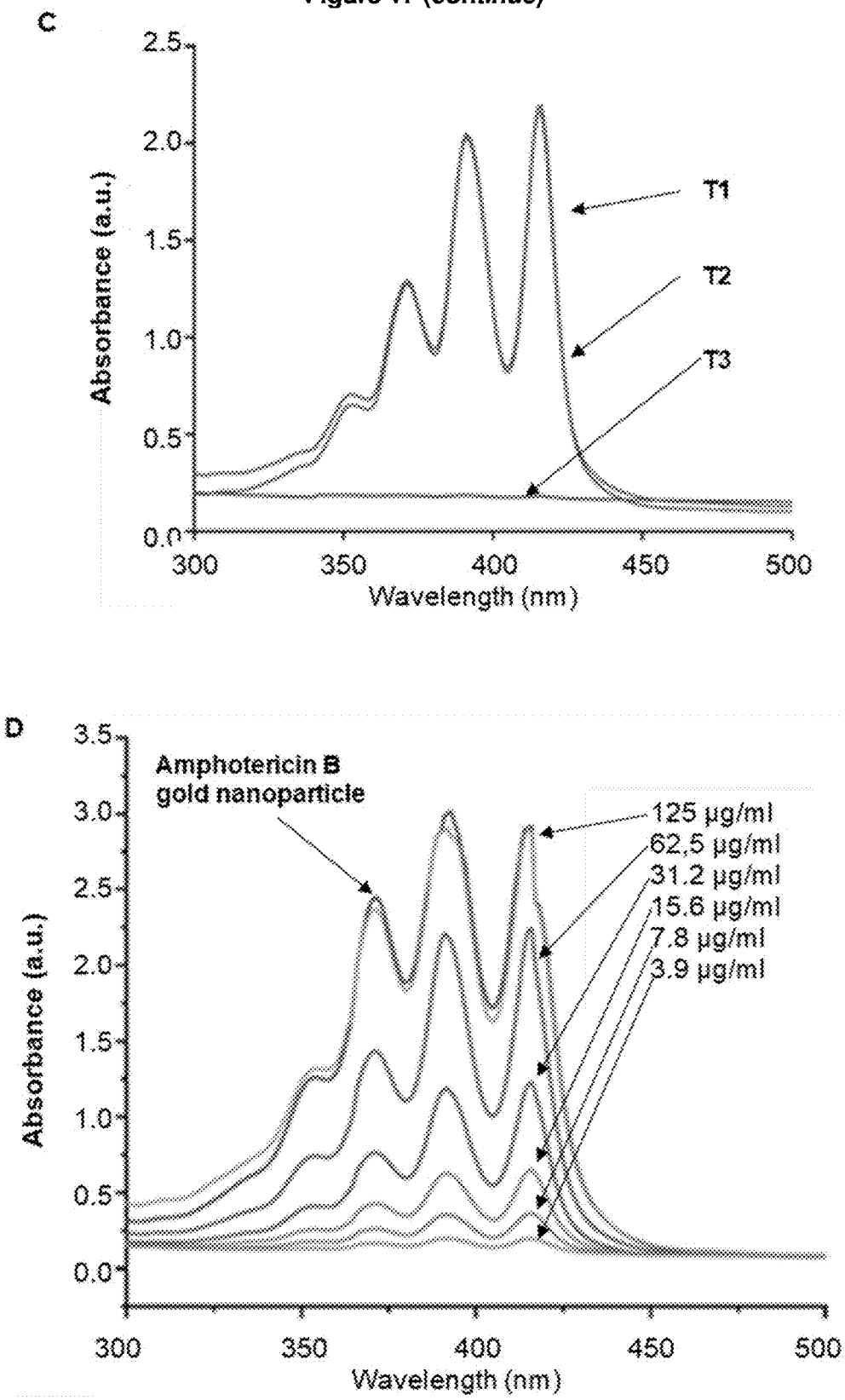
Figure 17 (continue)

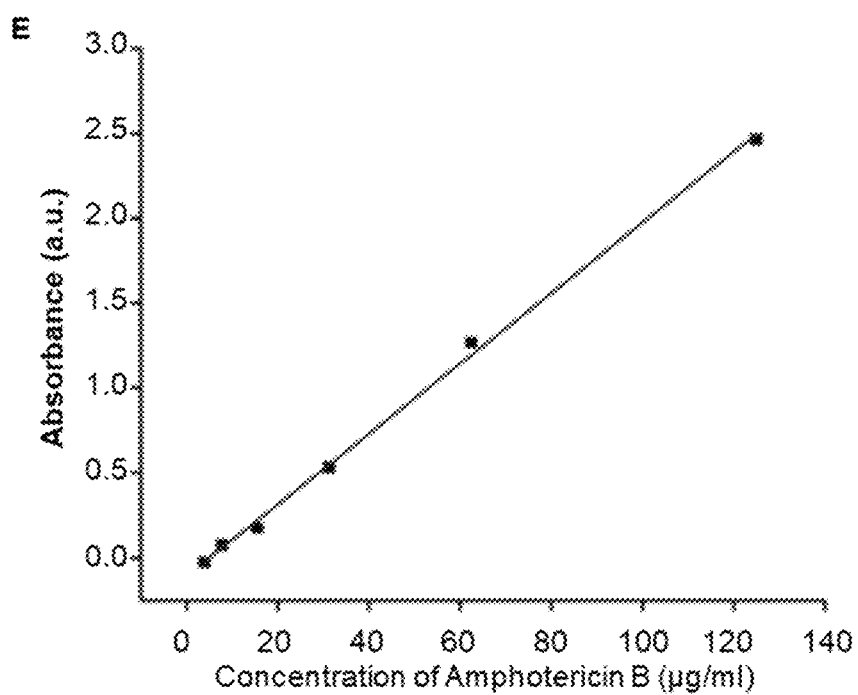
Figure 17 (*continue*)

AMPHOTERICIN B CONJUGATED STABILIZED GOLD NANOPARTICLES AND USES THEREOF

The present invention relates to conjugates of amphotericin B and gold nanoparticles stabilized with thiohexoses or thiopentoses, and a method to produce said nanoparticles. As the conjugates of amphotericin B to the stabilized gold nanoparticles show several advantages over amphotericin B alone, the present invention is also directed to pharmaceutical compositions comprising said nanoparticles, and to their use for treat fungal and leishmanial infection. These amphotericin B stabilized gold nanoparticles are dispersible in water and are not toxic for mammalian cells differently from free amphotericin B and other currently used amphotericin B preparations. Importantly, the conjugates of amphotericin B and stabilized gold nanoparticles are more efficacious in treating all forms of Cryptococcal infections (planktonic, intracellular and biofilms) than amphotericin B. Additionally, the conjugates are more effective against extracellular and intracellular forms of *Leishmania mexicana* and *Leishmania major*. Therefore, amphotericin B conjugated to thiohexose or thiopentose stabilized gold nanoparticles offer safer and better treatment option than free amphotericin B, and in particular for Cryptococcal and Leishmanial infections.

BACKGROUND OF THE INVENTION

In the last three decades there has been resurgence in life-threatening fungal infections, especially amongst immunocompromised individuals. It is estimated that around 1.5 million people succumb to fungal infections annually and around 1 billion people are affected. Additionally, fungal infections remain one of the main causes of mortality in immunocompromised humans. Despite its problem, fungal infections remain largely neglected by healthcare organizations. *Aspergillus* sp., *Candida* sp. and *Cryptococcus* sp. are the most notorious amongst fungal pathogens and amongst these, the infections caused by *Cryptococcus* sp. have seen a tremendous resurgence in the last thirty years.

*Cryptococcus* sp., responsible for fatal cryptococcal meningitis, is known to evade phagocytosis and antimicrobial treatment by residing within macrophages and by forming biofilms in the brain.

*Cryptococcus neoformans* causes life-threatening meningitis in immunocompromised individuals especially patients suffering from AIDS, cancer, autoimmune diseases and patients using intravenous medications or with organ transplants. It alone is responsible for around 180,000 deaths worldwide.

In humans, cells or spores of *Cryptococcus* sp. are inhaled, and then phagocytized by the alveolar macrophages. However, *C. neoformans* is able to survive and persist in mature phagolysosome making it a facultative intracellular pathogen. This ability of *C. neoformans* to survive and replicate within macrophages allow it to disseminate to other organ systems; the central nervous system (CNS) in particular is susceptible to infection. After crossing the blood brain barrier *C. neoformans* can form biofilms, called cryptococcomas, which protects them from host immune defenses and antimicrobial therapy. Therefore, by residing within macrophages and forming biofilms, *Cryptococcus* sp. can evade phagocytosis and antimicrobial treatment However, amphotericin B, the currently used drug against Cryptococcosis, is not effective against intracellular *C. neoformans* or its biofilms. Flucytosine, used in combination with amphotericin B, is very expensive and is not available in countries where the problem is persistent. Efficacy of conventional antifungals such as amphotericin B and fluconazole is very low against *C. neoformans* biofilms, making these biofilms extremely difficult to eradicate.

Furthermore, amphotericin B is poorly soluble in water and requires intravenous administration. Due to its toxicity, the drug is administered intravenously very slowly over a long time. The main acute side effects of amphotericin B are nausea, vomiting, rigors, fever, hypertension/hypotension, and hypoxia. Amphotericin B is nephrotoxic and its damaging effect on renal tubular cells is mainly due to several factors, including increased salt and $Ca^{2+}$ concentration and $H^+$ permeability across the aqueous pores.

Amphotericin B is also the drug of choice against leishmaniasis, a parasitic tropical disease claiming 40,000 lives annually. The disease is associated with poverty and affects people of the Indian sub-continent, Africa and South America. Poor aqueous solubility and toxicity makes amphotericin B mediated treatment of leishmaniasis difficult. Liposomal formulations of amphotericin B such as Ambiosome have reduced toxicity, however storage of liposomal formulations is more difficult and costly. Although some other treatments exist, a cheaper and more storage-friendly formulation of amphotericin B is needed.

The recommended initial treatment of Cryptococcosis varies depending on the immunocompetence of the patient. 80% of Cryptococcosis is observed in people co-infected with HIV. For these, the recommended treatment is amphotericin B at 0.7-1 mg/kg/d for 2 weeks, with or without flucytosine at 100 mg/kg/d for two weeks, followed by fluconazole at 400 mg/d for a minimum of 8-10 weeks. For those not infected by HIV, the initial regimen remains the same (amphotericin B at 0.7-1 mg/kg/day alone or in combination with flucytosine at 100 mg/kg/day in 4 divided doses). Then, amphotericin B can be administered alone for 6-10 weeks or in conjunction with flucytosine for 2 weeks, followed by fluconazole for a minimum of 10 weeks.

For visceral leishmaniasis the suggested treatment in most parts of the Indian subcontinent is amphotericin B deoxycholate: 0.75-1.0 mg/kg per day by infusion, daily or on alternate days for 15-20 doses. Liposomal amphotericin B: 3-5 mg/kg per daily dose by infusion given over 3-5 days period up to a total dose of 15 mg/kg (A) by infusion or 10 mg/kg as a single dose by infusion.

The scientific article of Aramburu et al. (*Straightforward and robust synthesis of monodisperse surface-functionalized gold nanoclusters, Beilstein J Nanotech.* 2016, 7, 1278-1283) reports on a one-pot synthesis of monodisperse and stable 2 nm gold nanoparticles using thioglucose as a reducing and stabilizing agent. The gold nanoparticles exhibit a higher stability than gold nanoparticles prepared by other methods.

The doctoral thesis of Aramburu (Carbohydrate-based nanomaterials for imaging and drug delivery, found at refubium.fuberlin.de/bitstream/handle/fub188/22666/Dissertation Varela Aramburu.pdf?sequence=3 is related to carbohydrate-based nanomaterials and particularly ultrasmall gold nanoparticles as described in Aramburu et al. 2016, for imaging and drug delivery. The gold nanoparticles showed high biocompatibility and were tested in vivo and in vitro. Drug gold nanoparticle conjugates were used in inhibition studies, whereas glycosylated nanoparticles for targeting and binding studies. Further, mesoporous silica nanoparticles were synthesized as flat discs in order to improve cellular uptake.

The Brazilian patent application BR 102016029885 A2 discloses amphotericin B-gold nanoparticle conjugates, wherein amphotericin B is conjugated to the nanoparticles via mercaptocarboxylic acid. Cytotoxicity ($CC_{50}$) and selectivity index ($IS=CC_{50}/CI_{50}$) were evaluated in BGM (renal epithelial cells of green African monkey) and DH82 (dog macrophages) cell lines using conjugates containing approximately 10% covalently conjugated amphotericin B and 90% adsorbed amphotericin B, conjugates containing essentially covalently bound amphotericin B and a commercial formulation of amphotericin B—desoxycholate.

The international patent application WO 2007/015105 A2 is directed to nanoparticles linked to antibacterial ligand, such as antibiotics or molecules which bind to bacterial markers for targeting bacterial cells. The ligands may further comprise carbohydrate groups, peptides, protein domains or nucleic acid segments or fluorescent groups. WO 2007/015105 A2 neither discloses amphotericin B as a drug nor describes the use of carbohydrates as linker for connecting antibiotic molecules to the surface of gold nanoparticles.

The international patent application WO 2012/025514 A1 is related to antimicrobial nanoparticle conjugates comprising an antimicrobial agent immobilized to a nanoparticle by a linker molecule. Particularly, WO 2012/025514 A1 discloses amphotericin B conjugated to silanized silica nanoparticles comprising terminal amine groups via oxidized dextran. Gold nanoparticles are mentioned in the application as well.

The scientific article of Kumar et al. (*Synthesis, characterization, and mechanistic studies of a gold nanoparticle-amphotericin B covalent conjugate with enhanced antileishmanial efficacy and reduced cytotoxicity, Int. J. Nanomed.* 2019, 14, 6073-6101), discloses amphotericin B conjugated to gold nanoparticles through the intermediate of lipoic acid molecules, wherein the amino group of the amphotericin B molecule and the carboxylic acid group of lipoic acid are covalently attached. Their results show that the amphotericin B conjugated nanoparticles have more potent in vitro antileishmanial and antifungal activity against *C. albicans* but less cytotoxicity and heamolytic activity than free amphotericin B. Kumar et al. report that the amphotericin B molecules on the gold nanoparticles are in a non-aggregated state. However, it is not reported if these conjugated nanoparticles are active against fungal biofilms or intracellular fungi.

It is the objective of the present invention to provide amphotericin B conjugated thiohexose or thiopentose stabilized gold nanoparticles which can be used as safer and better treatment option than amphotericin B, and in particular for Cryptococcal and Leishmanial infections, as well as pharmaceutical compositions comprising the same. The present invention also provides a method to produce said amphotericin B conjugated stabilized gold nanoparticles.

The objective of the present invention is solved by the teaching of the independent claims. Further advantageous features, aspects and details of the invention are evident from the dependent claims, the description, the figures, and the examples of the present application.

BRIEF DESCRIPTION OF THE INVENTION

The present invention relates to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm.

The inventors have here shown that conjugates of amphotericin B and thioglucose stabilized gold nanoparticles are dispersible in water (FIG. 2) whereas free amphotericin B is poorly soluble in water. Amphotericin B conjugated thioglucose stabilized gold nanoparticles showed a particle size range comprised between 5 nm-12 nm, as measured by atomic force microscopy (AFM) (FIG. 4C-4E). The particle size obtained by AFM represents the diameter of the gold nanoparticle conjugated to amphotericin B, and more accurately the diameter of the gold nanoparticle core plus the ligands. Dynamic light scatter analysis showed that the amphotericin B conjugated thioglucose stabilized gold nanoparticles have hydrodinamic radius bigger than 20 nm and reaching values of 45 nm (FIG. 5, FIG. 19). Fourier-transform infrared spectroscopy (FT-IR) analysis confirmed the conjugation of amphotericin B with the gold nanoparticles (FIG. 6). Moreover, the amphotericin B conjugated gold nanoparticles showed a Zeta potential ranging from −25 to −35 mV (FIG. 7).

Ultraviolet spectroscopy analysis of the amphotericin B conjugated thioglucose stabilized gold nanoparticles dissolved in water revealed that amphotericin B is present in dimeric form when conjugated to the thioglucose stabilized gold nanoparticles (FIG. 8), whereas free amphotericin B or amphotericin B conjugated to thioglucose stabilized gold nanoparticles in DMSO showed the three characteristic peaks of the monomeric form. Dimeric aggregation states have been related to both higher efficacy and higher toxicity (Serrano et al., 2008, *Amphotericin B Formulations, Pharmaceutical Nanotechnology*, 2013, 1, 250-258) compared with monomeric and poly-aggregation forms of amphotericin B. It has been suggested that amphotericin B monomers are safer as amphotericin B dimers because they permeabilize only ergosterol-containing membranes, while the side effects of dimers (such as in Fungizone®) are due to the interactions of these self-associated forms with cholesterol-rich membranes.

Further analysis comparing the UV spectrum of the amphotericin B conjugated thioglucose stabilized gold nanoparticles with Fungizone® and Ambisome®, revealed that amphotericin B conjugated gold nanoparticles absorption was slightly shifted to wavelengths about 327-334 nm, in comparison with Fungizone®, which is characterized by amphotericin B dimers. The absorption maxima were also lower than Fungizone®, indicating that some other aggregated states are present. Indeed, amphotericin B conjugated gold nanoparticles also absorbed in the region of 260 to 300 which has never been observed in the amphotericin B formulations so far. This might explain the lower toxicity of amphotericin B conjugated gold nanoparticles in comparison with free amphotericin B and Fungizone®.

Differently, the amphotericin B conjugated gold nanoparticles of Kumar et al. (FIG. 1 B) in water showed peaks for both amphotericin B (340-410 nm) and for the gold nanoparticles (~530 nm). These data demonstrate that after conjugation through lipoic acid, amphotericin B becomes aggregation free and water soluble. However, they also show that the conjugated gold nanoparticles are bigger than the amphotericin B gold nanoparticles disclosed herein, as these do not show absorbance at 530 nm. This characteristic can be of advantage, because smaller particles are better internalized by target cells.

Moreover, the ratio [concentration of amphotericin B]/[concentration of gold] of the amphotericin B thioglucose stabilized gold nanoparticles showed an average value of 2.7±1.08.

In contrast, the amphotericin B conjugated gold nanoparticles of Kumar et al. showed a ratio [concentration of amphotericin B]/[concentration of gold] of 16 μg/1 μg.

Concerning the antifungal activity, it has been shown (Table 1) that amphotericin B conjugated to thioglucose stabilized gold nanoparticles was twice as active (MIC=1 μg/mL) as the free parent drug (MIC=2 μg/mL) (MIC: minimal inhibitory concentration) against three fluconazole-resistant strains of *Aspergillus* sp. Amphotericin B bound thioglucose stabilized gold nanoparticles were more active than free amphotericin B against *C. albicans* ATCC 10231 and NR 29448, where they were twice more potent than amphotericin B. Moreover, amphotericin B bound thioglucose stabilized gold nanoparticles were twice more active than free amphotericin B against the two tested strains of *C. tropicalis*.

In particular, the amphotericin B conjugated gold nanoparticles disclosed herein showed a MIC of only 0.5 μg/ml against *C. albicans* (ATCC-10231), and thus lower than the free amphotericin B (being 1 μg/ml), and also than the prior art amphotericin B gold nanoparticles of Kumar et al., which showed a $IC_{50}$ of 2 μg/ml.

Then, the activity of the amphotericin B preparations was evaluated against the causative agents of cryptococcosis and cryptococcal meningitis. The pathogens evaluated were four strains of *C. gatti* and four strains of *C. neoformans*. Whereas *C. neoformans* mostly affects immunocompromised individuals, *C. gatti* has been reported to cause illness also in immunocompetent individuals. Results showed that amphotericin B thioglucose stabilized gold nanoparticles are more active in comparison to free amphotericin B against all tested strains of *Cryptococcus*, and are active also against fluconazole-resistant strains.

Of notice, the prior art amphotericin B gold nanoparticles of Kumar et al. were not investigated for their activity against other *Aspergillus fumigatus, Candida tropicalis, Cryptococcus* gatti and *Cryptococcus neoformans*.

*C. neoformans* is known for forming biofilms and surviving therein. These biofilms, termed as cryptococcomas, are recalcitrant to antifungals and human immune response. Analysis of the metabolic activity of *C. neoformans* biofilms (FIG. 11) subjected to the different amphotericin B preparations, showed that amphotericin B bound to thioglucose stabilized gold nanoparticles was active at concentrations much lower than free amphotericin B. Thus, multivalent presentation and conjugation to thioglucose stabilized nanoparticles of the drug seems to render amphotericin B able to destroy *C. neoformans* biofilms more effectively than the unconjugated drug.

*C. neoformans* is also known to survive and replicate within immune cells, where it is extremely difficult to remove, and there is no effective treatment against it. Amphotericin B bound to thioglucose stabilized gold nanoparticles was able to inhibit intracellular growth of *C. neoformans* at concentrations much lower than the free drug (FIG. 12).

Importantly, the previous prior art amphotericin B gold nanoparticles of Kumar et al were not shown to have activity against fungal biofilms or against fungal intracellular forms.

Amphotericin B conjugated gold nanoparticles resulted also more effective than free amphotericin B against intracellular and extracellular growth of *L. mexicana* and *L. major* (FIGS. 13 and 14). The resulting $IC_{50}$ of amphotericin B bound thioglucose stabilized gold nanoparticles was 0.1 μg/mL against *L. major* and 0.13 μg/mL against *L. mexicana* while the free drug displayed values between 0.7 and 1 μg/mL, demonstrating an increased antileishmania activity of more than 7 times for the conjugated form of amphotericin B.

Differently, the prior art amphotericin B bound gold nanoparticles of Kumar et al. showed an increase in activity against extracellular *Leishmania donovani* in comparison to free amphotericin B of only 2.5 times ($IC_{50}$~20 nM of amphotericin B bound gold nanoparticles, and $IC_{50}$~50 nM of free amphotericin B).

One major drawback of amphotericin B for the treatment of fungal and leishmania infection, is its toxicity for human and mammals. It seems that amphotericin B toxicity is mostly related to its aggregation form, which influences the capacity of amphotericin B to penetrate the fungal ergosterol-reach membranes or the mammal cholesterol-reach membranes. Analysis of toxicity against red blood cells and macrophage cultures (FIGS. 15, 16) showed that amphotericin B conjugated to the thioglucose stabilized gold nanoparticles are much less toxic than the free drug, and are safe at concentrations much higher than those active against fungal and leishmania infections. Importantly, the prior art amphotericin B bound gold nanoparticles of Kumar et al. reported an haemolysis of 33% at concentration of 54 μM, i.e. 50 μg/mL, whereas at the same concentration the amphotericin B thioglucose stabilized gold nanoparticles disclosed herein showed no haemolysis.

Moreover, the nanoparticles disclosed herein showed also lower toxicity in comparison with the prior art preparations. Indeed, the prior art amphotericin B conjugated gold nanoparticles of Kumar et al. showed to cause a ~70% survival of THP-1 at 11 μM (i.e. 10 μg/mL). The amphotericin B thioglucose gold nanoparticles disclosed herein were less toxic than those of the prior art, as the J774.1 incubated with these nanoparticles at 10 μg/mL were ~100% vital.

Use of amphotericin B against fungal and *leishmania* infection is hampered by the short stability of the free drug or of its liposomal formulations. A particular advantage of the present invention is represented by the high stability of the amphotericin B conjugated thiohexose or thiopentose-stabilized nanoparticles, which can be preserved for more than 6 months at 4-8° C. without signs of aggregation and without significant loss of antimicrobial activity (Example 5).

The experimental findings above suggest that the presence of a thiohexuronic acid, such as thioglucuronic acid, or a thiopenturonic acid on the surface of the gold nanoparticles is responsible for a lower toxicity of the conjugated amphotericin B against mammalian cells, higher stability, and higher activity against fungal and *leishmania* infections, probably due to the particular aggregation state of amphotericin B conjugated to the nanoparticles through binding to thiohexuronic acids or thiopenturonic acids. Indeed amphotericin B conjugated to thiohexuronic acid or thiopenturonic acid stabilized nanoparticles showed UV absorption peaks not only at 327-334 nm but also at wavelengths lower than 300 nm, which has never been shown so far for amphotericin B preparations.

Therefore, the present invention also discloses the use of the amphotericin B conjugated thiohexose or thiopentose stabilized gold nanoparticles to treat fungal and leishmanial infection, and pharmaceutical compositions comprising said nanoparticles. A method to produce the inventive amphotericin B conjugated stabilized gold nanoparticles is also provided.

DETAILED DESCRIPTION OF THE INVENTION

Definitions:

Amphotericin B is a polyene antibiotic and the most commonly-used antifungal agent, which has played a major role in the treatment and management of systemic fungal infections, since its discovery in the 1950s. Amphotericin B demonstrates both fungistatic and fungicidal activity and has proven to be effective against a wide variety of fungal species. The broad spectrum of antifungal activity of amphotericin B includes most of the medically significant fungi including yeasts (*Candida albicans, Candida neoformans*), endemic mycoses (*Histoplasma capsulatum, Blastomyces dermatitidis* and *Coccidioides immitis*) and molds (*Aspergillus fumigatus, Mucor*). Only few fungal strains have been reported to be resistant to amphotericin B, making it the drug of choice in the therapeutic treatment of many systemic fungal infections.

is a broad-spectrum pharmaceutical, useful for the treatment of fungal infections, but it has provided evidence of several side effects, including renal disorders.

Abelcet® is a lipid complex made up of two phospholipids (L-dimyristoylphosphatidylcholine and L-dimyristoylphosphatidylglycerol) and Amphotericin B. The therapeutic index of Abelcet® is better than that of Fungizone®, but the lipid complex is quickly removed from the blood stream by the cells of the mononuclear phagocyte system, thus increasing the risk of hepatic disorders while reducing the therapeutic effect. It is used for the treatment of invasive fungal infections in patients who are refractory or intolerant to the conventional amphotericin B therapy.

Amphotec® is a formulation made up of amphotericin B and cholesterol sulfate. It has a degree of antifungal efficacy similar to that of Fungizone® but with less hemolytic and cytotoxic activity, particularly at the renal level. Amphotec® is used in the treatment of invasive aspergillosis in patients suffering renal disease or those who have low tolerability toward effective dosages of Fungizone® and also in patients with aspergillosis resistant to Fungizone® therapy.

Ambisome® is a liposomal formulation of amphotericin B in which the drug is strongly associated with the bilayer structure of small unilamellar liposomes. Ambisome® has been marketed in Europe since 1989, and was approved in 1997 by the US Food and Drug Administration (F.D.A.) for

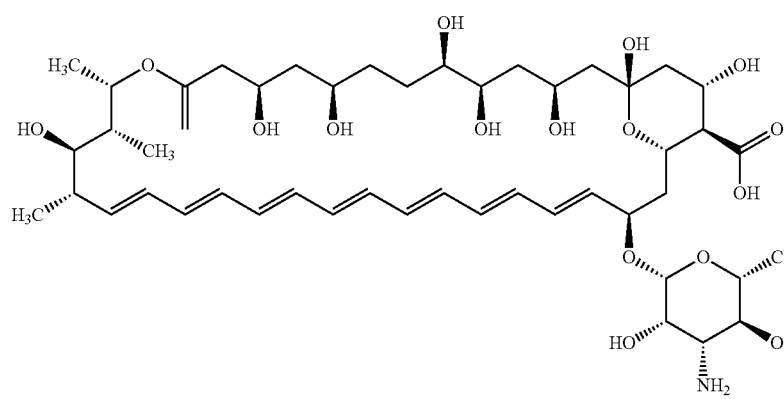

Amphotericin B structure

Even if amphotericin B is used against cryptococcosis, it is not effective against intracellular *C. neoformans* and biofilms of *C. neoformans*, which are formed after crossing the blood-brain barrier. Efficacy of the conventional antifungal combination of Amphotericin B with fluconazole is reduced against *C. neoformans* biofilms.

Moreover, amphotericin B is used against leishmaniasis, however the poor solubility and stability of amphotericin B render the treatment of leishmaniasis difficult.

Despite its great efficiency, amphotericin B is poorly tolerated and its administration is limited by infusion-related toxicity. Novel amphotericin B formulations were realized and marketed in the 1990s in order to decrease the drug's toxicity and increase its efficacy, i.e., Fungizone®, Ambisome®, Abelcet® and Amphotec® (Palma et al., Materials 2018, 11, 1167).

Fungizone® is considered the "gold standard" formulation of amphotericin B. It is a hydrophilic colloidal dispersion made up of sodium deoxycholate (SD), organized in micelles suitable for parenteral administration. Fungizone® the treatment of visceral leishmaniasis. The formulation is made up of hydrogenated soy phosphatidylcholine, distearoylphosphatidylglycerol and cholesterol. Ambisome® is characterized by a prolonged circulation time in the blood stream and is less toxic than Fungizone®. In a recent meta-analysis investigation, the renal toxicity and efficacy of Ambisome® vs. free amphotericin B were evaluated, evidencing a significant decrease in side effects for the liposomal formulation.

Gold (Au) is a chemical element with atomic number 79 exhibiting a face centered cubic crystal structure. In its purest form, it is a bright, slightly reddish yellow, dense, soft, malleable and ductile metal. Chemically, gold is a transition metal and a group 11 element. It is one of the least reactive chemical elements and is solid under standard conditions. The metal occurs frequently in free elemental (native) form, in a solid solutions series with the native element silver and also naturally alloyed with copper, platinum and/or palladium. Less commonly, it occurs in minerals as gold compounds, often with tellurium. Gold has only one stable isotope, $^{197}$Au, which is also its only naturally occurring isotope, so gold is both a mononuclidic and monoisotopic element. Although gold is the most noble of the noble metals, it still forms many diverse compounds. The oxidation state of gold in its compounds ranges from $^-1$ to $^+5$. The most common oxidation states of gold include $^+1$, Au(I) known as gold (I) or aurous compounds and $^+3$, Au(III) known as gold (III) or auric compounds dominate its chemistry. Gold ions are readily reduced and precipitated as metal. Gold resists attacks by individual acids, but it can be dissolved in aqua regia, a 1:3 mixture of nitric and hydrochloric acid, causing the formation of a soluble gold tetrachloride anion. Nitric acid oxidizes the metal to $^+3$ ions, but only in small amounts, the ions are removed from the equilibrium by hydrochloric acid, forming $AuCl_4^-$ ions, or aurochloric acid, $HAuCl_4$.

The term "nanoparticle" is used herein to indicate particles between 1 and 100 nm in size, comprising $10^2$ to $10^7$ atoms. A particle is defined as a small object that behaves as a whole unit with respect to its transport and properties. The exceptionally high surface area to volume ratio of nanoparticles may cause the nanoparticles to exhibit significantly different or even novel properties from those observed in individual atoms/molecules, fine particles and/or bulk materials.

In a preferred embodiment the gold nanoparticle core of the present disclosure substantially comprises elemental gold. The term "gold nanoparticle core" as used herein refers to an elemental gold rich material, i.e. greater than 50%, more preferably greater than 60%, more preferably greater than 70%, more preferably greater than 75%, more preferably greater than 80%, more preferably greater than 85%, more preferably greater than 90%, more preferably greater than 95%, most preferably greater than 99% elemental gold by weight, having a surface to which one or more thiohexuronic acid molecules are connected to form a thiohexose stabilized gold nanoparticle, or to which one or more thiopenturonic acid molecules are connected to form a thiopentose stabilized gold nanoparticle.

Generally, gold nanoparticles are produced in a liquid (i.e. liquid chemical methods) and are obtained by chemical reduction of aurochloric acid ($HAuCl_4$). After dissolving aurochloric acid, the solution is rapidly stirred while a reducing agent is added. This causes $Au^{3+}$ ions to be reduced to $Au^+$ ions. Subsequently, a disproportionation reaction occurs whereby 3 $Au^+$ ions give rise to $Au3^+$ and 2 $Au^0$ atoms. The $Au^0$ atoms act as a center of nucleation around which further $Au^+$ ions get reduced. For the gold nanoparticles disclosed herein, thioglucose has been added as stabilizing agent that binds to the nanoparticle surface and prevents the particles from aggregating.

In particular, the nanoparticles disclosed herein comprise a gold nanoparticle core having a surface, thiohexuronic or thiopenturonic acid molecules connected to the surface of the gold nanoparticle core, and that stabilize the gold nanoparticle core through Au—S bonds. Moreover the inventive stabilized gold nanoparticles are conjugated to at least one amphotericin B molecule, wherein one amphotericin B molecule is covalently bound to one of the thiohexuronic or thiopenturonic acid molecules via covalent linkage of the amino group of the amphotericin B molecule and the carboxylic acid group of the thiohexuronic or thiopenturonic acid molecule. These amphotericin B conjugated thiohexose or thiopentose stabilized gold nanoparticles have a particle size range comprised between 5 nm-12 nm, as measured by Atomic Force Microscopy (AFM). The particle size obtained by AFM represents the diameter of the gold nanoparticle conjugated to amphotericin B, i.e. the diameter of the gold nanoparticle core plus the ligands.

In other words, the thiohexose stabilized gold nanoparticles of the present invention comprise at least one amphotericin B molecule, which is covalently bound to one of the thiohexuronic acid molecules via covalent linkage of an amino group of amphotericin B and a carboxylic acid group of the thiohexuronic acid. The thiopentose stabilized gold nanoparticles of the present invention comprise at least one amphotericin B molecule, which is covalently bound to one of the thiopenturonic acid molecules via a covalent linkage of the amino group of the amphotericin B molecule and the carboxylic acid group of the thiopenturonic acid molecule.

In one embodiment, the thiohexuronic acid or thiopenturonic acid stabilized gold nanoparticles of the present disclosure are envisaged to be synthesized and formed into a variety of additional morphologies and forms including, but not limited to, nanoparticles, nanoclusters, nanosheets, nanoplatelets, nanocrystals, nanospheres, nanorectangles, nanotriangles, nanopentagons, nanohexagons, nanoprisms, nanodisks, nanocubes, nanowires, nanofibers, nanoribbons, nanorods, nanotubes, nanocylinders, nanogranules, nanowhiskers, nanoflakes, nanofoils, nanopowders, nanoboxes, nanostars, tetrapods, nanobelts, nanourchins, nanoflowers, etc. and mixtures thereof.

Nanoparticle characterization is necessary to establish understanding and control of nanoparticle synthesis, assembly and application. In one embodiment, the nanoparticles are characterized by at least one technique selected from the group consisting of transmission electron microscopy (TEM), scanning electron microscopy (SEM) and ultraviolet-visible spectroscopy (UV-Vis). In another embodiment, it is envisioned that characterization is done using a variety of other techniques. Exemplary techniques include, but are not limited to, dynamic light scattering (DLS), Fourier transform infrared spectroscopy (FT-IR), atomic force microscopy (AFM), X-ray photoelectron spectroscopy (XPS), X-ray fluorescence (XRF), powder X-ray diffraction (XRD), energy-dispersive X-ray spectroscopy (EDX), thermogravimetric analysis (TGA), matrix-assisted laser desorption/ionization time-of-flight mass spectrometry (MALDI-TOF), Rutherford backscattering spectrometry (RBS), dual polarization interferometry and nuclear magnetic resonance or mixtures thereof.

In one embodiment, the amphotericin B conjugated thiohexose or thiopentose stabilized gold nanoparticles have an average particle size of greater than 3 nm, preferably between 3 nm-20 nm, preferably between 4 nm-20 nm, preferably between 5 nm-20 nm, preferably between 6 nm-20 nm, preferably between 3 nm-15 nm, preferably between 4 nm-15 nm, preferably between 5 nm-15 nm, preferably between 6 nm-15 nm, preferably between 3 nm-12 nm, preferably between 4 nm-12 nm, preferably between 5 nm-12 nm, preferably between 6 nm-12 nm, preferably between 3 nm-10 nm, preferably between 4 nm-10 nm, preferably between 5 nm-10 nm, and most preferably between 6 nm-10 nm, as measured by Atomic Force Microscopy (AFM). The particle size obtained by AFM represents the diameter of the gold nanoparticle conjugated to amphotericin B, i.e. the diameter of the gold nanoparticle core plus the ligands. The size may vary from these ranges and still provide acceptable thiohexose or thiopentose stabilized gold nanoparticles.

In one embodiment, the amphotericin B conjugated thiohexose or thiopentose stabilized gold nanoparticles have an average particle diameter of greater than 3 nm, preferably between 3 nm-20 nm, preferably between 4 nm-20 nm, preferably between 5 nm-20 nm, preferably between 6 nm-20 nm, preferably between 3 nm-15 nm, preferably between 4 nm-15 nm, preferably between 5 nm-15 nm, preferably between 6 nm-15 nm, preferably between 3 nm-12 nm, preferably between 4 nm-12 nm, preferably between 5 nm-12 nm, preferably between 6 nm-12 nm, preferably between 3 nm-10 nm, preferably between 4 nm-10 nm, preferably between 5 nm-10 nm, and most preferably between 6 nm-10 nm, as measured by Atomic Force Microscopy (AFM). The particle diameter obtained by AFM represents the diameter of the gold nanoparticle conjugated to amphotericin B, i.e. the diameter of the gold nanoparticle core plus the ligands. The diameter may vary from these ranges and still provide acceptable thiohexose or thiopentose stabilized gold nanoparticles.

In one embodiment, the amphotericin B conjugated thiohexose or thiopentose stabilized gold nanoparticles are monodispersed with a particle size range comprised between 3 nm-15 nm, preferably 4 nm-15 nm, preferably 5 nm-15 nm, preferably 3 nm-12 nm, preferably 4 nm-12 nm, preferably 5 nm-12 nm, preferably 3 nm-20 nm, preferably 4 nm-20 nm, preferably 5 nm-20 nm, preferably 3 nm-25 nm, preferably 4 nm-25 nm, preferably 5 nm-25 nm, most preferably between 5 nm-12 nm, as measured by Atomic Force Microscopy (AFM). The particle size obtained by AFM represents the diameter of the gold nanoparticle conjugated to amphotericin B, i.e. the diameter of the gold nanoparticle core plus the ligands.

In one embodiment, the amphotericin B conjugated thiohexose or thiopentose stabilized gold nanoparticles are monodispersed with a particle diameter range comprised between 3 nm-15 nm, preferably 4 nm-15 nm, preferably 5 nm-15 nm, preferably 3 nm-12 nm, preferably 4 nm-12 nm, preferably 5 nm-12 nm, preferably 3 nm-20 nm, preferably 4 nm-20 nm, preferably 5 nm-20 nm, preferably 3 nm-25 nm, preferably 4 nm-25 nm, preferably 5 nm-25 nm, most preferably between 5 nm-12 nm, as measured by Atomic Force Microscopy (AFM). The particle diameter obtained by AFM represents the diameter of the gold nanoparticle conjugated to amphotericin B, i.e. the diameter of the gold nanoparticle core plus the ligands.

The term "water-dispersible" as used herein refers to an essentially unaggregated dispersion of particles, such that discrete particles of approximately 3 nm to 100 nm can be sustained indefinitely up to high concentrations of amphotericin B (10-250 μg/ml). Thus, the term "dispersibility" refers to the ability of the nanoparticles of the present invention to disperse uniformly in water.

The term "aqueous solution" refers to a solution that contains a minimum of 50% by weight of pure water.

The term "aqueous dispersion" refers to a liquid system in which very small solid particles, such as nanoparticles, are uniformly dispersed in water.

In one embodiment, the amphotericin B conjugated thiohexose or thiopentose stabilized gold nanoparticles are monodispersed with a particle hydrodynamic radius range comprised between 10 nm-100 nm, preferably 15 nm-100 nm, preferably 20 nm-100 nm, preferably 25 nm-100 nm, preferably 30 nm-100 nm, preferably 35 nm-100 nm, preferably 40 nm-100 nm, preferably 20 nm-80 nm, preferably 25 nm-80 nm, preferably 30 nm-80 nm, preferably 35 nm-80 nm, preferably 40 nm-80 nm, preferably 45 nm-80 nm, preferably 20 nm-60 nm, preferably 25 nm-60 nm, preferably 30 nm-60 nm, preferably 35 nm-60 nm, preferably 40 nm-60 nm, preferably 45 nm-60 nm, preferably 10 nm-50 nm, preferably 15 nm-50 nm, preferably 20 nm-50 nm, most preferably between 20 nm-45 nm, as measured by dynamic light scattering (DLS).

The term "connected" as in for example, thiohexuronic acid molecules or thiopenturonic acid molecules connected to the surface of the gold nanoparticle core, includes covalent linkage, binding, immobilization. The terms "attached", "binding", "bound", "linkage", linking are identical in meaning to the term "connected".

Zeta potential analysis is a technique for determining the surface charge of nanoparticles in solution (colloids). Nanoparticles have a surface charge that attracts a thin layer of ions of opposite charge to the nanoparticle surface. This double layer of ions travels with the nanoparticle as it diffuses throughout the solution. The electric potential at the boundary of the double layer is known as the Zeta potential of the particles and has values that typically range from +100 mV to −100 mV. The magnitude of the zeta potential is predictive of the colloidal stability. Nanoparticles with Zeta Potential values greater than +25 mV or less than −25 mV typically have high degrees of stability. Dispersions with a low zeta potential value will eventually aggregate due to Van Der Waal inter-particle attractions. Thus, Zeta Potential is an important tool for understanding the state of the nanoparticle surface and predicting the long term stability of the nanoparticle.

In a preferred embodiment, the inventive amphotericin B conjugated thiohexose stabilized gold nanoparticles dissolved in water have a zeta potential of greater than 30 mV or less than −30 mV, preferably greater than 35 mV or less than −35 mV, preferably greater than 40 mV or less than −40 mV, preferably greater than 50 mV or less than −50 mV, preferably greater than 60 mV or less than −60 mV.

In a preferred embodiment, the inventive amphotericin B conjugated thiopentose stabilized gold nanoparticles dissolved in water have a zeta potential of greater than 30 mV or less than −30 mV, preferably greater than 35 mV or less than −35 mV, preferably greater than 40 mV or less than −40 mV, preferably greater than 50 mV or less than −50 mV, preferably greater than 60 mV or less than −60 mV.

In a more preferred embodiment, the inventive amphotericin B conjugated thiohexose stabilized gold nanoparticles dissolved in water have a zeta potential ranging preferably from −25 to −35 mV, preferably from −25 to −45 mV, preferably from −25 to −50 mV, preferably from −25 to −55 mV, preferably from −20 to −30 mV, preferably from −20 to −40 mV, preferably from −20 to −50 mV, preferably from −10 to −50 mV, preferably from −10 to −40 mV, preferably from −10 to −30 mV, and more preferably from −25 mV to −35 mV.

In a more preferred embodiment, the inventive amphotericin B conjugated thiopentose stabilized gold nanoparticles dissolved in water have a zeta potential ranging preferably from −25 to −35 mV, preferably from −25 to −45 mV, preferably from −25 to −50 mV, preferably from −25 to −55 mV, preferably from −20 to −30 mV, preferably from −20 to −40 mV, preferably from −20 to −50 mV, preferably from −10 to −50 mV, preferably from −10 to −40 mV, preferably from −10 to −30 mV, and more preferably from −25 mV to −35 mV.

In a preferred embodiment, the amphotericin B conjugated thiohexose stabilized gold nanoparticles of the present disclosure have a proportion in weight of the amphotericin B molecules ranging from 1 mg to 20 mg, preferably 2.5 mg to 17.5 mg, preferably 5 mg to 15 mg, more preferably 7.5 mg to 12.5 mg, per mg of total weight of the amphotericin B conjugated gold nanoparticles.

In a preferred embodiment, the amphotericin B conjugated thiopentose stabilized gold nanoparticles of the present disclosure have a proportion in weight of the amphotericin B molecules ranging from 1 mg to 20 mg, preferably 2.5 mg to 17.5 mg, preferably 5 mg to 15 mg, more preferably 7.5 mg to 12.5 mg, per mg of total weight of the amphotericin B conjugated gold nanoparticles.

In a preferred embodiment, the amphotericin B bound thiohexose stabilized gold nanoparticles of the present disclosure have a molar ratio of thiohexose stabilized gold nanoparticle to amphotericin B ranging from 1:1 to 1:10, preferably from 1:1 to 1:15, preferably from 1:1 to 1:20, preferably from 1:1 to 1:30, preferably from 1:1 to 1:40, preferably from 1:5 to 1:10, preferably from 1:5 to 1:15, preferably from 1:5 to 1:20, preferably from 1:5 to 1:30, preferably from 1:5 to 1:40, preferably from 1:10 to 1:20, preferably from 1:10 to 1:30, preferably from 1:10 to 1:40, more preferably from 1:10 to 1:15, and most preferably from 1:1 to 1:10.

In a preferred embodiment, the amphotericin B bound thiopentose stabilized gold nanoparticles of the present disclosure have a molar ratio of thiopentose stabilized gold nanoparticle to amphotericin B ranging from 1:1 to 1:10, preferably from 1:1 to 1:15, preferably from 1:1 to 1:20, preferably from 1:1 to 1:30, preferably from 1:1 to 1:40, preferably from 1:5 to 1:10, preferably from 1:5 to 1:15, preferably from 1:5 to 1:20, preferably from 1:5 to 1:30, preferably from 1:5 to 1:40, preferably from 1:10 to 1:20, preferably from 1:10 to 1:30, preferably from 1:10 to 1:40, more preferably from 1:10 to 1:15, and most preferably from 1:1 to 1:10.

In a preferred embodiment, the amphotericin B bound thiopentose stabilized gold nanoparticles of the present disclosure have a ratio of amphotericin B concentration to gold concentration ranging from 1 to 10, preferably from 1 to 9, preferably from 1 to 8, preferably from 1 to 7, preferably from 1 to 6, preferably from 1 to 5, preferably from 1 to 4, preferably from 1 to 3, preferably from 2 to 10, preferably from 2 to 9, preferably from 2 to 8, preferably from 2 to 7, preferably from 2 to 6, preferably from 2 to 5, preferably from 2 to 4, and most preferably from 1 to 5.

Preferred thiohexose molecules to use as stabilizing/reducing agents for the inventive nanoparticles are selected from the group comprising thioallose (1-thioallose), thioaltrose (1-thioaltrose), thiogulose (1-thiogulose), thiotalose (1-thiotalose), thiogalactose (1-thiogalactose), thioidose (1-thioidose), thioglucose (1-thioglucose), thiomannose (1-thiomannose).

Preferred thiopentose molecules to use as stabilizing/reducing agents for the inventive nanoparticles are selected from the group comprising thioarabinose (1-thioarabinose), thioxylose (1-thioxylose), thiolyxose (1-thiolyxose), and thioribose (1-thioribose).

Uronic acids are a class of sugar acids with both carbonyl and carboxylic acid functional groups. They are sugars in which the terminal carbon's hydroxyl group has been oxidized to a carboxylic acid. Oxidation of the terminal aldehyde instead yields an aldonic acid, while oxidation of both the terminal hydroxyl group and the aldehyde yields an aldaric acid. The names of uronic acids are generally based on their parent sugars, for example, the uronic acid analog of glucose is glucuronic acid. Uronic acids derived from hexoses are known as hexuronic acids and uronic acids derived from pentoses are known as penturonic acids.

Preferred uronic acids for the embodiments of the present invention are derived from hexoses or pentoses functionalized with a thiol group. Thus, preferred uronic acids are functionalized with a thiol group and are thiohexuronic acids and thiopenturonic acids.

Preferred thiohexuronic acids to carry out the present invention are selected from the group comprising thioalluronic acid, thioaltruronic acid, thioguluronic acid, thiotaluronic acid, thiogalacturonic acid, thioiduronic acid, thioglucuronic acid, and thiomannuronic acid.

Preferred thiopenturonic acids are selected from the group comprising thioarabinuronic acid, thioxyluronic acid, thiolyxuronic acid, and thioriburonic acid.

The wording "the thiohexuronic acid molecules stabilize the gold nanoparticle core" means that the thiohexuronic acid molecules, originating by oxidation of the hydroxy group of the thiohexose, act as capping agents for gold nanoparticles that stabilize the gold nanoparticles and prevents aggregation before, during and after gold nanoparticle formation processes. Thus the wording "the thiohexuronic acid molecules stabilize the gold nanoparticle core" means also that the thiohexose molecules stabilize the gold nanoparticle core. Thus the expressions "thiohexose stabilized gold nanoparticles", "thiohexose gold nanoparticles", "thiohexuronic acid stabilized gold nanoparticles", "thiohexuronic acid—gold nanoparticles", "thiohexuronic acid coated gold nanoparticles", "thiohexuronic acid connected gold nanoparticles" are used interchangeably to indicate the gold nanoparticles disclosed herein produced by reduction of aurochloric acid in presence of thiohexoses, as described in details in the method section. Thus, the wording "amphotericin B conjugated gold nanoparticles" defines the nanoparticles disclosed herein and has the same meaning as "amphotericin B conjugated thiohexose stabilized gold nanoparticles", "amphotericin B conjugated thiohexose gold nanoparticles", "amphotericin B conjugated thiohexuronic acid stabilized gold nanoparticles", "amphotericin B conjugated thiohexuronic acid—gold nanoparticles", "amphotericin B conjugated thiohexuronic acid coated gold nanoparticles", "amphotericin B conjugated thiohexuronic acid connected gold nanoparticles" as disclosed herein, except where otherwise indicated.

The wording "the thiopenturonic acid molecules stabilize the gold nanoparticle core" means that the thiopenturonic molecules, originating by oxidation of the hydroxy group of thiopentose, act as capping agents for gold nanoparticles that stabilize the gold nanoparticles and prevents aggregation before, during and after gold nanoparticle formation processes. Thus the wording "the thiopenturonic acid molecules stabilize the gold nanoparticle core" means also that the thiopentose molecules stabilize the gold nanoparticle core. Thus the expressions "thiopentose stabilized gold nanoparticles", "thiopentose gold nanoparticles", "thiopenturonic acid stabilized gold nanoparticles", "thiopenturonic acid—gold nanoparticles", "thiopenturonic acid coated gold nanoparticles", "thiopenturonic acid connected gold nanoparticles" are used interchangeably to indicate the gold nanoparticles disclosed herein produced by reduction of aurochloric acid in presence of thiopentoses, as described in details in the method section. Thus, the wording "amphotericin B conjugated gold nanoparticles" defines the nanoparticles disclosed herein and has the same meaning as "amphotericin B conjugated thiopentose stabilized gold nanoparticles", "amphotericin B conjugated thiopentose gold nanoparticles", "amphotericin B conjugated thiopenturonic acid stabilized gold nanoparticles", "amphotericin B conjugated thiopenturonic acid—gold nanoparticles", "amphotericin B conjugated thiopenturonic acid coated gold nanoparticles", "amphotericin B conjugated thiopenturonic acid connected gold nanoparticles" as disclosed herein, except where otherwise indicated.

In a preferred embodiment, the source of gold is preferably a source of gold (III), and most preferably aurochloric acid ($HAuCl_4$). In another embodiment, it is envisaged that the present disclosure may be adapted to incorporate other sources of gold (III) in addition to aurochloric acid including, but not limited to, gold (III) chloride hydrate, gold (III) chloride, gold (III) chloride trihydrate, gold (III) bromide, gold (III) oxide hydrate, gold (III) sulfide, gold (III) hydroxide, potassium gold (III) chloride, trichloro(pyridine)gold (III) and mixtures thereof.

Thus, the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible, and
wherein the amphotericin B conjugated gold nanoparticles have a particle size range comprised between 5 nm-12 nm.

Thus, the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible, and
wherein the amphotericin B conjugated gold nanoparticles have a particle size range comprised between 5 nm-12 nm, as measured by atomic force microscopy.

Thus, the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible, and
wherein the amphotericin B conjugated gold nanoparticles have a particle diameter range comprised between 5 nm-12 nm, as measured by atomic force microscopy.

In particular, the present invention is directed to amphotericin B conjugated gold nanoparticles, comprising:
a gold nanoparticle core having a surface,
thiohexuronic acid molecules connected to the surface of the gold nanoparticle core and stabilizing the gold nanoparticle core,
at least one amphotericin B molecule, wherein one amphotericin B molecule is covalently bound to one of the thiohexuronic acid molecules via covalent linkage of the amino group of the amphotericin B molecule and the carboxylic acid group of the thiohexuronic acid molecule, wherein the amphotericin B conjugated gold nanoparticles are water dispersible, and
wherein the amphotericin B conjugated gold nanoparticles have a particle size range comprised between 5 nm-12 nm.

Also in particular, the present invention is directed to amphotericin B conjugated gold nanoparticles, comprising:
a gold nanoparticle core having a surface,
thiopenturonic acid molecules connected to the surface of the gold nanoparticle core and stabilizing the gold nanoparticle core,
at least one amphotericin B molecule, wherein one amphotericin B molecule is covalently bound to one of the thiopenturonic acid molecules via covalent linkage of the amino group of the amphotericin B molecule and the carboxylic acid group of the thiopenturonic acid molecule,
wherein the amphotericin B conjugated gold nanoparticles are water dispersible, and
wherein the amphotericin B conjugated gold nanoparticles have a particle size range comprised between 5 nm-12 nm.

In a preferred embodiment, the present invention is directed to amphotericin B conjugated gold nanoparticles, comprising:
a gold nanoparticle core having a surface,
thioglucuronic acid molecules connected to the surface of the gold nanoparticle core and stabilizing the gold nanoparticle core,
at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
wherein the amphotericin B conjugated gold nanoparticles are water dispersible,
wherein the amphotericin B conjugated gold nanoparticles have a particle size range comprised between 5 nm-12 nm.

In a further embodiment, the present invention is directed to amphotericin B conjugated gold nanoparticles, comprising:
a gold nanoparticle core having a surface,
thiomannuronic acid molecules connected to the surface of the gold nanoparticle core and stabilizing the gold nanoparticle core,
at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
wherein the amphotericin B conjugated gold nanoparticles are water dispersible,
wherein the amphotericin B conjugated gold nanoparticles have a particle size range comprised between 5 nm-12 nm.

More in particular, the present invention is directed to amphotericin B conjugated thiohexose or thiopentose stabilized gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm.

More in particular, the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm,
wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid, or
wherein the thiopenturonic acid is selected from the group comprising thioarabinuronic acid, thioxyluronic acid, thiolyxuronic acid, and thioriburonic acid.

In other words, the present invention is directed to amphotericin B conjugated thiohexose or thiopentose stabilized gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm,
wherein the thiohexose is selected from the group comprising thioallose, thioaltrose, thiogulose, thiotalose, thiogalactose, thioidose, thioglucose, thiomannose, or
wherein the thiopentose is selected from the group comprising thioarabinose, thioxylose, thiolyxose, and thioribose.

In one embodiment, the present invention is directed to amphotericin B conjugated gold nanoparticles, comprising:
a gold nanoparticle core having a surface,
thiohexuronic acid molecules connected to the surface of the gold nanoparticle core and stabilizing the gold nanoparticle core, at least one amphotericin B molecule, wherein one amphotericin B molecule is covalently bound to one of the thiohexuronic acid molecules via covalent linkage of the amino group of the amphotericin B molecule and the carboxylic acid group of the thiohexuronic acid molecule, wherein the amphotericin B conjugated gold nanoparticles are water dispersible, wherein the amphotericin B conjugated gold nanoparticles have a particle size range comprised between 5 nm-12 nm, and wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid.

In a further embodiment, the present invention is directed to amphotericin B conjugated gold nanoparticles, comprising:

a gold nanoparticle core having a surface, thiopenturonic acid molecules connected to the surface of the gold nanoparticle core and stabilizing the gold nanoparticle core, at least one amphotericin B molecule, wherein one amphotericin B molecule is covalently bound to one of the thiopenturonic acid molecules via covalent linkage of the amino group of the amphotericin B molecule and the carboxylic acid group of the thiopenturonic acid molecule, wherein the amphotericin B conjugated gold nanoparticles are water dispersible, wherein the amphotericin B conjugated gold nanoparticles have a particle size range comprised between 5 nm-12 nm, wherein the thiopenturonic acid is selected from the group comprising thioarabinuronic acid, thioxyluronic acid, thiolyxuronic acid, and thioriburonic acid.

Slightly reworded, the present invention discloses amphotericin B conjugated gold nanoparticles, comprising:

a gold nanoparticle core having a surface, thiohexuronic acid or thiopenturonic acid molecules linked to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the amphotericin B conjugated gold nanoparticles are water dispersible, wherein the amphotericin B conjugated gold nanoparticles have a particle size range comprised between 5 nm-12 nm.

Also in other words, the present invention discloses amphotericin B conjugated thiohexose or thiopentose stabilized gold nanoparticles, comprising:

a gold nanoparticle core having a surface, thiohexuronic acid or thiopenturonic acid molecules linked to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the amphotericin B conjugated gold nanoparticles are water dispersible, wherein the amphotericin B conjugated gold nanoparticles have a particle size range comprised between 5 nm-12 nm.

More in particular, the present invention relates to amphotericin B conjugated gold nanoparticles, comprising:

a gold nanoparticle core having a surface, thiohexuronic acid or thiopenturonic molecules connected to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of amphotericin B molecule and the carboxylic acid group of the thiohexuronic acid or thiopenturonic acid molecule, wherein the amphotericin B conjugated gold nanoparticles are water dispersible, wherein the amphotericin B conjugated gold nanoparticles have a particle size range comprised between 5 nm-12 nm, and wherein the molar ratio of gold nanoparticle to amphotericin B is comprised between 1:1 to 1:20.

Still more in particular, the present invention relates to amphotericin B conjugated gold nanoparticles, comprising:

a gold nanoparticle core having a surface, thiohexuronic acid or thiopenturonic acid molecules connected to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the amphotericin B conjugated gold nanoparticles are water dispersible, and wherein the amphotericin B conjugated gold nanoparticles have a Zeta potential ranging from −25 to −35 mV.

The present invention further relates to amphotericin B conjugated gold nanoparticles, comprising:

a gold nanoparticle core having a surface, thiohexuronic acid or thiopenturonic acid molecules connected to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the amphotericin B conjugated gold nanoparticles are water dispersible, wherein the amphotericin B conjugated gold nanoparticles have a particle size range comprised between 5 nm-12 nm, and wherein the amphotericin B conjugated gold nanoparticles have a Zeta potential ranging from −25 to −35 mV.

The present invention also relates to amphotericin B conjugated gold nanoparticles, comprising:
- a gold nanoparticle core having a surface,
- thiohexuronic acid or thiopenturonic acid molecules connected to the surface of the gold nanoparticle core and stabilizing the gold nanoparticle core,
- at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid,
- wherein the amphotericin B conjugated gold nanoparticles are water dispersible,
- wherein the amphotericin B conjugated gold nanoparticles have a particle size range comprised between 5-12 nm,
- wherein the molar ratio of gold nanoparticle to amphotericin B is comprised between 1:1 to 1:20,
- and wherein the amphotericin B conjugated gold nanoparticles have a Zeta potential ranging from −25 to −35 mV.

One preferred embodiment of the present invention discloses amphotericin B conjugated thioglucose stabilized gold nanoparticles, comprising:
- a gold nanoparticle core having a surface,
- thioglucuronic acid molecules connected to the surface of the gold nanoparticle core and stabilizing the gold nanoparticle core,
- at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
- wherein the amphotericin B conjugated gold nanoparticles are water dispersible,
- wherein the amphotericin B conjugated gold nanoparticles have a particle size range comprised between 5 nm-12 nm.

A particularly preferred embodiment of the present invention relates to amphotericin B conjugated gold nanoparticles, comprising:
- a gold nanoparticle core having a surface,
- thioglucuronic acid molecules connected to the surface of the gold nanoparticle core and stabilizing the gold nanoparticle core,
- at least one amphotericin B molecule, wherein one amphotericin B molecule is covalently bound to one of the thioglucuronic acid molecules via covalent linkage of the amino group of amphotericin B molecule and the carboxylic acid group of the thioglucuronic acid molecule,
- wherein the amphotericin B conjugated gold nanoparticles are water dispersible,
- wherein the amphotericin B conjugated gold nanoparticles have a particle size range comprised between 5 nm-12 nm, and
- wherein the molar ratio of gold nanoparticle to amphotericin B is comprised between 1:1 to 1:20.

A more particularly preferred embodiment of the present invention relates to amphotericin B conjugated gold nanoparticles, comprising:
- a gold nanoparticle core having a surface,
- thioglucuronic acid molecules connected to the surface of the gold nanoparticle core and stabilizing the gold nanoparticle core,
- at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
- wherein the amphotericin B conjugated gold nanoparticles are water dispersible, and wherein the amphotericin B conjugated gold nanoparticles have a Zeta potential ranging from −25 to −35 mV.

The present invention further relates to amphotericin B conjugated gold nanoparticles, comprising:
- a gold nanoparticle core having a surface,
- thioglucuronic acid molecules connected to the surface of the gold nanoparticle core and stabilizing the gold nanoparticle core,
- at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
- wherein the amphotericin B conjugated gold nanoparticles are water dispersible,
- wherein the amphotericin B conjugated gold nanoparticles have a particle size range comprised between 5 nm-12 nm,
- and wherein the amphotericin B conjugated gold nanoparticles have a Zeta potential ranging from −25 to −35 mV.

The present invention also relates to amphotericin B conjugated gold nanoparticles, comprising:
- a gold nanoparticle core having a surface,
- thioglucuronic acid molecules connected to the surface of the gold nanoparticle core and stabilizing the gold nanoparticle core,
- at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid,
- wherein the amphotericin B conjugated gold nanoparticles are water dispersible,
- wherein the amphotericin B conjugated gold nanoparticles have a particle size range comprised between 5 nm-12 nm,
- wherein the molar ratio of gold nanoparticle to amphotericin B is comprised between 1:1 to 1:20,
- and wherein the amphotericin B conjugated gold nanoparticles have a Zeta potential ranging from −25 to −35 mV.

A further embodiment of the present invention discloses amphotericin B conjugated thiomannose stabilized gold nanoparticles, comprising:
- a gold nanoparticle core having a surface,
- thiomannuronic acid molecules connected to the surface of the gold nanoparticle core and stabilizing the gold nanoparticle core,
- at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
- wherein the amphotericin B conjugated gold nanoparticles are water dispersible, wherein the amphotericin B conjugated gold nanoparticles have a particle size range comprised between 5 nm-12 nm.

More in particular, the present invention relates to amphotericin B conjugated gold nanoparticles, comprising:
a gold nanoparticle core having a surface,
thiomannuronic acid molecules connected to the surface of the gold nanoparticle core and stabilizing the gold nanoparticle core,
at least one amphotericin B molecule, wherein one amphotericin B molecule is covalently bound to one of the thiomannuronic acid molecules via covalent linkage of the amino group of amphotericin B molecule and the carboxylic acid group of the thiomannuronic acid molecule,
wherein the amphotericin B conjugated gold nanoparticles are water dispersible,
wherein the amphotericin B conjugated gold nanoparticles have a particle size range comprised between 5 nm-12 nm, and wherein the molar ratio of gold nanoparticle to amphotericin B is comprised between 1:1 to 1:20.

Still more in particular, the present invention relates to amphotericin B conjugated gold nanoparticles, comprising:
a gold nanoparticle core having a surface,
thiomannuronic acid molecules connected to the surface of the gold nanoparticle core and stabilizing the gold nanoparticle core,
at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
wherein the amphotericin B conjugated gold nanoparticles are water dispersible,
and wherein the amphotericin B conjugated gold nanoparticles have a Zeta potential ranging from −25 to −35 mV.

The present invention further relates to amphotericin B conjugated gold nanoparticles, comprising:
a gold nanoparticle core having a surface,
thiomannuronic acid molecules connected to the surface of the gold nanoparticle core and stabilizing the gold nanoparticle core,
at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
wherein the amphotericin B conjugated gold nanoparticles are water dispersible,
wherein the amphotericin B conjugated gold nanoparticles have a particle size range comprised between 5 nm-12 nm,
and wherein the amphotericin B conjugated gold nanoparticles have a Zeta potential ranging from −25 to −35 mV.

The present invention also relates to amphotericin B conjugated gold nanoparticles, comprising:
a gold nanoparticle core having a surface,
thiomannuronic acid molecules connected to the surface of the gold nanoparticle core and stabilizing the gold nanoparticle core,
at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
wherein the amphotericin B conjugated gold nanoparticles are water dispersible,
wherein the amphotericin B conjugated gold nanoparticles have a particle size range comprised between 5 nm-12 nm,
wherein the molar ratio of gold nanoparticle to amphotericin B is comprised between 1:1 to 1:20,
and wherein the amphotericin B conjugated gold nanoparticles have a Zeta potential ranging from −25 to −35 mV.

Uses of the Inventive Nanoparticles

The inventors have found that amphotericin B conjugated to thioglucose stabilized gold nanoparticles is much more active than free amphotericin B against fungal infection. In particular, it has been shown (Table 1) that amphotericin B conjugated to thioglucose stabilized gold nanoparticles is more active than free amphotericin B against the following fungal strains: *Aspergillus* sp, *C. albicans, C. tropicalis, C. gatti*, and *C. neoformans*.

Importantly, the inventive amphotericin B bound thioglucose stabilized gold nanoparticles are not toxic for red blood cells and mammal cells up to very high concentration of 50-64 µg/ml (FIG. 12, 13), whereas free amphotericin B is toxic also at low concentrations.

Moreover, the amphotericin B bound thioglucose stabilized gold nanoparticles show the advantage to be water dispersible, and stable when conserved at a defined temperature comprised between 2 and 8 degrees Celsius, whereas free amphotericin B is not water soluble and poor stable.

Thus, one embodiment of the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm, for use in treatment of a fungal infection.

A particular embodiment of the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the amphotericin B conjugated gold nanoparticles are water dispersible,
wherein the amphotericin B conjugated gold nanoparticles have a particle size range comprised between 5 nm-12 nm,
for use in treatment of a fungal infection, wherein the fungal infection is selected from the group consisting of *Aspergillus fumicatus* infection, *Candida albicans* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

A more particular embodiment of the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm,
for use in treatment of a fungal infection, wherein the fungal infection is selected from the group consisting of *Aspergillus fumicatus* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

Another embodiment of the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm, for use in treatment of *leishmania* infections.

Another particular embodiment of the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm, for use in treatment of *leishmania* infections, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Still another particular embodiment of the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the amphotericin B conjugated gold nanoparticles are water dispersible,
wherein the amphotericin B conjugated gold nanoparticles have a particle size range comprised between 5 nm-12 nm, for use in treatment of *leishmania* infections, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Another more particular embodiment of the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the thiohexuronic acid is selected from the group comprising thioalluronic acid, thioaltruronic acid, thioguluronic acid, thioaluronic acid, thiogalacturonic acid, thioiduronic acid, thioglucuronic acid, and thiomannuronic acid, or wherein the thiopenturonic acid is selected from the group comprising thioarabinuronic acid, thioxyluronic acid, thiolyxuronic acid, and thioriburonic acid, wherein the amphotericin B conjugated gold nanoparticles are water dispersible, wherein the amphotericin B conjugated gold nanoparticles have a particle size range comprised between 5 nm-12 nm, for use in treatment of a fungal infection.

A still more particular embodiment of the present invention is directed to amphotericin B conjugated gold nanoparticles, comprising:

a gold nanoparticle core having a surface, thiohexuronic acid or thiopenturonic acid molecules connected to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid, or wherein the thiopenturonic acid is selected from the group comprising thioarabinuronic acid, thioxyluronic acid, thiolyxuronic acid, and thioriburonic acid, wherein the amphotericin B conjugated gold nanoparticles are water dispersible, wherein the amphotericin B conjugated gold nanoparticles have a particle size range comprised between 5 nm-12 nm, for use in treatment of a fungal infection, wherein the fungal infection is selected from the group consisting of *Aspergillus fumicatus* infection, *Candida albicans* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

A further more particular embodiment of the present invention is directed to amphotericin B conjugated gold nanoparticles, comprising:

a gold nanoparticle core having a surface, thiohexuronic acid or thiopenturonic acid molecules connected to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid, or wherein the thiopenturonic acid is selected from the group comprising thioarabinuronic acid, thioxyluronic acid, thiolyxuronic acid, and thioriburonic acid, wherein the amphotericin B conjugated gold nanoparticles are water dispersible, wherein the amphotericin B conjugated gold nanoparticles have a particle size range comprised between 5 nm-12 nm, for use in treatment of a fungal infection, wherein the fungal infection is selected from the group consisting of *Aspergillus fumicatus* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

Another embodiment of the present invention is directed to amphotericin B conjugated gold nanoparticles, comprising:

a gold nanoparticle core having a surface, thiohexuronic acid or thiopenturonic acid molecules connected to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid, or wherein the thiopenturonic acid is selected from the group comprising thioarabinuronic acid, thioxyluronic acid, thiolyxuronic acid, and thioriburonic acid, wherein the amphotericin B conjugated gold nanoparticles are water dispersible, wherein the amphotericin B conjugated gold nanoparticles have a particle size range comprised between 5 nm-12 nm, for use in treatment of *leishmania* infections.

Another particular embodiment of the present invention is directed to amphotericin B conjugated gold nanoparticles, comprising:

a gold nanoparticle core having a surface, thiohexuronic acid or thiopenturonic acid molecules connected to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid, or wherein the thiopenturonic acid is selected from the group comprising thioarabinuronic acid, thioxyluronic acid, thiolyxuronic acid, and thioriburonic acid, wherein the amphotericin B conjugated gold nanoparticles are water dispersible, wherein the amphotericin B conjugated gold nanoparticles have a particle size range comprised between 5 nm-12 nm,
for use in treatment of *leishmania* infections, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Still another particular embodiment of the present invention is directed to amphotericin B conjugated gold nanoparticles, comprising:
a gold nanoparticle core having a surface,
thiohexuronic acid or thiopenturonic acid molecules connected to the surface of the gold nanoparticle core and stabilizing the gold nanoparticle core,
at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid, or
wherein the thiopenturonic acid is selected from the group comprising thioarabinuronic acid, thioxyluronic acid, thiolyxuronic acid, and thioriburonic acid,
wherein the amphotericin B conjugated gold nanoparticles are water dispersible,
wherein the amphotericin B conjugated gold nanoparticles have a particle size range comprised between 5 nm-12 nm, for use in treatment of *leishmania* infections, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

A preferred embodiment of the present invention is directed to amphotericin B conjugated gold nanoparticles, comprising:
a gold nanoparticle core having a surface,
thioglucuronic acid molecules connected to the surface of the gold nanoparticle core and stabilizing the gold nanoparticle core,
at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
wherein the amphotericin B conjugated gold nanoparticles are water dispersible,
wherein the amphotericin B conjugated gold nanoparticles have a particle size range comprised between 5 nm-12 nm, for use in treatment of a fungal infection.

A particularly preferred embodiment of the present invention is directed to amphotericin B conjugated gold nanoparticles, comprising:
a gold nanoparticle core having a surface,
thioglucuronic acid molecules connected to the surface of the gold nanoparticle core and stabilizing the gold nanoparticle core,
at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
wherein the amphotericin B conjugated gold nanoparticles are water dispersible,
wherein the amphotericin B conjugated gold nanoparticles have a particle size range comprised between 5 nm-12 nm, for use in treatment of a fungal infection,
wherein the fungal infection is selected from the group consisting of *Aspergillus fumicatus* infection, *Candida albicans* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

A more particularly preferred embodiment of the present invention is directed to amphotericin B conjugated gold nanoparticles, comprising:
a gold nanoparticle core having a surface,
thioglucuronic acid molecules connected to the surface of the gold nanoparticle core,
at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
wherein the amphotericin B conjugated gold nanoparticles are water dispersible,
wherein the amphotericin B conjugated gold nanoparticles have a particle size range comprised between 5 nm-12 nm, for use in treatment of a fungal infection,
wherein the fungal infection is selected from the group consisting of *Aspergillus fumicatus* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

Another preferred embodiment of the present invention is directed to amphotericin B conjugated gold nanoparticles, comprising:
a gold nanoparticle core having a surface,
thioglucuronic acid molecules connected to the surface of the gold nanoparticle core and stabilizing the gold nanoparticle core,
at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
wherein the amphotericin B conjugated gold nanoparticles are water dispersible, wherein the amphotericin B conjugated gold nanoparticles have a particle size range comprised between 5 nm-12 nm, for use in treatment of *leishmania* infections.

Another particularly preferred embodiment of the present invention is directed to amphotericin B conjugated gold nanoparticles, comprising:

a gold nanoparticle core having a surface, thioglucuronic acid molecules connected to the surface of the gold nanoparticle core and stabilizing the gold nanoparticle core, at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule, wherein the amphotericin B conjugated gold nanoparticles are water dispersible, wherein the amphotericin B conjugated gold nanoparticles have a particle size range comprised between 5 nm-12 nm, for use in treatment of *leishmania* infections, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Still another particularly preferred embodiment of the present invention is directed to amphotericin B conjugated gold nanoparticles, comprising:

a gold nanoparticle core having a surface, thioglucuronic acid molecules connected to the surface of the gold nanoparticle core and stabilizing the gold nanoparticle core, at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule, wherein the amphotericin B conjugated gold nanoparticles are water dispersible, wherein the amphotericin B conjugated gold nanoparticles have a particle size range comprised between 5 nm-12 nm, for use in treatment of *leishmania* infections, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Another embodiment of the present invention is directed to amphotericin B conjugated gold nanoparticles, comprising:

a gold nanoparticle core having a surface, thiomannuronic acid molecules connected to the surface of the gold nanoparticle core and stabilizing the gold nanoparticle core, at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule, wherein the amphotericin B conjugated gold nanoparticles are water dispersible, wherein the amphotericin B conjugated gold nanoparticles have a particle size range comprised between 5 nm-12 nm, for use in treatment of a fungal infection.

A particular embodiment of the present invention is directed to amphotericin B conjugated gold nanoparticles, comprising:

a gold nanoparticle core having a surface, thiomannuronic acid molecules connected to the surface of the gold nanoparticle core and stabilizing the gold nanoparticle core, at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule, wherein the amphotericin B conjugated gold nanoparticles are water dispersible, wherein the amphotericin B conjugated gold nanoparticles have a particle size range comprised between 5 nm-12 nm, for use in treatment of a fungal infection, wherein the fungal infection is selected from the group consisting of *Aspergillus fumicatus* infection, *Candida albicans* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

A more particular embodiment of the present invention is directed to amphotericin B conjugated gold nanoparticles, comprising:

a gold nanoparticle core having a surface, thiomannuronic acid molecules connected to the surface of the gold nanoparticle core, at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule, wherein the amphotericin B conjugated gold nanoparticles are water dispersible, wherein the amphotericin B conjugated gold nanoparticles have a particle size range comprised between 5 nm-12 nm, for use in treatment of a fungal infection, wherein the fungal infection is selected from the group consisting of *Aspergillus fumicatus* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

Another embodiment of the present invention is directed to amphotericin B conjugated gold nanoparticles, comprising:
- a gold nanoparticle core having a surface,
- thiomannuronic acid molecules connected to the surface of the gold nanoparticle core and stabilizing the gold nanoparticle core,
- at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
- wherein the amphotericin B conjugated gold nanoparticles are water dispersible,
- wherein the amphotericin B conjugated gold nanoparticles have a particle size range comprised between 5 nm-12 nm, for use in treatment of *leishmania* infections.

Another particular embodiment of the present invention is directed to amphotericin B conjugated gold nanoparticles, comprising:
- a gold nanoparticle core having a surface,
- thiomannuronic acid molecules connected to the surface of the gold nanoparticle core and stabilizing the gold nanoparticle core,
- at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
- wherein the amphotericin B conjugated gold nanoparticles are water dispersible,
- wherein the amphotericin B conjugated gold nanoparticles have a particle size range comprised between 5 nm-12 nm, for use in treatment of *leishmania* infections, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Still another particular embodiment of the present invention is directed to amphotericin B conjugated gold nanoparticles, comprising:
- a gold nanoparticle core having a surface,
- thiomannuronic acid molecules connected to the surface of the gold nanoparticle core and stabilizing the gold nanoparticle core,
- at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
- wherein the amphotericin B conjugated gold nanoparticles are water dispersible,
- wherein the amphotericin B conjugated gold nanoparticles have a particle size range comprised between 5 nm-12 nm, for use in treatment of *leishmania* infections, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Pharmaceutical Compositions

The nanoparticles described herein may be used in the preparation of a pharmaceutical composition, by combining the amphotericin B conjugated thiohexose or thiopentose stabilized gold nanoparticles described herein with a pharmaceutical acceptable vehicle, excipient, and/or diluent known in the art. In some embodiments, the pharmaceutical composition includes the amphotericin B conjugated thiohexose or thiopentose stabilized gold nanoparticles and a vehicle. In some embodiments, the pharmaceutical composition includes the amphotericin B conjugated thiohexose or thiopentose stabilized gold nanoparticles described herein and a vehicle and a second drug. In some embodiments, the second drug comprises an agent selected from flucytosine, fluconazole, and paromomycin.

"Pharmaceutical composition" refers to a preparation in a form that allows the biological activity of the active ingredient (s) to be effective, and which contain no additional components which are toxic to the subjects to which the formulation is administered.

As used herein, by "pharmaceutically acceptable" or "pharmacologically compatible" is meant a material that is not biologically or otherwise undesirable, e.g., the material may be incorporated into a pharmaceutical composition administered to a patient without causing any significant undesirable biological effects or interacting in a deleterious manner with any of the other components of the composition in which it is contained. Pharmaceutically acceptable carriers or excipients have preferably met the required standards of toxicological and manufacturing testing and/or are included on the Inactive Ingredient Database prepared by the U.S. Food and Drug administration www.accessdata.fda-.gov/scripts/cder/iig/index.

The pharmaceutical composition is designed to facilitate the administering of amphotericin B conjugated thiohexose or thiopentose stabilized gold nanoparticles of this invention in an effective manner. Generally a composition of this invention will comprise amphotericin B conjugated thiohexose or thiopentose stabilized gold nanoparticles dissolved or dispersed in the pharmaceutically acceptable excipient.

"Pharmaceutically acceptable vehicle" refers to an ingredient in a pharmaceutical formulation, other than an active ingredient, which is nontoxic to the subject to whom it is administered. A pharmaceutically acceptable vehicle includes, but is not limited to, a buffer, stabilizer, or preservative.

Examples of suitable vehicles or excipients include, without limitation, lactose, dextrose, sucrose, glucose, powdered sugar, sorbitol, mannitol, xylitol, starches, acacia gum, xanthan gum, guar gum, tara gum, mesquite gum, fenugreek gum, locust bean gum, ghatti gum, tragacanth gum, inositol, molasses, maltodextrin, extract of Irish moss, panwar gum, mucilage of isapol husks, Veegum, larch arabogalactan, calcium silicate, calcium phosphate, dicalcium phosphate, calcium sulfate, kaolin, sodium chloride, polyethylene glycol, alginates, gelatine, microcrystalline cellulose, polyvinylpyrrolidone, cellulose, water, saline, syrup, methylcellulose, ethylcellulose, hydroxypropylmethylcellulose, carboxymethylcellulose, polyacrylic acids such as Carbopols, such as Carbopol941, Carbopol980, Carbopol981, and gum bases such as Pharmagum™ (SPI Pharma Group; New Castle, Del.), and similar. Typically, the compositions of the present invention comprise from about 10% to about 90% by weight of the vehicle, the excipient or combinations thereof.

Preferably, the pharmaceutical composition contains from about 0.001% to about 90%, preferably from about 0.01% to about 75%, more preferably from about 0.1% to 50%, and still more preferably from about 0.1% to 10% by weight of the amphotericin B conjugated thiohexose or thiopentose stabilized gold nanoparticles of the present invention, with the remainder consisting of suitable pharmaceutical vehicles, excipients, and/or diluents.

To increase stability by increasing the negative zeta potential of nanoparticles, certain negatively charged components may be added. Such negatively charged components include, but are not limited to bile salts, bile acids, glycocholic acid, cholic acid, chenodeoxycholic acid, taurocholic acid, glycochenodeoxycholic acid, taurochenodeoxycholic acid, litocholic acid, ursodeoxycholic acid, dehydrocholic acid, and others; phospholipids including lecithin (egg yolk) based phospholipids which include the following phosphatidylcholines: palmitoyloleoylphosphatidylcholine, palmitoyllinoleoylphosphatidylcholine, stearoyllinoleoylphosphatidylcholine, stearoyloleoylphosphatidylcholine, stearoylarachidoylphosphatidylcholine, and dipalmitoylphosphatidylcholine. Other phospholipids including L-α-dimyristoylphosphatidylcholine (DMPC), dioleoylphosphatidylcholine (DOPC), distearoylphosphatidylcholine (DSPC), hydrogenated soy phosphatidylcholine (HSPC), and other related compounds. Negatively charged surfactants or emulsifiers are also suitable as excipients, e.g., sodium cholesteryl sulfate and the like.

In some embodiments, the pharmaceutical composition is suitable for administration to a human. In some embodiments, the pharmaceutical composition is suitable for administration to a mammal such as, in the veterinary context, domestic pets and in particular dogs, and agricultural animals.

The pharmaceutical composition can be formulated into powders, granules, tablets, capsules, suspensions, emulsions, syrups, oral dosage form, external preparation, suppository or in the form of sterile injectable solutions, such as aerosolized in a usual manner, respectively. When formulated, it can be prepared using a diluent or excipient such as generally used fillers, extenders, binders, wetting agents, disintegrating agents, surface active agents.

In the pharmaceutical composition, the solid preparation for oral administration may be a tablet, pill, powder, granule, or capsule. The solid preparation may further comprise an excipient. Excipients may be, for example, starch, calcium carbonate, sucrose, lactose, or gelatine. In addition, the solid preparation may further comprise a lubricant, such as magnesium stearate, or talc. In the pharmaceutical composition, liquid preparations for oral administration may be best suspensions, solutions, emulsions, or syrups. The liquid formulation may comprise water, or liquid paraffin. The liquid formulation may, for excipients, for example, include wetting agents, sweeteners, aromatics or preservatives.

Tablet forms can include one or more of lactose, mannitol, corn starch, potato starch, microcrystalline cellulose, acacia, gelatin, colloidal silicon dioxide, croscarmellose sodium, talc, magnesium stearate, stearic acid, and other excipients, colorants, diluents, buffering agents, moistening agents, preservatives, flavoring agents, and pharmacologically compatible excipients. Lozenge forms can comprise the active ingredient in a flavor, usually sucrose and acacia or tragacanth, as well as pastilles comprising the active ingredient in an inert base, such as gelatin and glycerin, or sucrose and acacia, emulsions, gels, and the like containing, in addition to the active ingredient, such excipients as are known in the art.

The nanoparticles of this invention can be enclosed in a hard or soft capsule, can be compressed into tablets, or can be incorporated with beverages or food or otherwise incorporated into the diet. Capsules can be formulated by mixing the nanoparticles with an inert pharmaceutical diluent and inserting the mixture into a hard gelatin capsule of the appropriate size. If soft capsules are desired, a slurry of the nanoparticles with an acceptable vegetable oil, light petroleum or other inert oil can be encapsulated by machine into a gelatin capsule.

Pharmaceutical compositions suitable for parenteral administration include aqueous and non-aqueous, isotonic sterile injection solutions, which can contain anti-oxidants, buffers, bacteriostats, and solutes that render the formulation compatible with the blood of the intended recipient, and aqueous and non-aqueous sterile suspensions that can include suspending agents, solubilizers, thickening agents, stabilizing agents, emulsifier, and preservatives. Examples of useful non-aqueous solvents include propylene glycol, polyethylene glycol, vegetable oil, fish oil, and injectable organic esters.

Pharmaceutical compositions suitable for aerosol administration comprising the inventive nanoparticles include aqueous and non-aqueous, isotonic sterile solutions, which can contain anti-oxidants, buffers, bacteriostats, and solutes, as well as aqueous and non-aqueous sterile suspensions that can include suspending agents, solubilizers, thickening agents, stabilizing agents, and preservatives, alone or in combination with other suitable components, which can be made into aerosol formulations to be administered via inhalation. These aerosol formulations can be placed into pressurized acceptable propellants, such as dichlorodifluoromethane, propane, nitrogen, and the like. They also can be formulated as pharmaceuticals for non-pressured preparations, such as in a nebulizer or an atomizer.

Thus, an embodiment of the present invention is directed to a pharmaceutical composition comprising amphotericin B conjugated gold nanoparticles, comprising:

a gold nanoparticle core having a surface, thiohexuronic or thiopenturonic acid molecules connected to the surface of the gold nanoparticle core and stabilizing the gold nanoparticle core, at least one amphotericin B molecule, wherein one amphotericin B molecule is covalently bound to one of the thiohexuronic or thiopenturonic acid molecules via covalent linkage of the amino group of the amphotericin B molecule and the carboxylic acid group of the thiohexuronic or thiopenturonic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent.

A further embodiment of the present invention is directed to a pharmaceutical composition comprising amphotericin B conjugated gold nanoparticles, comprising:
- a gold nanoparticle core having a surface,
- thiohexuronic or thiopenturonic acid molecules connected to the surface of the gold nanoparticle core and stabilizing the gold nanoparticle core,
- at least one amphotericin B molecule, wherein one amphotericin B molecule is covalently bound to one of the thiohexuronic or thiopenturonic acid molecules via covalent linkage of the amino group of the amphotericin B molecule and the carboxylic acid group of the thiohexuronic or thiopenturonic acid molecule,
- wherein the amphotericin B conjugated gold nanoparticles are water dispersible,
- wherein the amphotericin B conjugated gold nanoparticles have a particle size range comprised between 5 nm-12 nm, together with at least one pharmaceutically acceptable vehicle, excipient and/or diluent, and further comprising a second drug.

A further embodiment of the present invention is directed to a pharmaceutical composition comprising amphotericin B conjugated gold nanoparticles, comprising:
- a gold nanoparticle core having a surface,
- thiohexuronic or thiopenturonic acid molecules connected to the surface of the gold nanoparticle core and stabilizing the gold nanoparticle core,
- at least one amphotericin B molecule, wherein one amphotericin B molecule is covalently bound to one of the thiohexuronic or thiopenturonic acid molecules via covalent linkage of the amino group of the amphotericin B molecule and the carboxylic acid group of the thiohexuronic or thiopenturonic acid molecule,
- wherein the amphotericin B conjugated gold nanoparticles are water dispersible,
- wherein the amphotericin B conjugated gold nanoparticles have a particle size range comprised between 5 nm-12 nm, together with at least one pharmaceutically acceptable vehicle, excipient and/or diluent, further comprising a second drug selected from flucytosine, fluconazole, paromomycin.

Thus, an embodiment of the present invention is directed to a pharmaceutical composition comprising amphotericin B conjugated gold nanoparticles, comprising:
- a gold nanoparticle core having a surface,
- thiohexuronic acid molecules connected to the surface of the gold nanoparticle core and stabilizing the gold nanoparticle core,
- at least one amphotericin B molecule, wherein one amphotericin B molecule is covalently bound to one of the thiohexuronic acid molecules via covalent linkage of the amino group of the amphotericin B molecule and the carboxylic acid group of the thiohexuronic acid molecule,
- wherein the amphotericin B conjugated gold nanoparticles are water dispersible,
- wherein the amphotericin B conjugated gold nanoparticles have a particle size range comprised between 5 nm-12 nm, together with at least one pharmaceutically acceptable vehicle, excipient and/or diluent.

A further embodiment of the present invention is directed to a pharmaceutical composition comprising amphotericin B conjugated gold nanoparticles, comprising:
- a gold nanoparticle core having a surface,
- thiohexuronic acid molecules connected to the surface of the gold nanoparticle core and stabilizing the gold nanoparticle core,
- at least one amphotericin B molecule, wherein one amphotericin B molecule is covalently bound to one of the thiohexuronic acid molecules via covalent linkage of the amino group of the amphotericin B molecule and the carboxylic acid group of the thiohexuronic acid molecule,
- wherein the amphotericin B conjugated gold nanoparticles are water dispersible,
- wherein the amphotericin B conjugated gold nanoparticles have a particle size range comprised between 5 nm-12 nm, together with at least one pharmaceutically acceptable vehicle, excipient and/or diluent, and further comprising a second drug.

A further embodiment of the present invention is directed to a pharmaceutical composition comprising amphotericin B conjugated gold nanoparticles, comprising:
- a gold nanoparticle core having a surface,
- thiohexuronic acid molecules connected to the surface of the gold nanoparticle core and stabilizing the gold nanoparticle core,
- at least one amphotericin B molecule, wherein one amphotericin B molecule is covalently bound to one of the thiohexuronic acid molecules via covalent linkage of the amino group of the amphotericin B molecule and the carboxylic acid group of the thiohexuronic acid molecule,
- wherein the amphotericin B conjugated gold nanoparticles are water dispersible,
- wherein the amphotericin B conjugated gold nanoparticles have a particle size range comprised between 5 nm-12 nm, together with at least one pharmaceutically acceptable vehicle, excipient and/or diluent, further comprising a second drug selected from flucytosine, fluconazole, paromomycin.

Thus, a particular embodiment of the present invention is directed to a pharmaceutical composition comprising amphotericin B conjugated gold nanoparticles, comprising:
- a gold nanoparticle core having a surface,
- thiohexuronic acid molecules connected to the surface of the gold nanoparticle core and stabilizing the gold nanoparticle core,
- at least one amphotericin B molecule, wherein one amphotericin B molecule is covalently bound to one of the thiohexuronic acid molecules via covalent linkage of the amino group of the amphotericin B molecule and the carboxylic acid group of the thiohexuronic acid molecule,
- wherein the amphotericin B conjugated gold nanoparticles are water dispersible,
- wherein the amphotericin B conjugated gold nanoparticles have a particle size range comprised between 5 nm-12 nm,
- wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid,
- together with at least one pharmaceutically acceptable vehicle, excipient and/or diluent.

A more particular embodiment of the present invention is directed to a pharmaceutical composition comprising amphotericin B conjugated gold nanoparticles, comprising:
- a gold nanoparticle core having a surface,
- thiohexuronic acid molecules connected to the surface of the gold nanoparticle core and stabilizing the gold nanoparticle core, at least one amphotericin B molecule, wherein one amphotericin B molecule is covalently bound to one of the thiohexuronic acid molecules via covalent linkage of the amino group of the amphotericin B molecule and the carboxylic acid group of the thiohexuronic acid molecule, wherein the amphotericin B conjugated gold nanoparticles are water dispersible, wherein the amphotericin B conjugated gold nanoparticles have a particle size range comprised between 5 nm-12 nm, wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid, together with at least one pharmaceutically acceptable vehicle, excipient and/or diluent, and further comprising a second drug.

A further particular embodiment of the present invention is directed to a pharmaceutical composition comprising amphotericin B conjugated gold nanoparticles, comprising:

a gold nanoparticle core having a surface, thiohexuronic acid molecules connected to the surface of the gold nanoparticle core and stabilizing the gold nanoparticle core, at least one amphotericin B molecule, wherein one amphotericin B molecule is covalently bound to one of the thiohexuronic acid molecules via covalent linkage of the amino group of the amphotericin B molecule and the carboxylic acid group of the thiohexuronic acid molecule, wherein the amphotericin B conjugated gold nanoparticles are water dispersible, wherein the amphotericin B conjugated gold nanoparticles have a particle size range comprised between 5 nm-12 nm, wherein the thiohexuronic acid is selected from the group comprising thioalluronic acid, thioaltruronic acid, thioguluronic acid, thiotaluronic acid, thiogalacturonic acid, thioiduronic acid, thioglucuronic acid, and thiomannuronic acid, together with at least one pharmaceutically acceptable vehicle, excipient and/or diluent, further comprising a second drug selected from flucytosine, fluconazole, paromomycin.

Another embodiment of the present invention is directed to a pharmaceutical composition comprising amphotericin B conjugated gold nanoparticles, comprising:

a gold nanoparticle core having a surface, thiopenturonic acid molecules connected to the surface of the gold nanoparticle core and stabilizing the gold nanoparticle core, at least one amphotericin B molecule, wherein one amphotericin B molecule is covalently bound to one of the thiopenturonic acid molecules via covalent linkage of the amino group of the amphotericin B molecule and the carboxylic acid group of the thiopenturonic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent.

A further embodiment of the present invention is directed to a pharmaceutical composition comprising amphotericin B conjugated gold nanoparticles, comprising:

a gold nanoparticle core having a surface, thiopenturonic acid molecules connected to the surface of the gold nanoparticle core and stabilizing the gold nanoparticle core, at least one amphotericin B molecule, wherein one amphotericin B molecule is covalently bound to one of the thiopenturonic acid molecules via covalent linkage of the amino group of the amphotericin B molecule and the carboxylic acid group of the thiopenturonic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent, and further comprising a second drug.

A further embodiment of the present invention is directed to a pharmaceutical composition comprising amphotericin B conjugated gold nanoparticles, comprising:

a gold nanoparticle core having a surface, thiopenturonic acid molecules connected to the surface of the gold nanoparticle core and stabilizing the gold nanoparticle core, at least one amphotericin B molecule, wherein one amphotericin B molecule is covalently bound to one of the thiopenturonic acid molecules via covalent linkage of the amino group of the amphotericin B molecule and the carboxylic acid group of the thiopenturonic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent, further comprising a second drug selected from flucytosine, fluconazole, paromomycin.

Another embodiment of the present invention is directed to a pharmaceutical composition comprising amphotericin B conjugated gold nanoparticles, comprising:

a gold nanoparticle core having a surface, thiopenturonic acid molecules connected to the surface of the gold nanoparticle core and stabilizing the gold nanoparticle core, at least one amphotericin B molecule, wherein one amphotericin B molecule is covalently bound to one of the thiopenturonic acid molecules via covalent linkage of the amino group of the amphotericin B molecule and the carboxylic acid group of the thiopenturonic acid molecule, wherein the amphotericin B conjugated gold nanoparticles are water dispersible, wherein the amphotericin B conjugated gold nanoparticles have a particle size range comprised between 5 nm-12 nm, wherein the thiopenturonic acid is selected from the group comprising thioarabinuronic acid, thioxyluronic acid, thiolyxuronic acid, and thioriburonic acid, together with at least one pharmaceutically acceptable vehicle, excipient and/or diluent.

Another further embodiment of the present invention is directed to a pharmaceutical composition comprising amphotericin B conjugated gold nanoparticles, comprising:

a gold nanoparticle core having a surface, thiopenturonic acid molecules connected to the surface of the gold nanoparticle core and stabilizing the gold nanoparticle core, at least one amphotericin B molecule, wherein one amphotericin B molecule is covalently bound to one of the thiopenturonic acid molecules via covalent linkage of the amino group of the amphotericin B molecule and the carboxylic acid group of the thiopenturonic acid molecule, wherein the amphotericin B conjugated gold nanoparticles are water dispersible, wherein the amphotericin B conjugated gold nanoparticles have a particle size range comprised between 5 nm-12 nm, wherein the thiopenturonic acid is selected from the group comprising thioarabinuronic acid, thioxyluronic acid, thiolyxuronic acid, and thioriburonic acid, together with at least one pharmaceutically acceptable vehicle, excipient and/or diluent, and further comprising a second drug.

A further embodiment of the present invention is directed to a pharmaceutical composition comprising amphotericin B conjugated gold nanoparticles, comprising:

a gold nanoparticle core having a surface, thiopenturonic acid molecules connected to the surface of the gold nanoparticle core and stabilizing the gold nanoparticle core, at least one amphotericin B molecule, wherein one amphotericin B molecule is covalently bound to one of the thiopenturonic acid molecules via covalent linkage of the amino group of the amphotericin B molecule and the carboxylic acid group of the thiopenturonic acid molecule, wherein the amphotericin B conjugated gold nanoparticles are water dispersible, wherein the amphotericin B conjugated gold nanoparticles have a particle size range comprised between 5 nm-12 nm, wherein the thiopenturonic acid is selected from the group comprising thioarabinuronic acid, thioxyluronic acid, thiolyxuronic acid, and thioriburonic acid, together with at least one pharmaceutically acceptable vehicle, excipient and/or diluent, further comprising a second drug selected from flucytosine, fluconazole, paromomycin.

A preferred embodiment of the present invention is directed to a pharmaceutical composition comprising amphotericin B conjugated gold nanoparticles, comprising:

a gold nanoparticle core having a surface, thioglucuronic acid molecules connected to the surface of the gold nanoparticle core and stabilizing the gold nanoparticle core, at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent.

A more preferred embodiment of the present invention is directed to a pharmaceutical composition comprising amphotericin B conjugated gold nanoparticles, comprising:

a gold nanoparticle core having a surface, thioglucuronic acid molecules connected to the surface of the gold nanoparticle core and stabilizing the gold nanoparticle core, at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent, and further comprising a second drug.

A still more preferred embodiment of the present invention is directed to a pharmaceutical composition comprising amphotericin B conjugated gold nanoparticles, comprising:

a gold nanoparticle core having a surface, thioglucuronic acid molecules connected to the surface of the gold nanoparticle core and stabilizing the gold nanoparticle core, at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent, further comprising a second drug selected from flucytosine, fluconazole, paromomycin.

Thus, an embodiment of the present invention is directed to a pharmaceutical composition comprising amphotericin B conjugated gold nanoparticles, comprising:

a gold nanoparticle core having a surface, thiomannuronic acid molecules connected to the surface of the gold nanoparticle core and stabilizing the gold nanoparticle core, at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent.

A further embodiment of the present invention is directed to a pharmaceutical composition comprising amphotericin B conjugated gold nanoparticles, comprising:

a gold nanoparticle core having a surface, thiomannuronic acid molecules connected to the surface of the gold nanoparticle core and stabilizing the gold nanoparticle core, at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent, and further comprising a second drug.

A further embodiment of the present invention is directed to a pharmaceutical composition comprising amphotericin B conjugated gold nanoparticles, comprising:

a gold nanoparticle core having a surface, thiomannuronic acid molecules connected to the surface of the gold nanoparticle core and stabilizing the gold nanoparticle core, at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule, wherein the amphotericin B conjugated gold nanoparticles are water dispersible, wherein the amphotericin B conjugated gold nanoparticles have a particle size range comprised between 5 nm-12 nm, together with at least one pharmaceutically acceptable vehicle, excipient and/or diluent, further comprising a second drug selected from flucytosine, fluconazole, paromomycin.

Process for producing the inventive nanoparticles One embodiment of the present invention is a process for producing amphotericin B conjugated gold nanoparticles, comprising the steps:

a) mixing an aqueous solution of aurochloric acid with a thiohexose or a thiopentose, to form a gold nanoparticle core having a surface, and thiohexuronic or thiopenturonic acid molecules connected to said surface, b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture, c) adding a solution of amphotericin B and sonicating the obtained mixture, d) obtaining the amphotericin B conjugated gold nanoparticles, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, and wherein the amphotericin B conjugated gold nanoparticles are water dispersible, and wherein the amphotericin B conjugated gold nanoparticles have a particle size range comprised between 5 nm-12 nm.

One particular embodiment of the present invention is a process for producing amphotericin B conjugated gold nanoparticles, comprising the steps:

a) mixing an aqueous solution of aurochloric acid with a thiohexose or a thiopentose, to form a gold nanoparticle core having a surface, and thiohexuronic or thiopenturonic acid molecules connected to said surface, and stabilizing the gold nanoparticle core, b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture, c) adding a solution of amphotericin B and sonicating the obtained mixture, d) obtaining the amphotericin B conjugated gold nanoparticles, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, and wherein the amphotericin B conjugated gold nanoparticles are water dispersible, and wherein the amphotericin B conjugated gold nanoparticles have a particle size range comprised between 5 nm-12 nm.

One particular embodiment of the present invention is a process for producing amphotericin B conjugated gold nanoparticles, comprising:

a) mixing an aqueous solution of aurochloric acid with thiohexose or thiopentose at a defined temperature, to form nanoparticles comprising a gold nanoparticle core having a surface, and thiohexuronic or thiopenturonic acid molecules connected to said surface, b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture at the defined temperature, c) adding a solution of amphotericin B, and sonicating the obtained mixture at the defined temperature, d) obtaining the amphotericin B conjugated gold nanoparticles, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, and wherein the amphotericin B conjugated gold nanoparticles are water dispersible, and wherein the amphotericin B conjugated gold nanoparticles have a particle size range comprised between 5 nm-12 nm, wherein the defined temperature is comprised between 20 degrees Celsius and 27 degrees Celsius.

One more particular embodiment of the present invention is a process for producing amphotericin B conjugated gold nanoparticles, comprising:

a) mixing an aqueous solution of aurochloric acid with thiohexose or thiopentose at a defined temperature, to form nanoparticles comprising a gold nanoparticle core having a surface, and thiohexuronic or thiopenturonic acid molecules connected to said surface, b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture for at least 3 minutes at the defined temperature, c) adding a solution of amphotericin B, and sonicating the obtained mixture for at least 1 hour at the defined temperature, d) obtaining the amphotericin B conjugated gold nanoparticles, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, and wherein the amphotericin B conjugated gold nanoparticles are water dispersible, and wherein the amphotericin B conjugated gold nanoparticles have a particle size range comprised between 5 nm-12 nm, wherein the defined temperature is comprised between 20 degrees Celsius and 27 degrees Celsius.

Slightly reworded, one embodiment of the present invention is a process for producing amphotericin B conjugated thiohexose or thiopentose stabilized gold nanoparticles, comprising:

a) mixing an aqueous solution of aurochloric acid with thiohexose or thiopentose at a defined temperature, to form nanoparticles comprising a gold nanoparticle core having a surface, and thiohexuronic or thiopenturonic acid molecules connected to said surface, b) mixing the thiohexuronic or thiopenturonic acid coated gold nanoparticles with (1-ethyl-3-(3-dimethylaminopropyl) carbodiimide)/sulpho-N-hydroxysuccinamide, and sonicating for at least five minutes at the defined temperature, c) adding a solution of amphotericin B, and sonicating for at least two hours at the defined temperature, d) obtaining the amphotericin B conjugated thiohexose or thiopentose stabilized gold nanoparticles, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, and wherein the amphotericin B conjugated gold nanoparticles are water dispersible, and wherein the amphotericin B conjugated gold nanoparticles have a particle size range comprised between 5 nm-12 nm, wherein the defined temperature is comprised between 20 degrees Celsius and 27 degrees Celsius.

One further embodiment of the present invention is a process for producing amphotericin B conjugated gold nanoparticles, comprising:

a) mixing an aqueous solution of aurochloric acid with thioglucose, to form nanoparticles comprising a gold nanoparticle core having a surface, and thioglucuronic acid molecules connected to said surface, b) mixing the thioglucuronic acid coated gold nanoparticles with (1-ethyl-3-(3-dimethylaminopropyl) carbodiimide)/sulpho-N-hydroxysuccinamide, and sonicating the mixture, c) adding a solution of amphotericin B, and sonicating the obtained mixture, d) obtaining the amphotericin B conjugated gold nanoparticles, wherein one amphotericin B molecule is covalently bound to one of the thioglucuronic acid molecules via covalent linkage of the amino group of the amphotericin B molecule and the carboxylic acid group of the thioglucuronic acid molecule, and wherein the amphotericin B conjugated gold nanoparticles are water dispersible, and wherein the amphotericin B conjugated gold nanoparticles have a particle size range comprised between 5 nm-12 nm.

One particular further embodiment of the present invention is a process for producing amphotericin B conjugated gold nanoparticles, comprising:

a) mixing an aqueous solution of aurochloric acid with thioglucose, to form nanoparticles comprising a gold nanoparticle core having a surface, and thioglucuronic acid molecules connected to said surface, and stabilizing the gold nanoparticle core, b) mixing the thioglucuronic acid coated gold nanoparticles with (1-ethyl-3-(3-dimethylaminopropyl) carbodiimide)/sulpho-N-hydroxysuccinamide, and sonicating the mixture, c) adding a solution of amphotericin B, and sonicating the obtained mixture, d) obtaining the amphotericin B conjugated gold nanoparticles, wherein one amphotericin B molecule is covalently bound to one of the thioglucuronic acid molecules via covalent linkage of the amino group of the amphotericin B molecule and the carboxylic acid group of the thioglucuronic acid molecule, and wherein the amphotericin B conjugated gold nanoparticles are water dispersible, and wherein the amphotericin B conjugated gold nanoparticles have a particle size range comprised between 5 nm-12 nm.

Another embodiment of the present invention is a process for producing amphotericin B conjugated thioglucose stabilized gold nanoparticles, comprising:

a) mixing an aqueous solution of aurochloric acid with thioglucose, to form nanoparticles comprising a gold nanoparticle core having a surface, and thioglucuronic acid molecules connected to said surface, b) mixing the thioglucuronic acid coated gold nanoparticles with (1-ethyl-3-(3-dimethylaminopropyl) carbodiimide)/sulpho-N-hydroxysuccinamide, and sonicating the mixture, c) adding a solution of amphotericin B and sonicating the obtained mixture, d) obtaining the amphotericin B conjugated thioglucose stabilized gold nanoparticles, wherein one amphotericin B molecule is covalently bound to one of the thioglucuronic acid molecules via covalent linkage of the amino group of the amphotericin B molecule and the carboxylic acid group of the thioglucuronic acid molecule, and wherein the amphotericin B conjugated gold nanoparticles are water dispersible, and wherein the amphotericin B conjugated gold nanoparticles have a particle size range comprised between 5 nm-12 nm.

Another embodiment of the present invention is a process for producing amphotericin B conjugated thioglucose stabilized gold nanoparticles, comprising:

a) mixing an aqueous solution of aurochloric acid with thioglucose, to form nanoparticles comprising a gold nanoparticle core having a surface, and thioglucuronic acid molecules connected to said surface, b) mixing the thioglucuronic acid coated gold nanoparticles with (1-ethyl-3-(3-dimethylaminopropyl) carbodiimide)/sulpho-N-hydroxysuccinamide, and sonicating the mixture for at least 3 minutes, c) adding a solution of amphotericin B and sonicating the obtained mixture for at least 1 hour, d) obtaining the amphotericin B conjugated thioglucose stabilized gold nanoparticles, wherein one amphotericin B molecule is covalently bound to one of the thioglucuronic acid molecules via covalent linkage of the amino group of the amphotericin B molecule and the carboxylic acid group of the thioglucuronic acid molecule, and wherein the amphotericin B conjugated gold nanoparticles are water dispersible, and wherein the amphotericin B conjugated gold nanoparticles have a particle size range comprised between 5 nm-12 nm.

Another particular embodiment of the present invention is a process for producing amphotericin B conjugated thioglucose stabilized gold nanoparticles, comprising:

a) mixing an aqueous solution of aurochloric acid with thioglucose at a defined temperature, to form nanoparticles comprising a gold nanoparticle core having a surface, and thioglucuronic acid molecules connected to said surface,
b) mixing the thioglucuronic acid coated gold nanoparticles with (1-ethyl-3-(3-dimethylaminopropyl) carbodiimide)/sulpho-N-hydroxysuccinamide, and sonicating the mixture for at least 3 minutes at the defined temperature,
c) adding a solution of amphotericin B and sonicating the obtained mixture for at least 1 hour at the defined temperature,
d) obtaining the amphotericin B conjugated thioglucose stabilized gold nanoparticles, wherein one amphotericin B molecule is covalently bound to one of the thioglucuronic acid molecules via covalent linkage of the amino group of the amphotericin B molecule and the carboxylic acid group of the thioglucuronic acid molecule, and wherein the amphotericin B conjugated gold nanoparticles are water dispersible, and wherein the amphotericin B conjugated gold nanoparticles have a particle size range comprised between 5 nm-12 nm, wherein the defined temperature is comprised between 20 degrees Celsius and 27 degrees Celsius.

Another more particular embodiment of the present invention is a process for producing amphotericin B conjugated thioglucose stabilized gold nanoparticles, comprising:
a) mixing an aqueous solution of aurochloric acid with thioglucose at a defined temperature, to form nanoparticles comprising a gold nanoparticle core having a surface, and thioglucuronic acid molecules connected to said surface,
b) mixing the thioglucuronic acid coated gold nanoparticles with (1-ethyl-3-(3-dimethylaminopropyl) carbodiimide)/sulpho-N-hydroxysuccinamide, and sonicating the mixture at the defined temperature,
c) adding a solution of amphotericin B and sonicating the obtained mixture at the defined temperature,
d) obtaining the amphotericin B conjugated thioglucose stabilized gold nanoparticles, wherein one amphotericin B molecule is covalently bound to one of the thioglucuronic acid molecules via covalent linkage of the amino group of the amphotericin B molecule and the carboxylic acid group of the thioglucuronic acid molecule, and wherein the amphotericin B conjugated gold nanoparticles are water dispersible, and wherein the amphotericin B conjugated gold nanoparticles have a particle size range comprised between 5 nm-12 nm, wherein the defined temperature is comprised between 20 degrees Celsius and 27 degrees Celsius.

A further embodiment of the present invention is a process for producing amphotericin B conjugated gold nanoparticles, comprising:
a) mixing an aqueous solution of aurochloric acid with thiomannose, to form nanoparticles comprising a gold nanoparticle core having a surface, and thiomannuronic acid molecules connected to said surface,
b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture,
c) adding a solution of amphotericin B and sonicating the obtained mixture,
d) obtaining the amphotericin B conjugated gold nanoparticles, wherein one amphotericin B molecule is covalently bound to one of the thiomannuronic acid molecules via covalent linkage of the amino group of the amphotericin B molecule and the carboxylic acid group of the thiomannuronic acid molecule, and wherein the amphotericin B conjugated gold nanoparticles are water dispersible, and wherein the amphotericin B conjugated gold nanoparticles have a particle size range comprised between 5 nm-12 nm.

A further particular embodiment of the present invention is a process for producing amphotericin B conjugated gold nanoparticles, comprising:
a) mixing an aqueous solution of aurochloric acid with thiomannose, to form nanoparticles comprising a gold nanoparticle core having a surface, and thiomannuronic acid molecules connected to said surface, and stabilizing the gold nanoparticle core,
b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture,
c) adding a solution of amphotericin B and sonicating the obtained mixture,
d) obtaining the amphotericin B conjugated gold nanoparticles, wherein one amphotericin B molecule is covalently bound to one of the thiomannuronic acid molecules via covalent linkage of the amino group of the amphotericin B molecule and the carboxylic acid group of the thiomannuronic acid molecule, and wherein the amphotericin B conjugated gold nanoparticles are water dispersible, and wherein the amphotericin B conjugated gold nanoparticles have a particle size range comprised between 5 nm-12 nm.

A further more particular embodiment of the present invention is a process for producing amphotericin B conjugated thiomannose stabilized gold nanoparticles, comprising:
a) mixing an aqueous solution of aurochloric acid with thiomannose, to form nanoparticles comprising a gold nanoparticle core having a surface, and thiomannuronic acid molecules connected to said surface,
b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture,
c) adding a solution of amphotericin B and sonicating the obtained mixture,
d) obtaining the amphotericin B conjugated thiomannose stabilized gold nanoparticles, wherein one amphotericin B molecule is covalently bound to one of the thiomannuronic acid molecules via covalent linkage of the amino group of the amphotericin B molecule and the carboxylic acid group of the thiomannuronic acid molecule, and wherein the amphotericin B conjugated gold nanoparticles are water dispersible, and wherein the amphotericin B conjugated gold nanoparticles have a particle size range comprised between 5 nm-12 nm.

Another particular embodiment of the present invention is a process for producing amphotericin B conjugated thiomannose stabilized gold nanoparticles, comprising:
a) mixing an aqueous solution of aurochloric acid with thiomannose, to form nanoparticles comprising a gold nanoparticle core having a surface, and thiomannuronic acid molecules connected to said surface,
b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture for at least 3 minutes,
c) adding a solution of amphotericin B and sonicating the obtained mixture for at least 1 hour, d) obtaining the amphotericin B conjugated thiomannose stabilized gold nanoparticles, wherein one amphotericin B molecule is covalently bound to one of the thiomannuronic acid molecules via covalent linkage of the amino group of the amphotericin B molecule and the carboxylic acid group of the thiomannuronic acid molecule, and wherein the amphotericin B conjugated gold nanoparticles are water dispersible, and wherein the amphotericin B conjugated gold nanoparticles have a particle size range comprised between 5 nm-12 nm.

Another more particular embodiment of the present invention is a process for producing amphotericin B conjugated thiomannose stabilized gold nanoparticles, comprising:
a) mixing an aqueous solution of aurochloric acid with thiomannose at a defined temperature, to form nanoparticles comprising a gold nanoparticle core having a surface, and thiomannuronic acid molecules connected to said surface,
b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture for at least 3 minutes at the defined temperature,
c) adding a solution of amphotericin B and sonicating the obtained mixture for at least 1 hour at the defined temperature,
d) obtaining the amphotericin B conjugated thiomannose stabilized gold nanoparticles, wherein one amphotericin B molecule is covalently bound to one of the thiomannuronic acid molecules via covalent linkage of the amino group of the amphotericin B molecule and the carboxylic acid group of the thiomannuronic acid molecule, and wherein the amphotericin B conjugated gold nanoparticles are water dispersible, and wherein the amphotericin B conjugated gold nanoparticles have a particle size range comprised between 5 nm-12 nm, wherein the defined temperature is comprised between 20 degrees Celsius and 27 degrees Celsius.

Another still more particular embodiment of the present invention is a process for producing amphotericin B conjugated thiomannose stabilized gold nanoparticles, comprising:
a) mixing an aqueous solution of aurochloric acid with thiomannose at a defined temperature, to form nanoparticles comprising a gold nanoparticle core having a surface, and thiomannuronic acid molecules connected to said surface,
b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture at the defined temperature,
c) adding a solution of amphotericin B and sonicating the obtained mixture at the defined temperature,
d) obtaining the amphotericin B conjugated thiomannose stabilized gold nanoparticles, wherein one amphotericin B molecule is covalently bound to one of the thiomannuronic acid molecules via covalent linkage of the amino group of the amphotericin B molecule and the carboxylic acid group of the thiomannuronic acid molecule, and wherein the amphotericin B conjugated gold nanoparticles are water dispersible, and wherein the amphotericin B conjugated gold nanoparticles have a particle size range comprised between 5 nm-12 nm, wherein the defined temperature is comprised between 20 degrees Celsius and 27 degrees Celsius.

In some embodiments, the duration of the mixing an aqueous solution of aurochloric acid with thiopentose or thiohexose may be at least 10 minutes, preferably at least 8 minutes, preferably at least 5 minutes, preferably at least 4 minutes, preferably at least 3 minutes, preferably at least 2 minutes, preferably at least 1 minute, preferably at least 30 seconds, preferably at least 15 seconds.

In some embodiments, the duration of the sonicating after mixing the thiopentose or thiohexose coated gold nanoparticles with (1-ethyl-3-(3-dimethylaminopropyl) carbodiimide)/sulpho-N-hydroxysuccinamide at step b) may be at least 10 minutes, preferably at least 8 minutes, preferably at least 7 minutes, preferably at least 6 minutes, preferably at least 5 minutes, preferably at least 4 minutes, preferably at least 3 minutes, most preferably at least 5 minutes.

In some embodiments, the duration of the sonicating after adding a solution of amphotericin B, at step c) may be at least 0.5 hours, preferably at least 1 hour, preferably at least 1.5 hours, preferably at least 2.5 hours, preferably at least 3 hours, most preferably at least 2 hours.

In some embodiments, the defined temperature for sonicating at step b) or at step c) is comprised between 20 degrees Celsius and 24 degrees Celsius, preferably between 18 degrees Celsius and 24 degrees Celsius, preferably between 18 degrees Celsius and 25 degrees Celsius, preferably between 18 degrees Celsius and 26 degrees Celsius, preferably between 18 degrees Celsius and 27 degrees Celsius, preferably between 19 degrees Celsius and 24 degrees Celsius, preferably between 19 degrees Celsius and 25 degrees Celsius, preferably between 19 degrees Celsius and 26 degrees Celsius, preferably between 19 degrees Celsius and 27 degrees Celsius, between 20 degrees Celsius and 25 degrees Celsius, between 20 degrees Celsius and 26 degrees Celsius, between 20 degrees Celsius and 27 degrees Celsius, most preferably between 20 degrees Celsius and 25 degrees Celsius.

Other Uses of the Inventive Nanoparticles

"Treatment", "treat" or "treating" refers to clinical intervention in an attempt to alter the natural course of a disorder in the individual being treated, and can be performed either for prophylaxis or during the course of clinical pathology. Desired results of treatment can include, but are not limited to, preventing occurrence or recurrence of the disorder, alleviation of symptoms, diminishment of any direct or indirect pathological consequences of the disorder, preventing metastasis, decreasing the rate of progression, amelioration or palliation of a disease state, and remission or improved prognosis.

For example, treatment can include administration of a therapeutically effective amount of the amphotericin B conjugated thiohexose or thiopentose stabilized nanoparticles to a subject to reduce the burden of fungal infection from the level existing at the time of treatment.

"Therapeutically effective amount" refers to the amount of an active ingredient or agent, e.g., the amphotericin B conjugated thiohexose or thiopentose stabilized gold nanoparticles disclosed herein that reduces or ameliorates one or more of the symptoms associated with or caused by contact, contamination, growth, viability, proliferation or infection with a fungal or *leishmania* pathogen, i.e., an "improvement" of the subject's condition or "therapeutic benefit" to the subject.

"Subject" or "individual" refers to a mammal, including but not limited to, domesticated animals (e.g., cows, sheep, cats, dogs, and horses), primates (e.g.
humans and non-human primates such as monkeys), rabbits, and rodents (e.g.
mice and rats).

Therefore, the amounts administered for treatment are typically in an "effective amount" or "sufficient amount" that is, an amount sufficient to produce a desired effect.

The desired effect for the effective amounts of the amphotericin B conjugated thiohexose or thiopentose stabilized gold nanoparticles or of the pharmaceutical compositions comprising the same, includes one or more of: inhibiting or reducing susceptibility to or recurrence of fungal contact, contamination, growth, proliferation or infection; reducing, decreasing or inhibiting fungal contamination, growth, viability, proliferation or infection, thus reducing or eliminating the fungal cells; and reducing or decreasing the severity, frequency or duration of one or more symptoms associated with or caused by fungal contact, contamination, growth, viability, proliferation or infection, relative to an appropriate control. For example, an amount of an inventive compound that reduces severity, frequency or duration of itching, inflammation, pain, discharge or any other symptom or associated condition is a satisfactory clinical endpoint. Effective amounts can also result in a histological improvement. The effective amount can therefore be sufficient to reduce the infection, or stabilize the infection, e.g., inhibit or prevent the progression or worsening of a fungal contamination, growth, proliferation or infection, or one or more symptoms associated with or caused by fungal contact, contamination, growth, proliferation or infection. Thus, amounts considered effective prevent or inhibit progression of the infection or an associated condition or disorder.

In the case of *leishmania* infection, the desired effect for the effective amounts of the amphotericin B conjugated thiohexose or thiopentose stabilized gold nanoparticles or of the pharmaceutical compositions comprising the same, includes one or more of: inhibiting or reducing susceptibility to or recurrence of *leishmania* contact, contamination, growth, proliferation or infection; reducing, decreasing or inhibiting *leishmania* contamination, growth, viability, proliferation or infection, thus reducing or eliminating the *leishmania* cells; and reducing or decreasing the severity, frequency or duration of one or more symptoms associated with or caused by *leishmania* contact, contamination, growth, viability, proliferation or infection, relative to an appropriate control. For example, an amount of an inventive compound that reduces severity, frequency or duration of itching, inflammation, pain, discharge or any other symptom or associated condition is a satisfactory clinical endpoint. Effective amounts can also result in a histological improvement. The effective amount can therefore be sufficient to reduce the infection, or stabilize the infection, e.g., inhibit or prevent the progression or worsening of a *leishmania* contamination, growth, proliferation or infection, or one or more symptoms associated with or caused by *leishmania* contact, contamination, growth, proliferation or infection. Thus, amounts considered effective prevent or inhibit progression of the infection or an associated condition or disorder.

The improvement in the subject's condition or the therapeutic benefit obtained by the methods of the present invention may be relatively short in duration, e.g., the improvement may last several minutes, hours, days or weeks, or extend over a longer period of time, e.g., months or years. An effective amount therefore need not be a complete ablation or elimination of fungal or *leishmania* contact, contamination, growth, viability, proliferation or infection, or any or all symptoms associated with or caused by fungal or *leishmania* contact, contamination, growth, viability, proliferation or infection. Thus, a satisfactory clinical endpoint for an effective amount is achieved when there is a subjective or objective improvement in the subjects' condition, as determined using any of the criteria known in the art appropriate for determining the status or degree of fungal or *leishmania* contact, contamination, growth, viability, proliferation or infection, or susceptibility or recurrence of fungal or *leishmania* contact, contamination, growth, proliferation or infection, over a short or long period of time.

An effective amount of an inventive compound for treating a subject can be determined in vitro based upon comparison to an amount of an anti-fungal or *leishmania* agent that is known to have activity in animals at a given concentration or dosage. For example, susceptibility testing can be used to determine a minimal concentration of compound that inhibits or reduces fungus or *leishmania* growth or proliferation; inhibits or reduces the amount of fungus or *leishmania* (minimum inhibitory concentration, µg/ml) or kills the fungus or *leishmania* (minimum fungicidal/leishmanacidal concentration, µg/ml). Alternatively, animal studies including human clinical trials can be used to determine effective amounts.

The skilled artisan will appreciate the various factors that may influence the dosage and timing required to treat a particular subject including, for example, the general health, age, or gender of the subject, the severity or stage of the disorder or condition, previous treatments, susceptibility to undesirable side effects, clinical outcome desired and the presence of other disorders or conditions. Such factors may influence the dosage and timing required to provide an amount sufficient for therapeutic benefit.

In the methods of the invention for treating a subject, compounds of the invention can be administered systemically, regionally (e.g., directed towards an organ or tissue), or locally (e.g., intracavity or topically onto the skin), in accordance with any protocol or route that achieves a desired effect. The compounds can be administered as a single or multiple dose each day (e.g., at a low dose), intermittently (e.g., every other day, once a week, etc. at a higher dose), or continuously, as determined by the treating medical professional. The compounds as well as pharmaceutical compositions including one or more of the compositions alone, or in a combination, can be administered via inhalation (e.g., intra-tracheal), orally, intravenously, intraarterially, intravascularly, intrathecally, intraperitoneally, intramuscularly, subcutaneously, intracavity, transdermally (e.g., topical), transmucosally (e.g., buccal, vaginal, uterine, rectal, or nasal), by multiple administrations, sustained release (e.g., continuous infusion, gradual perfusion over time or capsules) or a single bolus.

Compounds administered topically are typically applied in unit doses ranging from 1 mg/mL to 1 g/mL, or in doses ranging from 1 mg/mL to 100 mg/mL. Compounds administered intravenously (IV) typically would be from about 0.01 mg/hr to about 1.0 mg/hr over several hours (typically 1, 3, or 6 hours), which can be repeated for one or more weeks with intermittent cycles. One or more daily doses typically range from 0.1 mg/kg to 100 mg/kg per day, from 0.1 mg/kg to 20 mg/kg per day, or from 1 to 20 mg/kg/day. Considerably higher dosages (e.g., ranging up to about 10 mg/ml) can be used, particularly when the drug is administered locally or regionally, and not into the blood stream, such as into a body cavity or into a lumen of an organ. One skilled in the art can readily ascertain effective dosages and administration protocols to achieve a therapeutic benefit.

Thus, one embodiment of the present invention is directed to a method for the treatment of a fungal infection in a patient, comprising administering to a patient having said fungal infection a therapeutically effective amount of amphotericin B conjugated gold nanoparticles, comprising:
- a gold nanoparticle core having a surface,
  - thiohexuronic acid or thiopenturonic acid molecules connected to the surface of the gold nanoparticle core, and stabilizing the gold nanoparticle core,
  - at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
  - wherein the amphotericin B conjugated gold nanoparticles are water dispersible,
  - wherein the amphotericin B conjugated gold nanoparticles have a particle size range comprised between 5 nm-12 nm,
  - wherein the treatment results in reduction of the fungal infection from the level existing at the time of treatment.

A particular embodiment of the present invention is directed to a method for the treatment of a fungal infection in a patient, comprising administering to a patient having said fungal infection a therapeutically effective amount of amphotericin B conjugated gold nanoparticles, comprising:
- a gold nanoparticle core having a surface,
  - thiohexuronic acid or thiopenturonic acid molecules connected to the surface of the gold nanoparticle core and stabilizing the gold nanoparticle core,
  - at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
  - wherein the amphotericin B conjugated gold nanoparticles are water dispersible,
  - wherein the amphotericin B conjugated gold nanoparticles have a particle size range comprised between 5 nm-12 nm, wherein the treatment results in reduction of the fungal infection from the level existing at the time of treatment,
  - and wherein the fungal infection is selected from the group comprising *Aspergillus fumicatus* infection, *Candida albicans* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

A more particular embodiment of the present invention is directed to a method for the treatment of a fungal infection in a patient, comprising administering to a patient having said fungal infection a therapeutically effective amount of amphotericin B conjugated gold nanoparticles, comprising:
- a gold nanoparticle core having a surface,
  - thiohexuronic acid or thiopenturonic acid molecules connected to the surface of the gold nanoparticle core and stabilizing the gold nanoparticle core,
  - at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
  - wherein the amphotericin B conjugated gold nanoparticles are water dispersible,
  - wherein the amphotericin B conjugated gold nanoparticles have a particle size range comprised between 5 nm-12 nm,
  - wherein the treatment results in reduction of the fungal infection from the level existing at the time of treatment, and wherein the fungal infection is selected from the group comprising *Aspergillus fumicatus* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

Another embodiment of the present invention is directed to a method for the treatment of a *leishmania* infection in a patient, comprising administering to a patient having said *leishmania* infection a therapeutically effective amount of amphotericin B conjugated gold nanoparticles, comprising:
- a gold nanoparticle core having a surface,
  - thiohexuronic acid or thiopenturonic acid molecules connected to the surface of the gold nanoparticle core and stabilizing the gold nanoparticle core,
  - at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
  - wherein the amphotericin B conjugated gold nanoparticles are water dispersible,
  - wherein the amphotericin B conjugated gold nanoparticles have a particle size range comprised between 5 nm-12 nm,
  - wherein the treatment results in reduction of the *leishmania* infection from the level existing at the time of treatment.

Still another embodiment of the present invention is directed to a method for the treatment of a *leishmania* infection in a patient, comprising administering to a patient having said *leishmania* infection a therapeutically effective amount of amphotericin B conjugated gold nanoparticles, comprising:
- a gold nanoparticle core having a surface,
  - thiohexuronic acid or thiopenturonic acid molecules connected to the surface of the gold nanoparticle core and stabilizing the gold nanoparticle core,
  - at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
  - wherein the amphotericin B conjugated gold nanoparticles are water dispersible,
  - wherein the amphotericin B conjugated gold nanoparticles have a particle size range comprised between 5 nm-12 nm,
  - wherein the treatment results in reduction of the *leishmania* infection from the level existing at the time of treatment, and wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

A further embodiment of the present invention is directed to a method for the treatment of a *leishmania* infection in a patient, comprising administering to a patient having said *leishmania* infection a therapeutically effective amount of amphotericin B conjugated gold nanoparticles, comprising:
  a gold nanoparticle core having a surface,
  thiohexuronic acid or thiopenturonic acid molecules connected to the surface of the gold nanoparticle core and stabilizing the gold nanoparticle core,
  at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule,
  wherein the amphotericin B conjugated gold nanoparticles are water dispersible,
  wherein the amphotericin B conjugated gold nanoparticles have a particle size range comprised between 5 nm-12 nm,
  wherein the treatment results in reduction of the *leishmania* infection from the level existing at the time of treatment,
  wherein the *leishmania* infection is selected from the group consisting of *Leishmania tropica* infection, *Leishmania major* infection, *Leishmania aethiopic* infection, *Leishmania infantum* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Thus, one embodiment of the present invention is directed to a method for the treatment of a fungal infection in a patient, comprising administering to a patient having said fungal infection a therapeutically effective amount of amphotericin B conjugated gold nanoparticles, comprising:
  a gold nanoparticle core having a surface,
  thioglucuronic acid molecules connected to the surface of the gold nanoparticle core and stabilizing the gold nanoparticle core,
  at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
  wherein the amphotericin B conjugated gold nanoparticles are water dispersible,
  wherein the amphotericin B conjugated gold nanoparticles have a particle size range comprised between 5 nm-12 nm,
  wherein the treatment results in reduction of the fungal infection from the level existing at the time of treatment.

A particular embodiment of the present invention is directed to a method for the treatment of a fungal infection in a patient, comprising administering to a patient having said fungal infection a therapeutically effective amount of amphotericin B conjugated gold nanoparticles, comprising:
  a gold nanoparticle core having a surface,
  thioglucuronic acid molecules connected to the surface of the gold nanoparticle core and stabilizing the gold nanoparticle core,
  at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
  wherein the amphotericin B conjugated gold nanoparticles are water dispersible,
  wherein the amphotericin B conjugated gold nanoparticles have a particle size range comprised between 5 nm-12 nm,
  wherein the treatment results in reduction of the fungal infection from the level existing at the time of treatment, and wherein the fungal infection is selected from the group comprising *Aspergillus fumicatus* infection, *Candida albicans* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

A more particular embodiment of the present invention is directed to a method for the treatment of a fungal infection in a patient, comprising administering to a patient having said fungal infection a therapeutically effective amount of amphotericin B conjugated gold nanoparticles, comprising:
  a gold nanoparticle core having a surface,
  thioglucuronic acid molecules connected to the surface of the gold nanoparticle core and stabilizing the gold nanoparticle core,
  at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule,
  wherein the amphotericin B conjugated gold nanoparticles are water dispersible,
  wherein the amphotericin B conjugated gold nanoparticles have a particle size range comprised between 5 nm-12 nm,
  wherein the treatment results in reduction of the fungal infection from the level existing at the time of treatment, and wherein the fungal infection is selected from the group comprising *Aspergillus fumicatus* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

Another embodiment of the present invention is directed to a method for the treatment of a *leishmania* infection in a patient, comprising administering to a patient having said *leishmania* infection a therapeutically effective amount of amphotericin B conjugated gold nanoparticles, comprising:

a gold nanoparticle core having a surface, thioglucuronic acid molecules connected to the surface of the gold nanoparticle core and stabilizing the gold nanoparticle core, at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule, wherein the amphotericin B conjugated gold nanoparticles are water dispersible, wherein the amphotericin B conjugated gold nanoparticles have a particle size range comprised between 5 nm-12 nm, wherein the treatment results in reduction of the *leishmania* infection from the level existing at the time of treatment.

Still another embodiment of the present invention is directed to a method for the treatment of a *leishmania* infection in a patient, comprising administering to a patient having said *leishmania* infection a therapeutically effective amount of amphotericin B conjugated gold nanoparticles, comprising:

a gold nanoparticle core having a surface, thioglucuronic acid molecules connected to the surface of the gold nanoparticle core and stabilizing the gold nanoparticle core, at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule, wherein the amphotericin B conjugated gold nanoparticles are water dispersible, wherein the amphotericin B conjugated gold nanoparticles have a particle size range comprised between 5 nm-12 nm, wherein the treatment results in reduction of the *leishmania* infection from the level existing at the time of treatment, and wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

A further embodiment of the present invention is directed to a method for the treatment of a *leishmania* infection in a patient, comprising administering to a patient having said *leishmania* infection a therapeutically effective amount of amphotericin B conjugated gold nanoparticles, comprising:

a gold nanoparticle core having a surface, thioglucuronic acid molecules connected to the surface of the gold nanoparticle core and stabilizing the gold nanoparticle core, at least one amphotericin B molecule, wherein one amphotericin B molecule is covalently bound to one of the thioglucuronic acid molecules via covalent linkage of the amino group of the amphotericin B molecule and the carboxylic acid group of the thioglucuronic acid molecule, wherein the amphotericin B conjugated gold nanoparticles are water dispersible, wherein the amphotericin B conjugated gold nanoparticles have a particle size range comprised between 5 nm-12 nm, wherein the treatment results in reduction of the *leishmania* infection from the level existing at the time of treatment, wherein the *leishmania* infection is selected from the group consisting of *Leishmania tropica* infection, *Leishmania major* infection, *Leishmania aethiopic* infection, *Leishmania infantum* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Thus, one embodiment of the present invention is directed to a method for the treatment of a fungal infection in a patient, comprising administering to a patient having said fungal infection a therapeutically effective amount of amphotericin B conjugated gold nanoparticles, comprising:

a gold nanoparticle core having a surface, thiomannuronic acid molecules connected to the surface of the gold nanoparticle core, and stabilizing the gold nanoparticle core, at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule, wherein the amphotericin B conjugated gold nanoparticles are water dispersible, wherein the amphotericin B conjugated gold nanoparticles have a particle size range comprised between 5 nm-12 nm, wherein the treatment results in reduction of the fungal infection from the level existing at the time of treatment.

A particular embodiment of the present invention is directed to a method for the treatment of a fungal infection in a patient, comprising administering to a patient having said fungal infection a therapeutically effective amount of amphotericin B conjugated gold nanoparticles, comprising:

a gold nanoparticle core having a surface, thiomannuronic acid molecules connected to the surface of the gold nanoparticle core and stabilizing the gold nanoparticle core, at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule, wherein the amphotericin B conjugated gold nanoparticles are water dispersible, wherein the amphotericin B conjugated gold nanoparticles have a particle size range comprised between 5 nm-12 nm, wherein the treatment results in reduction of the fungal infection from the level existing at the time of treatment, and wherein the fungal infection is selected from the group comprising *Aspergillus fumicatus* infection, *Candida albicans* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

A more particular embodiment of the present invention is directed to a method for the treatment of a fungal infection in a patient, comprising administering to a patient having said fungal infection a therapeutically effective amount of amphotericin B conjugated gold nanoparticles, comprising:
 a gold nanoparticle core having a surface,
 thiomannuronic acid molecules connected to the surface of the gold nanoparticle core and stabilizing the gold nanoparticle core,
 at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
 wherein the amphotericin B conjugated gold nanoparticles are water dispersible,
 wherein the amphotericin B conjugated gold nanoparticles have a particle size range comprised between 5 nm-12 nm,
 wherein the treatment results in reduction of the fungal infection from the level existing at the time of treatment, and wherein the fungal infection is selected from the group comprising *Aspergillus fumicatus* infection, *Candida auris* infection, *Candida glabrata* infection, *Candida krusei* infection, *Candida parapsilosis* infection, *Candida tropicalis* infection, *Cryptococcus gatti* infection, *Cryptococcus neoformans* infection.

Another embodiment of the present invention is directed to a method for the treatment of a *leishmania* infection in a patient, comprising administering to a patient having said *leishmania* infection a therapeutically effective amount of amphotericin B conjugated gold nanoparticles, comprising:
 a gold nanoparticle core having a surface,
 thiomannuronic acid molecules connected to the surface of the gold nanoparticle core and stabilizing the gold nanoparticle core,
 at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
 wherein the amphotericin B conjugated gold nanoparticles are water dispersible,
 wherein the amphotericin B conjugated gold nanoparticles have a particle size range comprised between 5 nm-12 nm,
 wherein the treatment results in reduction of the *leishmania* infection from the level existing at the time of treatment.

Still another embodiment of the present invention is directed to a method for the treatment of a *leishmania* infection in a patient, comprising administering to a patient having said *leishmania* infection a therapeutically effective amount of amphotericin B conjugated gold nanoparticles, comprising:
 a gold nanoparticle core having a surface,
 thiomannuronic acid molecules connected to the surface of the gold nanoparticle core and stabilizing the gold nanoparticle core,
 at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
 wherein the amphotericin B conjugated gold nanoparticles are water dispersible,
 wherein the amphotericin B conjugated gold nanoparticles have a particle size range comprised between 5 nm-12 nm,
 wherein the treatment results in reduction of the *leishmania* infection from the level existing at the time of treatment,
 and wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

A further embodiment of the present invention is directed to a method for the treatment of a *leishmania* infection in a patient, comprising administering to a patient having said *leishmania* infection a therapeutically effective amount of amphotericin B conjugated gold nanoparticles, comprising:
 a gold nanoparticle core having a surface,
 thiomannuronic acid molecules connected to the surface of the gold nanoparticle core and stabilizing the gold nanoparticle core,
 at least one amphotericin B molecule, wherein one amphotericin B molecule is covalently bound to one of the thiomannuronic acid molecules via covalent linkage of the amino group of the amphotericin B molecule and the carboxylic acid group of the thiomannuronic acid molecule,
 wherein the amphotericin B conjugated gold nanoparticles are water dispersible,
 wherein the amphotericin B conjugated gold nanoparticles have a particle size range comprised between 5 nm-12 nm,
 wherein the treatment results in reduction of the *leishmania* infection from the level existing at the time of treatment,
 wherein the *leishmania* infection is selected from the group consisting of *Leishmania tropica* infection, *Leishmania major* infection, *Leishmania aethiopic* infection, *Leishmania infantum* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

Figure 1:
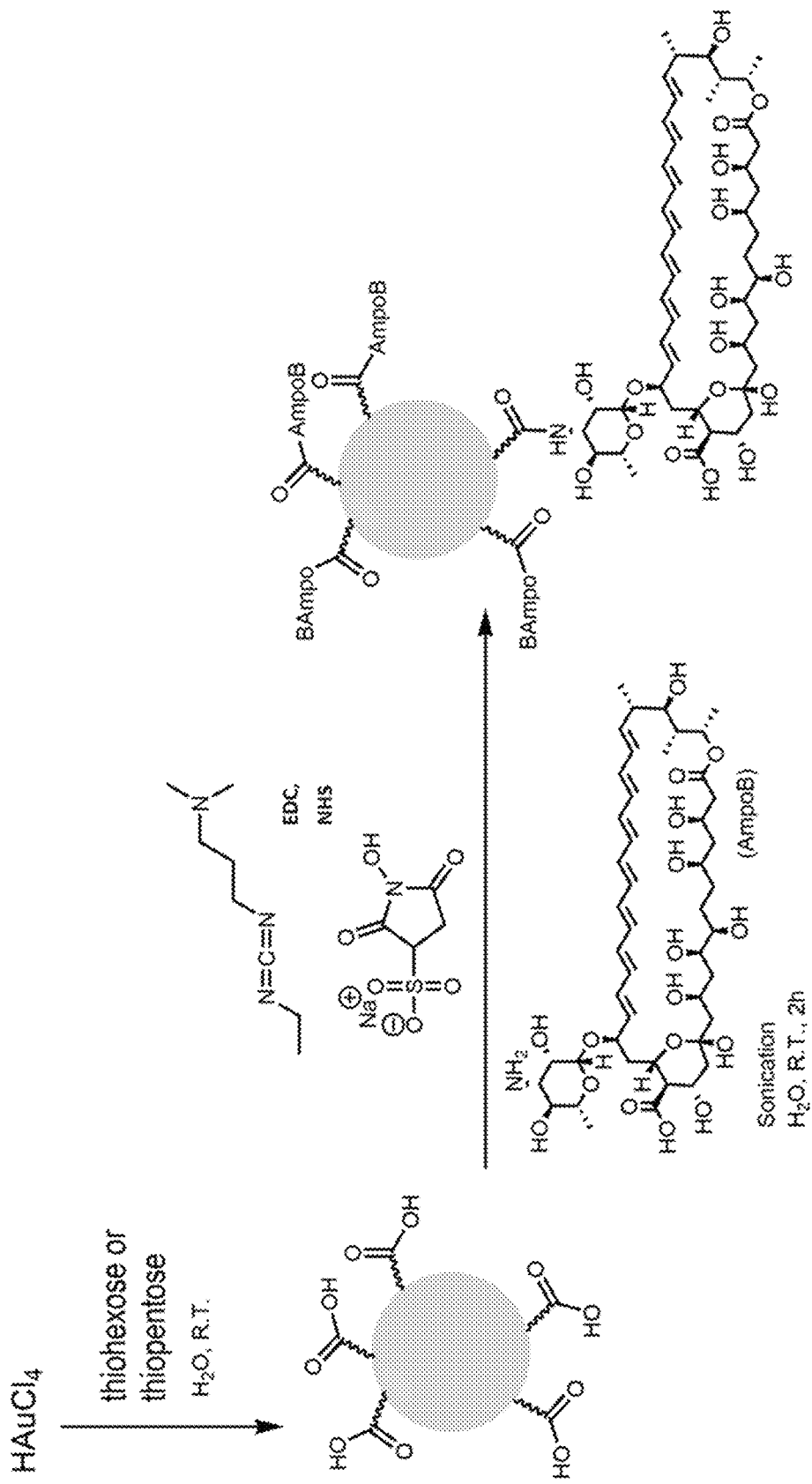
FIG. 1 Synthesis reactions of the amphotericin B conjugated thiopentose or thiohexose stabilized gold nanoparticles in presence of 1-Ethyl-3-(3-dimethylaminopropyl)carbodiimide (EDC) and N-hydroxysulfosuccinimide (sulfo-NHS).

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Further modifications and alternative embodiments of various aspects of the invention will be apparent to those skilled in the art in view of this description.

Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope of the invention as described in the following claims.

EXAMPLES

Methods

Synthesis of Thioglucose-Stabilized Gold Nanoparticles

In a representative synthesis, 500 µl (41.2 mM) of 1-thio-β-D-glucose sodium (Glc-SNa, Sigma-Aldrich) was added to 6.25 mL (2.89 mM) of Gold (III) Chloride (30 wt. % in diluted HCl, Sigma) at room temperature. After 30-60 seconds, a change in color from yellow to brown was observed which indicated the formation of the gold nanoclusters. The mixture solution was vortexed for 5 minutes until the colour turned dark brown. The solution was then transferred to a falcon tube with a filter and centrifuged at 3000 g for 30 minutes. This was repeated thrice and finally the residue was diluted with more water. The UV spectrum of the resultant solution was measured to confirm the synthesis.

Synthesis of Amphotericin B Conjugated Thioglucose-Stabilized Gold Nanoparticles.

1 mL of thioglucose-stabilized gold nanoparticles (0.35 µmol) was mixed with 1 mL of phosphate buffer saline (PBS) and then diluted to 5 mL with water. To the solution, 3.5 µmols of 1-Ethyl-3-(3-dimethylaminopropyl)carbodiimide (EDC, Alfa-Aesar) and 3.5 µmols of N-hydroxysulfosuccinimide (sulfo-NHS, Sigma-Aldrich) was added and sonicated for five minutes. Then, to this solution 3.5 µmols of amphotericin B (Sigma, A4888-1G, Lot #016M4164V+ 80% HPLC powder) solution in DMSO (Alfa Aesar) was added, and the mixture was sonicated further for 2 h at room temperature. Then the contents were dyalised (Spectra/Por® dialysis tubing, diameter 4.6 mm, MWCO 6-8 KD) in 1.5 L water overnight. The contents of the dialysis tubing was then passed through a 0.45 µm (FP 30/0.45 Whatman, GE) filter and stored at temperature between 2-8° C. until further usage.

Ultraviolet Spectroscopy Analysis of Amphotericin B Aggregation State.

The UV absorption spectra of amphotericin B preparations and naked gold nanoparticles were analysed on samples dissolved in sterile water or DMSO.

All UV measurements were carried out on UV mini-1240 (Shimadzu).

First experiments were performed to compare the UV absorption of the amphotericin B preparations dissolved in water or DMSO. Before analysis, naked gold nanoparticles were dissolved in MilliQ water, amphotericin B was dissolved in DMSO, and amphotericin B conjugated thiohexose or thiopentose stabilized nanoparticles were analysed both in water and DMSO, in order to investigate the state of amphotericin B after conjugation to the nanoparticles.

Then, the absorption of the amphotericin B conjugated gold nanoparticles was compared to that of Ambiosome and Fungizone. In these experiments, Ambiosome (Gilead) was suspended in sterile water and analysed at concentration 12.5 µg/ml. Fungizone was suspended in sterile water and analysed at concentration 30 µg/ml. Two independently prepared samples of amphotericin B conjugated gold nanoparticles (indicated in FIG. 9 as preparations A and B) were diluted to concentration 50 µg/ml in sterile water.

Ultraviolet Spectroscopy Analysis for Quantification of Amphotericin B Conjugated to the Gold Nanoparticles.

Since it is difficult to quantify the amount of amphotericin B present in aqueous suspension, due to presence of multiple aggregates. the drug quantification was done with the monomeric form of the drug in DMSO. Indeed, it was found that the molar absorptivity of unconjugated Amphotericin B (62.5 µg/mL) remains the same when conjugated to gold nanoparticles (AuNP) (FIG. 17C); both where analysed in DMSO. First, a standard curve with absorbance values for different concentrations of amphotericin B in DMSO was plotted. Then, the absorbance of the lyophilized amphotericin B conjugated thiohexose or thiopentose stabilized gold nanoparticles resuspended in DMSO was measured. This absorbance was correlated with concentration from the standard curve to obtain the amount of amphotericin B present in the suspension (for example as in FIG. 17).

Figure 17:
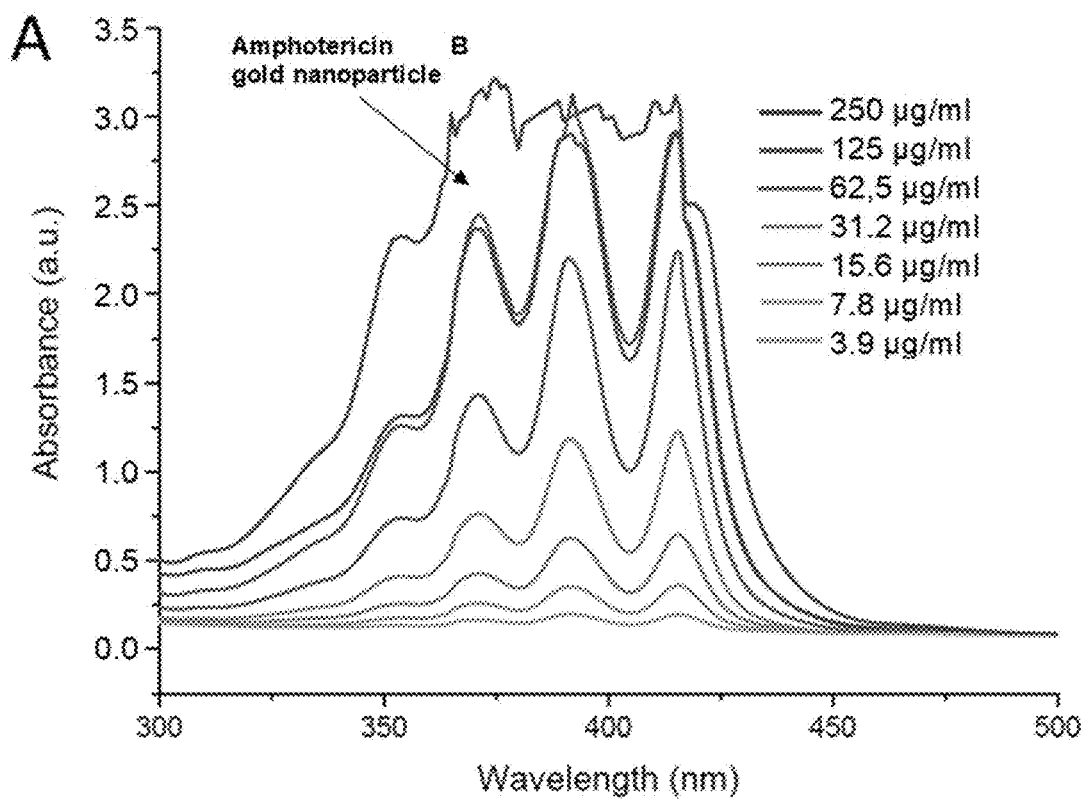
FIG. 17 A), D) UV absorption spectra of different concentrations of Amphotericin B in DMSO plotted against wavelength. Amphotericin B conjugated gold nanoparticles in DMSO showed similar absorption spectra as free amphotericin B. B), E) Standard curve of UV absorption (at 370 nm) vs concentration for Amphotericin B in DMSO. At 250 µg/mL, some level of saturation is observed. Therefore, for making the standard curve, the highest concentration of Amphotericin B used was 200 µg/mL. A) and B) and D) and E) were obtained from two different experiments. C) UV absorption spectra of Amphotericin B (62.5 µg/mL, in DMSO) unconjugated (T1) and conjugated with AuNP (T2); Au concentration is 50 µM; T3: AuNP.
Figure 17:
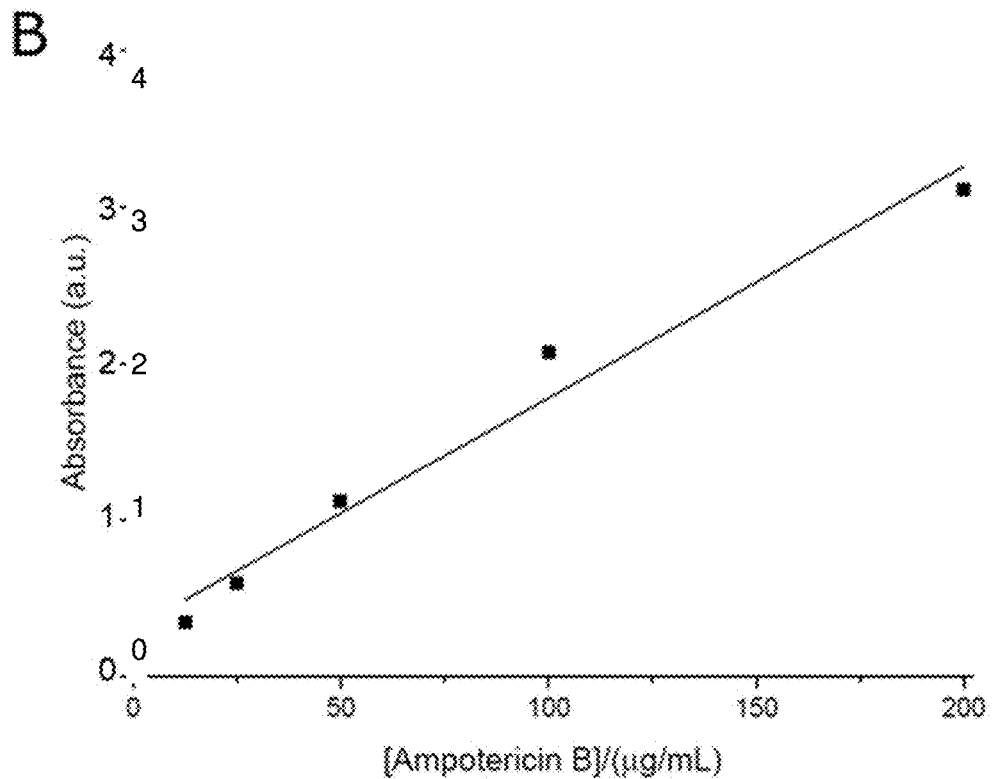

More in details, amphotericin B was dissolved in 2 mL of DMSO (0.5 mg/ml) and serially diluted. The absorbance of the serially diluted concentrations of amphotericin B was measured in disposable cuvettes and recorded. Absorbance was plotted against concentration to create a standard curve as shown in FIG. 17. Dispersions of naked gold nanoparticles and of amphotericin B conjugated thiohexose or thiopentose stabilized gold nanoparticles in water were transferred to a disposable cuvette and the absorbance was recorded. All UV measurements were carried out on UV mini-1240 (Shimadzu).

For quantification of amphotericin B conjugated to the nanoparticles, an aqueous dispersion of the amphotericin B conjugated thiohexose or thiopentose stabilized gold nanoparticles (1 mL) was lyophilized. Then, the lyophilized product was resuspended in 1 mL DMSO. The absorbance was measured. The corresponding absorbance value was correlated with the concentration of amphotericin B from the standard curve (described above) to reveal the concentration of amphotericin B in the original nanoparticle solution.

Fourier Transform Infrared Spectroscopy (FT-IR)

Amphotericin B (1 mg) was dissolved in a minimum volume of methanol. Aqueous dispersions of naked gold nanoparticles (1 ml) and amphotericin B conjugated gold nanoparticles (1 ml) were first lyophilized and then resuspended in 20 µL of methanol. 5 µL of the methanolic suspensions were dropped on the probe to dry before applying pressure gauge to record the infrared spectrum. All measurements were performed on Perkin Elmer Spectrum 100 FT-IR spectrometer. The transmittance spectra were baseline corrected and slightly smoothed for graphical representation.

Determination of the Concentration of Gold in Nanoparticle Preparations.

The concentration of gold in the solution of nanoparticles was measured by Inductively Coupled Plasma Optical Emission Spectrometer (ICP-OES) (Optima 8000; Perkin Elmer, Massachusetts; USA). To this aim, an external calibration series from 0.1 mg/L to 5 mg/L was prepared using a gold standard solution. Sample solutions were first dried (typically ranging from 200 µl to 1 mL) and then dissolved in Aqua regia; this solution was analysed using ICP-OES. Each experiment was done in triplicates and the experiments were repeated at least twice. Mean value (in µg/mL) of at least two independent experiments were reported.

Transmission Electron Microscopy

Transmission electron microscopy measurements were performed on a Zeiss EM 912 Omega. The samples were prepared by gently dropping 10 µL of the samples onto grids and subsequent solvent evaporation in a dust protected atmosphere.

Atomic Force Microscope (AFM) Characterization and Analysis

Samples were prepared on freshly cleaved Mica and dried at room temperature. AFM images were acquired using a commercial AFM system (JPK NanoWizard 3 and 4). Measurements were done in AC Mode with SNL-10 probes (Bruker). Measurements were performed at 25° C., 35-40% RH. AFM images were collected with 1024×1024 pixels/frame. Each AFM tip was characterized prior to usage. Analyses of AFM images were performed with the JPK Data Processing software. Note that for the height analyses of the AFM images, the baseline height was leveled against the flat base plane of the substrate. All AFM images were only subjected to the primary first order flattening correction to remove sample tilt so that potential artefacts induced by other image processing steps were avoided as much as possible.

Dynamic Light Scattering

Figure 5:
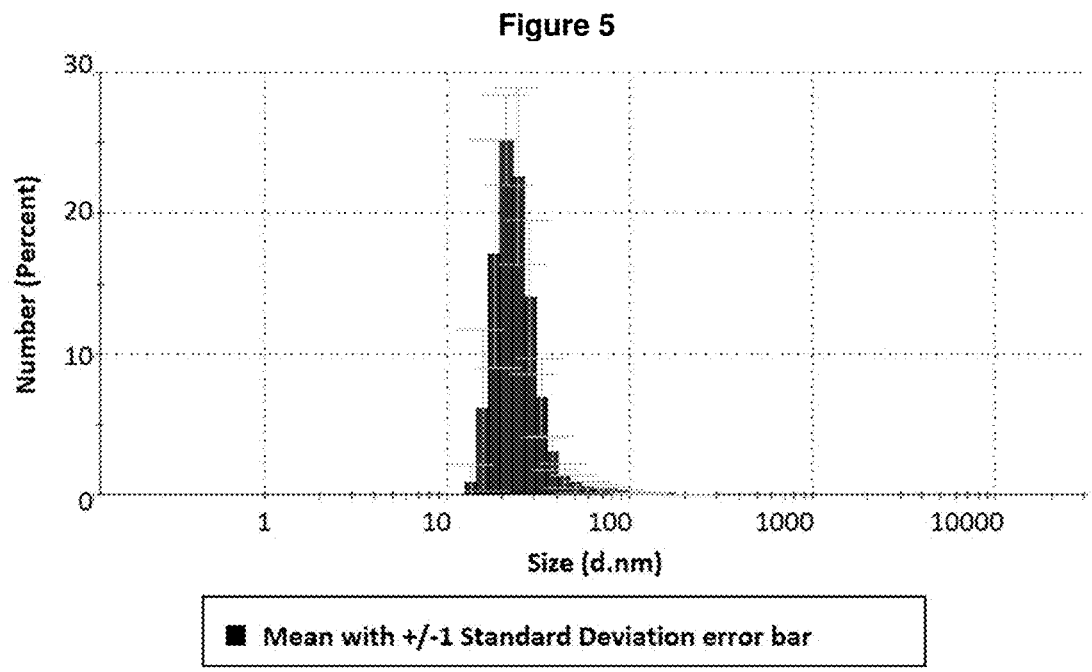
FIG. 5 Dynamic Light scattering measurements of the amphotericin B conjugated thioglucose stabilized gold nanoparticles.

Dynamic light scattering measurements were carried out at a scattering angle of 1730 with a Malvern Zeta Nanosizer working at 4 mW He—Ne laser (633 nm). The nanoparticles were all measured in milliQ water. The chosen refractive index was that of gold and the chosen solvent was water. Every measurement was carried out three times with 10-100 counts each (automated). Several samples from several different synthesis experiments were measured. These analyses showed that the average size (by number) remains similar. FIG. 5 shows the representative image of one exemplary experiment.

Zeta Potential Measurement

A Malvern Zetasizer instrument was used to measure the electrophoretic mobility of nanoparticles at different times of dialysis against MilliQ water. The Helmholtz-Smoluchowski equation was used to correlate the measured electrophoretic mobilities to the zeta potentials. Three replicates of each sample, at concentration of about 50 µg/ml, were measured six times at 25° C. in MilliQ water.

Antifungal Susceptibility Testing

The minimum inhibitory concentrations (MICs) of fluconazole, amphotericin B, amphotericin B thiohexose or thiopentose stabilized gold nanoparticles, and of naked gold nanoparticles were determined using broth microdilution methods following the guidelines of the Clinical and Laboratory Standards Institute (Reference Method for Broth Dilution Antifungal Susceptibility Testing of Yeasts, Alexander B. D., 2017, M27-A4). Microtiter 96-well plates containing two-fold serial dilutions, at final concentrations ranging from 16 to 0.125 mg/ml, of the test agents in RPMI-1640 medium (buffered with MOPS and adjusted to pH=7) were inoculated with the freshly-prepared fungal suspensions. Microtiter plates were incubated at 35° C. for 24-72 hrs according to the tested species. The MIC for fluconazole was determined as the minimum concentration required to reduce the fungal growth by 50% compared to drug-free control wells ($MIC_{50}$). The MIC for amphotericin B, amphotericin B—thiohexose or thiopentose stabilized gold nanoparticles, and naked gold nanoparticles were determined as the minimum concentration required to completely inhibit the fungal growth ($MIC_{100}$).

Time-Kill Analysis

Time-kill analysis was performed in order to assess the effect of amphotericin B-thiohexose or thiopentose stabilized gold nanoparticles on the growth kinetics of *C. neoformans* strain NR-41298. *C. neoformans* strain NR-41298 was challenged with amphotericin B at 2 µg/ml or amphotericin B conjugated to stabilized gold nanoparticles at 2 µg/ml and the fungal growth was followed-up at 0, 0.5, 1, 1.5, 2, 2.5, 3, 3.5, 4, 5, 6, 12, 24, and 48 hrs of incubation at 35° C. At the respective time points, aliquots were sampled serially, diluted, and plated onto YPD-agar plates and incubated for 72 hrs at 35° C. The numbers of CFU/ml were determined and plotted against the respective times points.

Biofilm Eradication Assay

The effect of amphotericin B—thiohexose or thiopentose stabilized gold nanoparticles on cryptococcal mature biofilms was measured using a biofilm-XTT reduction assay. An overnight culture of a strong biofilm-forming *C. neoformans* isolate (NR-41298) was diluted 1:100 in RPMI-1640 medium supplemented with 1% glucose and incubated in tissue culture treated 96-well plates for 72 hrs at 35° C. The formed biofilms were rinsed twice with PBS to remove non-adherent cells and then exposed to fresh RPMI-1640 medium containing amphotericin B thiohexose or thiopentose stabilized gold nanoparticles or amphotericin B at concentrations 0.25, 0.5, and 1 µg/ml, and incubated at 35° C. Untreated biofilms were used as negative controls. After 24 h of biofilm incubation following treatment, the biofilm was rinsed twice with PBS, and mixed with 100 µl of an XTT-menaquinone solution prepared fresh, and incubated at 37° C. for 2 hrs in the dark. After incubation, the OD490 was measured by a spectrophotometer to quantify biofilm activity.

Intracellular Anticryptococcal Activity

To assess the activity of amphotericin B—thiohexose or thiopentose stabilized gold nanoparticles against the intracellular *C. neoformans* NR-41298, murine J774.A1 macrophages were added to a 96-well tissue culture-treated plate at a final density of $1\times10^5$ cells/well and incubated overnight at 37° C. with 5% $CO_2$ in Dulbecco's modified Eagle medium (DMEM) supplemented with 10% FBS. *C. neoformans* strain NR-41298 was grown in YPD overnight at 35° C., harvested, washed twice with PBS, added to the J774.A1 cells at a multiplicity of infection 100:1, and incubated at 37° C. with 5% $CO_2$ for 60 min. The wells were washed twice with DMEM medium and incubated with amphotericin B 1 μg/ml for 3 hrs at 37° C. with 5% $CO_2$ to remove and kill non-adherent or extracellular yeast. Following the amphotericin B treatment, J774.A1 cells were washed twice with DMEM medium, then a fresh DMEM medium containing either the agents in PBS or PBS alone was added, and the plates were incubated at 37° C. with 5% $CO_2$ for 24 h. The supernatants were removed, and the phagocytes were treated with cold Triton X-100 (0.2% solution in water) and incubated at 370 with 5% $CO_2$ for 10 min to lyse the cells. Lysates were serially diluted, spread onto YPD plates, and incubated at 30° C. for 48 h to determine CFU/ml.

In Vitro Assay Against Extracellular *Leishmania*.

*Leishmania major* and *Leishmania mexicana* (*L. mexicana*)::DsRed were used as reference strains. Promastigotes of *L. mexicana* and *L. Major* in the stationary growth phase were cultivated in semi-defined medium (SDM) medium supplemented with 10% heat inactivated fetal calf serum (FCS) and penicillin-streptomycin (P/S) and incubated at 25.5° C.

Growth curves: the following procedure has been carried out to evaluate the leishmanicidal potential of the test preparations in the medium. A 96-well culture plate was seeded with 200 μl of SDM including inhibitory compounds and $0.2\times10^6$ promastigotes/mL. The measurement was carried out at 600 nm starting at day 0. After three days of incubation at 25.5° C., 20 μL of resazurin was added per well and the proliferation quantification measurement continued with plate incubation at 37° C. for 4 hour. All potency data were processed using Excel and Origin software. Raw data was converted into percent survival by setting the high inhibition control as 0% and the no inhibition control as 100%. Curve fitting was carried out using the Boltzmann function.

In Vitro Assay Against Intracellular *Leishmania*.

Amastigotes (intracellular form) of *L. mexicana*::DsRed were cultivated in Schneider's Insect Medium (Sigma) supplemented with 10% FCS and P/S and incubated at 33° C., pH 5.5 (Bates et al., 1993).

Macrophages were derived from bone marrow of C57BL/C mice and grown at 37° C., 5% $CO_2$ for seven days. The continued monolayers were detached from the bottom of petri dish and $0.15\times10^6$ macrophages were seeded on the coverslips in 24 well plates. The infection was carried out using amastigotes of *L. mexicana*::DsRed (MOI=5) at 33° C. for 24 h. After 24 h, the supernatant was discarded and the cells were treated with the inhibitory compounds and incubated at 33° C. up to day 3 of post-treatment. At day 3, macrophages were fixed with 4% paraformaldehyde (PFA) for 20 minutes at room temperature (RT, 20-25° C.).

For fluorescence microscopy analysis, the fixed cells were washed twice with phosphate buffered saline (PBS) and the nucleus was stained using DAPI. Microscopic slides were prepared with 10 μl of Fluoromount™ Aqueous Mounting Medium (Sigma) and flipped upside down the cover slips including the cells.

Haemolytic Assay

Freshly drawn human blood was centrifuged at 500×g for 10 min to isolate erythrocytes. These were washed three times in freshly made PBS and resuspended to 5% vol in PBS (pH 7.4). In a V-shaped, transparent 96-well microtiter plate, 150 μL of erythrocyte suspension was added to 50 μl of serially diluted drug/drug-conjugated nanoparticle solutions. The highest concentration of Amphotericin B and amphotericin B thiohexose or thiopentose stabilized gold nanoparticles used was 50 μg/ml. Untreated samples were used as a negative control, while 1% v/v solution of Triton X-100 was used as a positive control. The plate was incubated for 1 h at 37° C. The plate was then centrifuged at 3500 rpm for 5 min, 100 μL of the supernatant from each well was transferred to a fresh flat-bottomed, transparent microtiter plate, and absorbance at 540 nm was measured. Percentage of haemolysis was determined as $(A-A_0)/(A_{tx}-A_0)\times100$, where A is the absorbance of the test well, $A_0$ the absorbance of the negative controls (without compound), and $A_{tx}$ the absorbance of 100% hemolysis wells (with Triton X-100), all at 540 nm. The $HC_{50}$ values (concentrations causing 50% haemolysis) and errors are reported as averages and standard errors of mean of at least two independent experiments (each experiment was performed in triplicates), respectively. The error of the experiments is less than 10%. For visual representations, the same experiment was carried out in eppendorf tubes. However, the concentration of amphotericin B conjugated gold nanoparticles used was 64 μg/mL and absorbance was not measured or plotted. Pictures were taken with a smartphone camera.

Cytotoxicity of Compounds Against Murine Macrophages

Macrophages were derived from bone marrow of C57BL/6 mice and grown at 37° C. 5% $CO_2$ for seven days. The confluent monolayers were detached from the bottom of petri dish and $0.15\times10^6$ macrophages were seeded on the coverslips in 24 well plates. After 24 h, the supernatant was discarded and the cells were treated with fresh DMEM containing the test compounds and incubated at 33° C. up to 72 h of post-treatment. At the end of 72 h, DMEM was aspired from the wells and the macrophages were washed with PBS. 250 μl of dye solution was added per coverslip and incubated for 45 minutes. 10 μl of dye solution (containing 2 mM propidium iodide and 4 mM fluorescein diacetate) was then loaded on a microscopy slide and the coverslips were mounted on the slides. These slides were imaged using a confocal microscope.

Evaluation of Toxicity Against Mammalian Cells.

The effect of amphotericin B—thiohexose or thiopentose stabilized gold nanoparticles on the viability of the J774A.1 murine macrophages was analysed via a colorimetric assay with MTS (3-(4,5-dimethylthiazol-2-yl)-5-(3-carboxymethoxyphenyl)-2-(4-sulfophenyl)-2H-tetrazolium) (Promega, Madison, WI, USA). J774A.1 cells were cultured at 37° C. and $CO_2$ lower than 5%, then seeded to a 96-well plate and allowed to grow for 24 h. The spent medium was aspirated and the macrophages were then treated with two-fold serial dilutions of free amphotericin, thiohexose or thiopentose stabilized gold nanoparticles, and amphotericin B—thiohexose or thiopentose stabilized gold nanoparticles. Murine macrophages were incubated with different concentrations of the tested compounds (8, 16, 32, 64 μg/ml) at 37° C. for 24 hours. Control cells received sterile PBS. After incubation, treatment was removed and 100 μL of fresh DMEM media was added to each well. Assay reagent MTS was subsequently added, and the plate was incubated for 4 hours. Absorbance readings (at OD490) were taken using a kinetic microplate reader (Molecular Devices, Sunnyvale, CA, USA). The quantity of viable cells after treatment with each compound was expressed as a percentage of the viability of DMSO-treated control cells.

Statistical Analyses

All experiments were performed in triplicates and repeated at least three times. Statistical analyses were performed using GraphPad Prism 6.0 (Graph Pad Software, La Jolla, CA, USA). P-values were calculated using one-way ANOVA, and P-values <0.05 were considered significant. Data are presented as means±standard deviation.

Example 1. Design and Synthesis of the Thioglucose Stabilized Gold Nanoparticles Conjugated to Amphotericin B Aurochloric acid was reduced and capped by thioglucose as described in details in the method section (FIG. 1), obtaining stabilized gold nanoparticles having thioglucuronic acid molecules connected to the surface of the gold nanoparticles. Optimal ratios thioglucose:aurochloric acid for the formation of the gold nanoparticles were comprised between 1:0.9 and 1:1.9. In the resulting preparation, the gold core of the nanoparticles is stabilized through Au—S bond.

The obtained thioglucose stabilized gold nanoparticles showed size 2-5 nm (FIG. 3A) and zeta potential of ±30 mV. The negative zeta potential could be attributed to the carboxylic acid groups of the thioglucuronic acid molecules bound to the surface of the nanoparticles.

Figure 6:
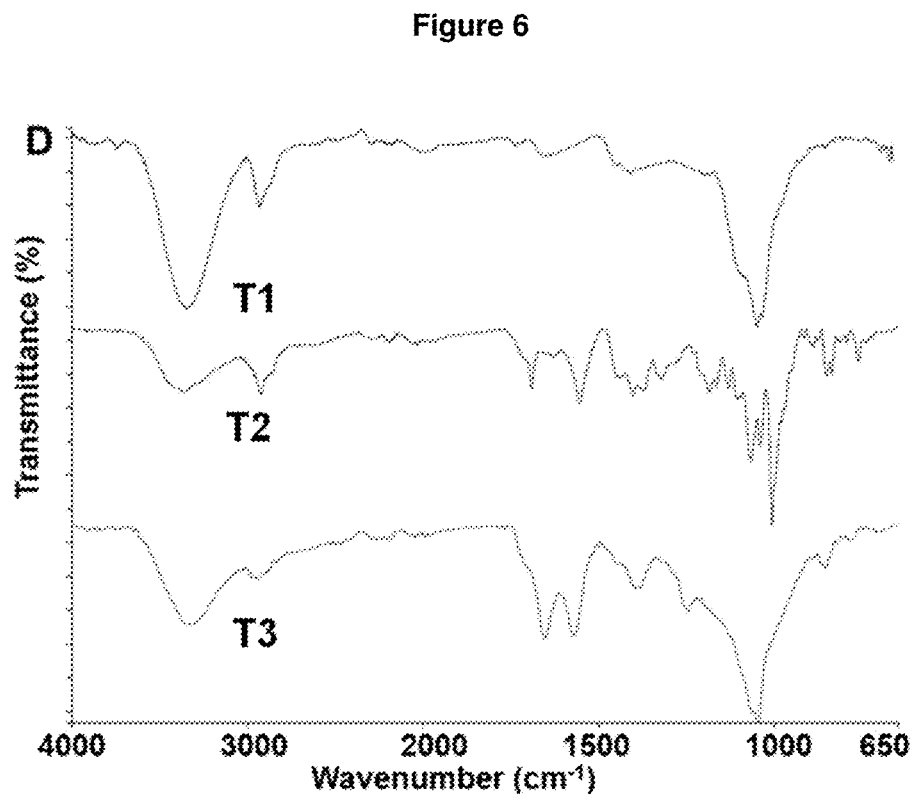
FIG. 6 FT-IR analysis confirming the conjugation of amphotericin B with the gold nanoparticles. 1=naked gold nanoparticles in $H_2O$; 2=Amphotericin B, 3=Amphotericin B conjugated to gold nanoparticles.

In a second step, the carboxylic acid groups of the thioglucuronic acid molecules were activated using EDC (1-Ethyl-3-(3-dimethylaminopropyl) carbodiimide)/sulpho-N-hydroxysuccinamide chemistry, before that a solution of amphotericin B (dissolved in DMSO) was added to it, to form the amphotericin B conjugated to the thioglucose stabilized gold nanoparticles, wherein one amphotericin B molecule is covalently bound to one of the thioglucuronic acid molecules via covalent linkage of an amino group of amphotericin B and a carboxylic acid group of thioglucuronic acid, as confirmed by IR-analysis (FIG. 6). These nanoparticles were then obtained by subjecting the resultant solution to dialysis in milliQ water overnight, and then characterized by transmission electron microscopy (TEM) (FIG. 3B), UV absorption spectrum, and fluorescence spectroscopy.

In the synthesis reaction, 0.35 μmol of gold nanoparticles were reacted with 3.5 μmols of amphotericin B, giving a molar ratio of gold nanoparticle to amphotericin B of 1:10.

Example 2. Design and Synthesis of the Thiomannose Stabilized Gold Nanoparticles Conjugated to Amphotericin B Thiomannose was synthetizes by using the following scheme:

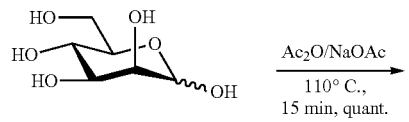

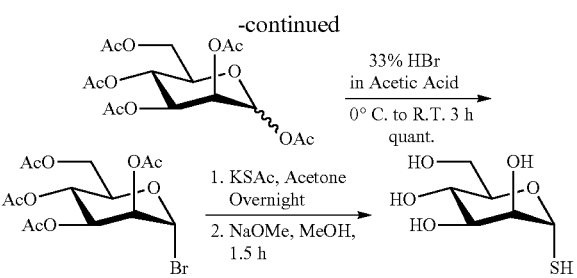

Aurochloric acid was reduced and capped by thiomannose as described in Example 1, obtaining stabilized gold nanoparticles having thiomannuronic acid molecules connected to the surface of the gold nanoparticles. Optimal ratios thiomannose:aurochloric acid for the formation of the gold nanoparticles were comprised between 1:0.9 and 1:1.9. In the resulting preparation, the gold core of the nanoparticles is stabilized through Au—S bond.

Figure 3:
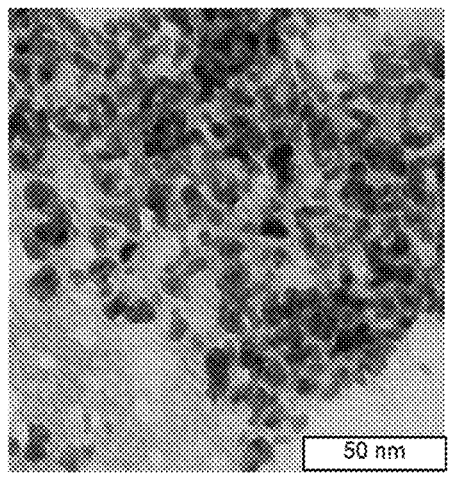
FIG. 3 Transmission electron microscopy images of naked thioglucose (A) and thiomannose (C) gold nanoparticles and of amphotericin B conjugated gold nanoparticles (B). The figures show the core structure of the gold nanoparticles to be <5 nm.
Figure 3:
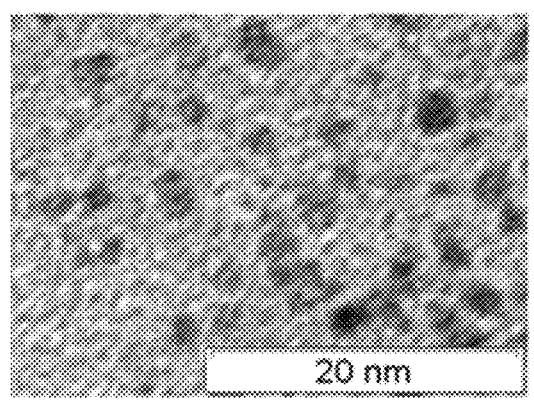
Figure 3:
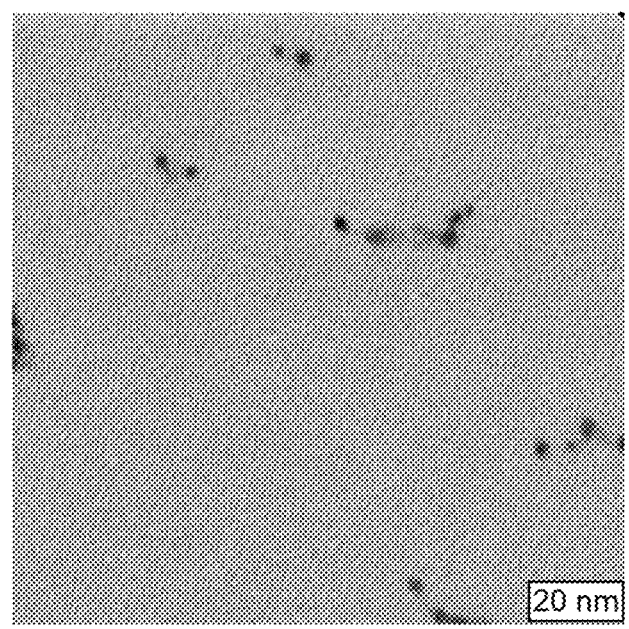

The transmission electron microscopy images of the obtained thiomannose stabilized gold nanoparticles are shown in FIG. 3C.

The conjugation of the thiomannose stabilized gold nanoparticles to amphotericin B was performed as described in Example 1.

Figure 2:
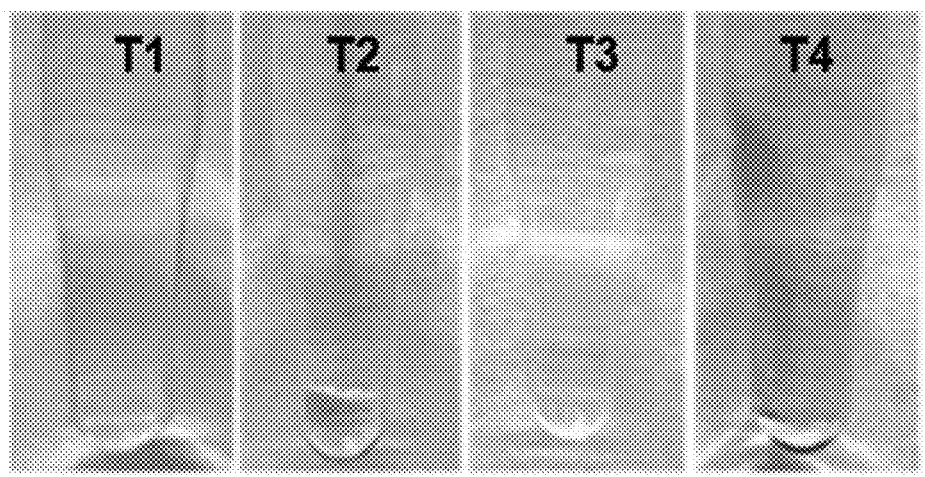
FIG. 2 Solubility in water of free amphotericin B and of amphotericin B conjugated to gold nanoparticles. T1=Amphotericin B in DMSO, T2=Amphotericin B in $H_2O$, T3=Amphotericin B conjugated to gold nanoparticles, T4=naked gold nanoparticles in $H_2O$.

Example 3. Characterization of the Stabilized Gold Nanoparticles Conjugated to Amphotericin B The solubility of amphotericin B in DMSO, and water was compared to that of amphotericin B conjugated to the thioglucose stabilized gold nanoparticles in water. FIG. 2 demonstrates that free amphotericin B (T1) is soluble in DMSO but almost insoluble in water (T2). In contrast, amphotericin B conjugated to gold nanoparticles is water soluble (T3) and results in a clear solution. Therefore, it can also be affirmed that the amphotericin B conjugated gold nanoparticles as well as naked gold nanoparticles (T4) are water dispersible up to concentrations of 250 μg/ml.

Transmission electron microscopy analysis of naked thioglucose or thiomannose stabilized gold nanoparticles (FIG. 3A, 3C) confirms that the size of the gold nanoparticles is <5 nm.

Figure 4:
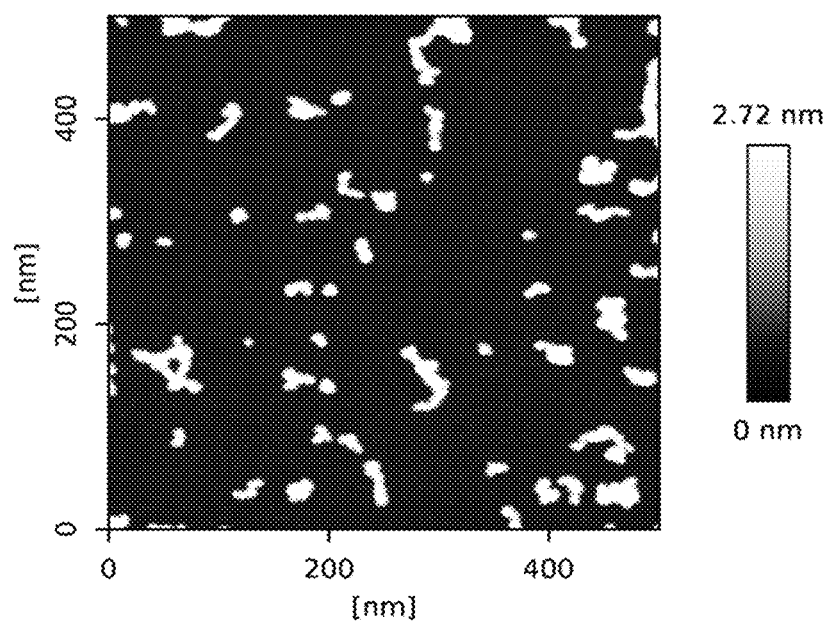
FIG. 4 Atom Force Microscopy (AFM) measurements to determine particle size of naked gold nanoparticles in (A, B), and of amphotericin B conjugated thioglucose stabilized gold nanoparticles in (C, D, E).
Figure 4:
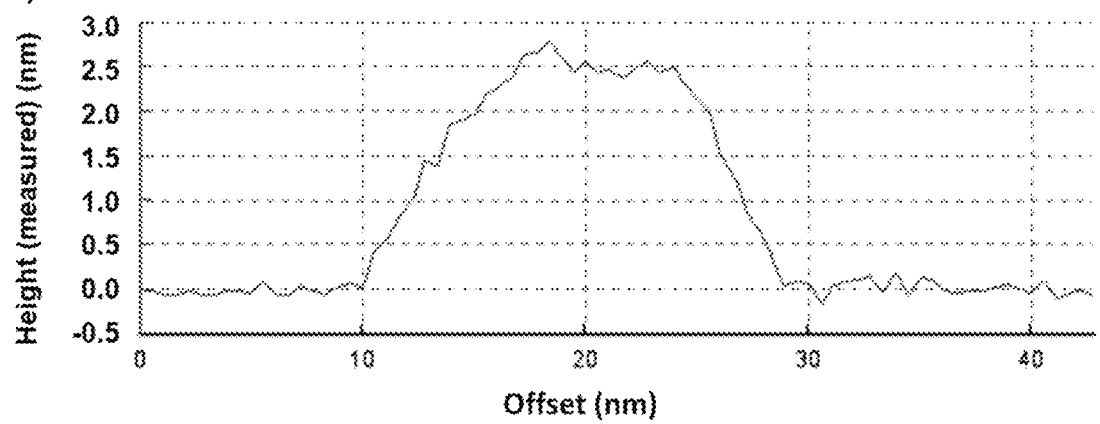

Amphotericin B conjugated thioglucose stabilized gold nanoparticles resulted to have an average size of 6-8 nm, and a particle size range comprised between 5 nm-12 nm, as determined by Atomic Force Microscope (AFM) analysis (FIG. 4), wherein the particle size represents the diameter of the gold nanoparticle conjugated to amphotericin B, i.e. the diameter of the gold nanoparticle core plus the ligands. The diameter of naked gold nanoparticles showed an average value of about 2 nm.

Figure 19:
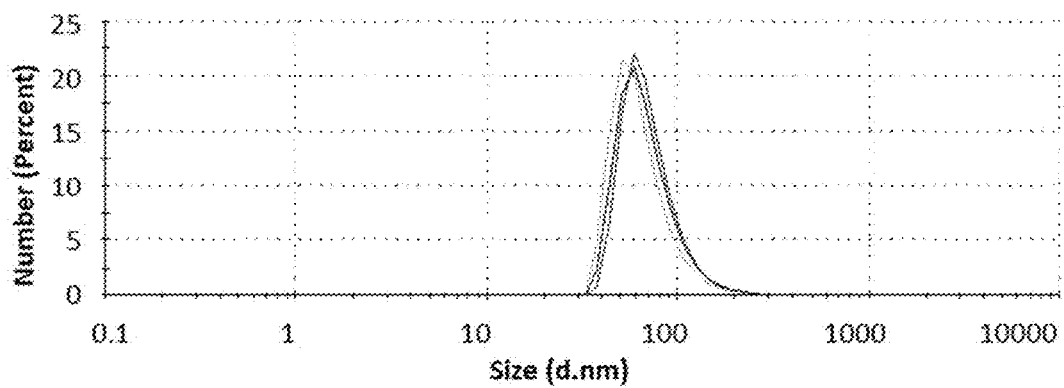
FIG. 19 Dynamic Light scattering measurements of the amphotericin B conjugated thioglucose stabilized gold nanoparticles.

The hydrodynamic radius of the amphotericin B thioglucose stabilized gold nanoparticles resulted to have an average size bigger than 20 nm (FIG. 5) and reaching median values of 45 nm (FIG. 19), and thus higher than the naked thioglucose stabilized gold nanoparticles (<5 nm).

Example 4. Infrared Spectroscopy Analysis

Infrared spectroscopy of amphotericin B thioglucose stabilized gold nanoparticles reveals distinct peaks at 1654 cm$^{-1}$ (C=O stretching) and 1574 cm$^{-1}$ (N—H bending) which is due to carbonyl stretch and N—H bending respectively, and are absent in case of amphotericin B and of naked gold nanoparticles (FIG. 6). These findings prove the formation of an amide bond between an amino group of amphotericin B and a carboxylic acid group of thioglucuronic acid, as expected from the synthesis reaction. A shoulder peak at around 1700 cm$^{-1}$ may reflect the free carboxylic acid group of the amphotericin B.

Example 5. Stability Analysis

Figure 7:
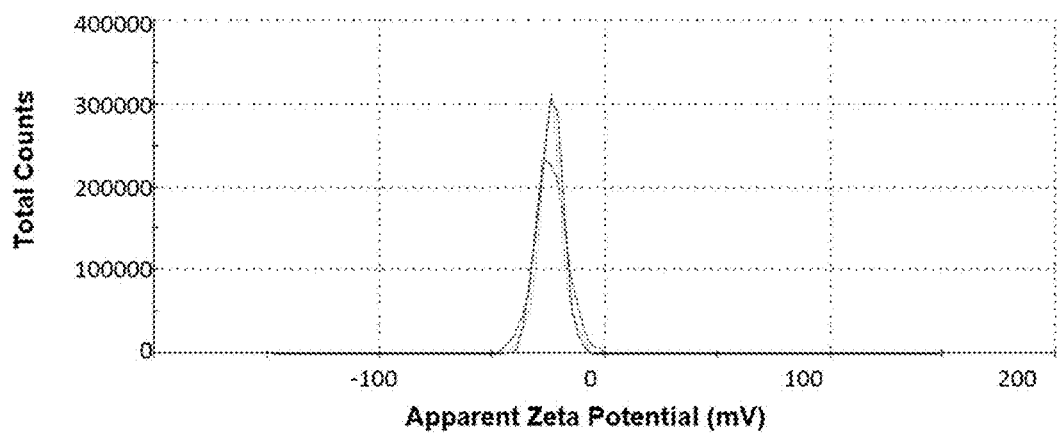
FIG. 7 Zeta potential analysis of amphotericin B conjugated gold nanoparticles.

Amphotericin B thioglucose stabilized gold nanoparticles were negatively charged as the naked thioglucose stabilized gold nanoparticles, and showed Zeta potential value of −28 mV (FIG. 7). It has been reported that a zeta potential of −30 mV is strictly related with particle stability. Moreover, the negative zeta potential is correlated to better water dispersibility and concomitantly better bioavailability.

Moreover, it was found that the amphotericin B thioglucose stabilized gold nanoparticles after storage at temperature comprised between 4-8° C. for six months have a similar appearance without signs of aggregations and similar anti-parasitic activity as the fresh nanoparticles.

These findings demonstrate the amphotericin B thioglucose stabilized gold nanoparticles, and thus the amphotericin B thiohexose or thiopentose stabilized gold nanoparticles can be stored at 4-8° C. for more than six months without affecting stability or activity.

Example 6. UV-Absorption Spectrum of Amphotericin B Stabilized Gold Nanoparticles Amphotericin B molecules interact through their polyene chains in aqueous media which causes self-aggregation above a threshold concentration of around 0.2 μM [Serrano et al., 2008]. This results in a mixture of water-soluble monomers, water-soluble self-aggregates (dimers or oligomers) and water-insoluble aggregates (poly-aggregates or multi-aggregates). It has been shown, that amphotericin B toxicity, efficacy and pharmacokinetics depend on the aggregation state of the amphotericin B molecules. Although there is still controversy among the scientific community, monomer and dimeric aggregation states are related to both higher efficacy and higher toxicity, while the poly-aggregates show a safer profile but are required to be administered at higher doses to elicit a similar effect to monomeric and dimeric amphotericin B. The determination of the amphotericin B aggregation state may be easily performed by UV spectrophotometry since each aggregation state has a unique absorption spectrum.

Figure 8:
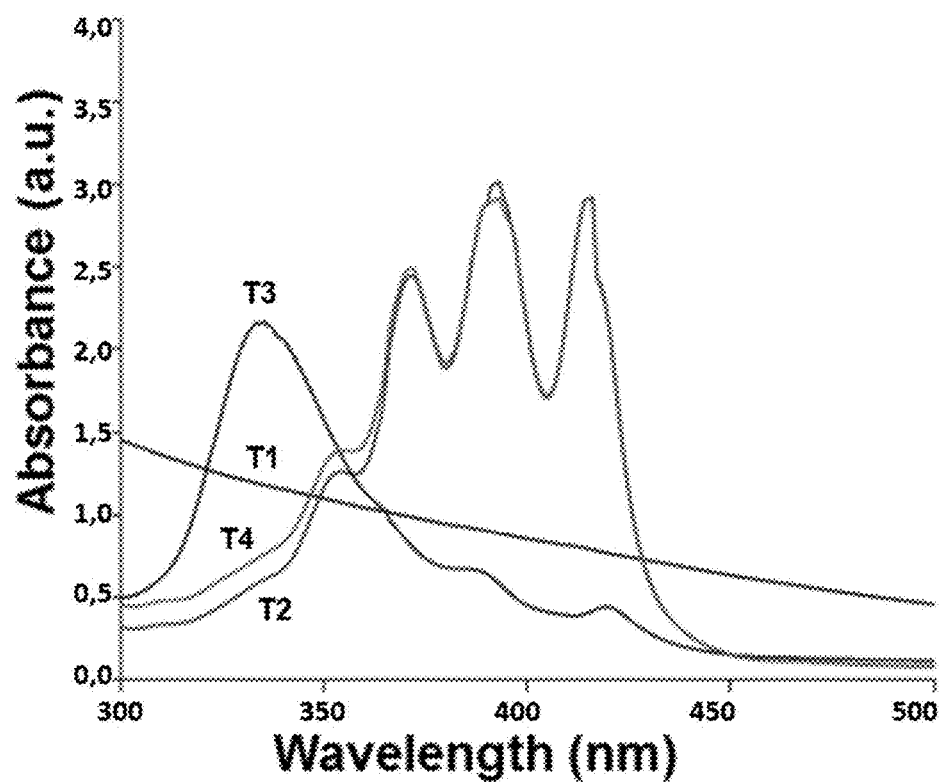
FIG. 8 Ultraviolet absorption spectra of the gold nanoparticles and of free amphotericin B. 1=naked gold nanoparticles in $H_2O$; 2=Amphotericin B in DMSO, 3=Amphotericin B conjugated to gold nanoparticles in $H_2O$, 4=Amphotericin B conjugated to gold nanoparticles in DMSO.

Amphotericin B is characterized by four bands with peaks around 325-340 (peak 1), 363-368 (peak II), 383-388 (peak III), and 406-412 nm (peak IV). Peak I is characteristic of amphotericin B water soluble self-aggregate dimeric form. Absorption at peaks II-III-IV is characteristic of amphotericin B in monomeric form. In accordance, amphotericin B dissolved in DMSO resulted to absorb sharply at 365 nm, 384 nm and 408 nm (FIG. 8). The suspension of naked gold nanoparticles in water showed no sharp peaks but absorbed over a range from 500 nm to 250 nm. The amphotericin B thioglucose stabilized gold nanoparticles dispersed in water showed an absorption peak at around 325 nm, which is characteristic of amphotericin B water soluble self-aggregate dimeric forms. As expected, the amphotericin B stabilized gold nanoparticles lyophilized and dissolved in DMSO, showed the three characteristic peaks of monomeric amphotericin B.

Figure 9:
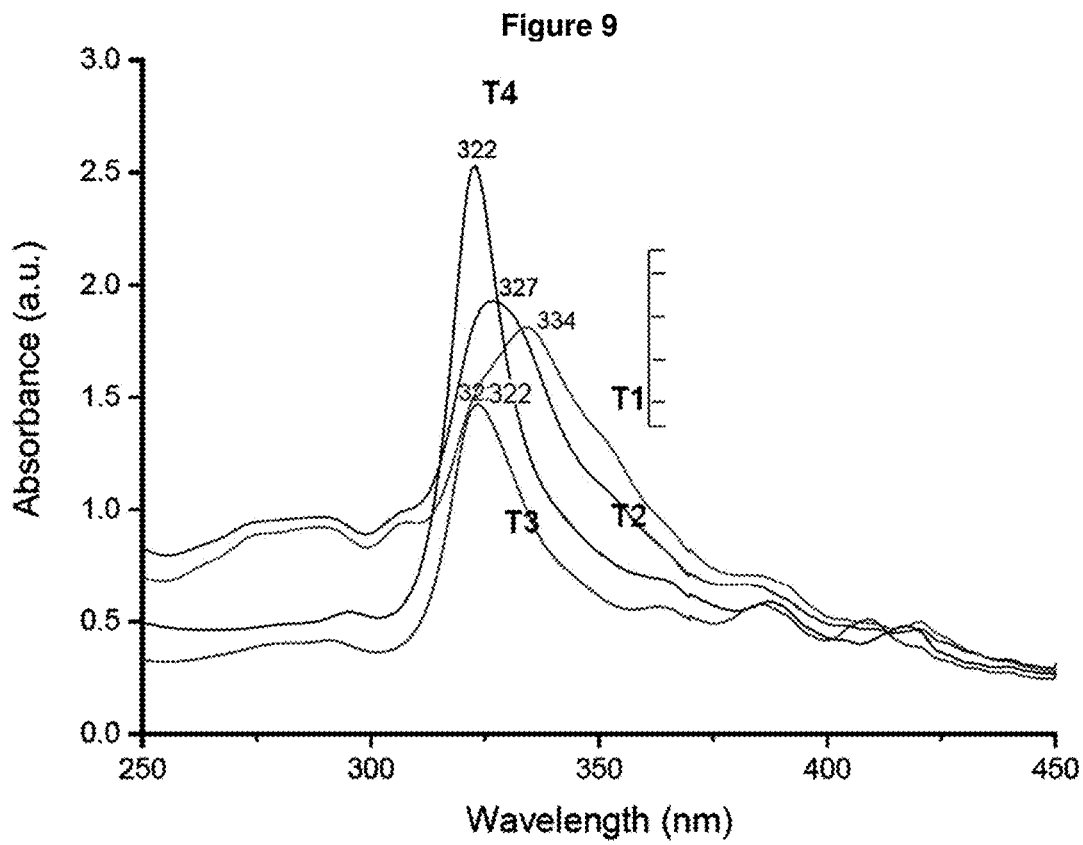
FIG. 9 Ultraviolet absorption spectra of amphotericin B conjugated gold nanoparticles (preparations A and B) compared to Fungizone and Ambisome. T1=preparation A, 2=preparation B, 3=Fungizone, 4=Ambisome.

In order to further investigate the absorption spectrum of amphotericin B stabilized gold nanoparticles, this was compared to that of commercial amphotericin B preparations Fungizone® and Ambisome® (FIG. 9). Results showed that both Ambisome® and Fungizone® absorb very strongly at 322 nm, indicative of the dimeric aggregates. The absorption of the amphotericin B conjugated gold nanoparticles (T1, T2=preparations A, B respectively) were slightly red shifted to wavelengths of approximatively 330 nm. The absorption maxima were also not as strong. This probably indicates that some other aggregated states are present. To notice, amphotericin B conjugated gold nanoparticles also absorbed in the region of 260 to 300 which has never been observed in the amphotericin B formulations so far. This might explain the lower toxicity of amphotericin B conjugated thioglucose stabilized gold nanoparticles in comparison with free amphotericin B or Fungizone®.

Example 7. Antifungal Susceptibility Testing

Amphotericin B nanoparticle formulations were initially tested to evaluate the change in the antifungal activity of amphotericin. To this aim, the minimum inhibitory concentrations (MIC) of free amphotericin B, naked thioglucose stabilized gold nanoparticle, and of amphotericin B bound thioglucose stabilized gold nanoparticles were determined against the most problematic fungal pathogens for humans namely, *Aspergillus* sp., *Candida* sp. and *Cryptococcus* sp. Aspergillosis is a disease which claims about 300,000 cases globally every year. The disease is caused by exposure to *Aspergillus fumigatus*. We tested the compounds against three fluconazole-resistant strains of *Aspergillus* sp. It was observed (Table 1) that amphotericin B when conjugated to thioglucose stabilized gold nanoparticles was twice as active (MIC=1 μg/mL) as the parent drug (MIC=2 μg/mL). The naked gold nanoparticles were not active till 16 μg/mL against the pathogens.

Then the susceptibility of *Candida* spp. to the nanoparticles were checked. These included six strains of *C. albicans*, five strains of *C. auris*, four strains of *C. glabrata*, three strains of *C. krusei*, two strains of *C. parapsilosis* and three *C. tropicalis*. Amphotericin B bound thioglucose stabilized gold nanoparticles were equally active as amphotericin B against all the strains of *C. albicans* except *C. albicans* ATCC 10231 and NR 29448, where they were twice more potent than amphotericin B. Moreover, amphotericin B bound thioglucose stabilized gold nanoparticles were more active than free amphotericin B against the two tested strains of *C. tropicalis*. Against all other tested strains of *Candida*, amphotericin B bound thioglucose stabilized gold nanoparticles were as active as free amphotericin B.

Then the activity of the compounds was evaluated against the causative agents of cryptococcosis and cryptococcal meningitis. The pathogens evaluated consisted of four strains of *C. gatti* and four strains of *C. neoformans*. As mentioned earlier *C. neoformans* mostly affects immunocompromised individuals but *C. gatti* has been reported to cause illness in immunocompetent individuals.

Against the four strains of *C. gatti*, amphotericin B thioglucose stabilized gold nanoparticles were twice more potent than free amphotericin B. The MIC of amphotericin B thioglucose stabilized gold nanoparticles was 0.5 μg/mL while the unconjugated drug was active at 1 μg/mL. Of the four tested strains of *C. neoformans*, two of them were resistant to fluconazole and against them amphotericin B was active only at 2 μg/mL, whereas amphotericin B thioglucose stabilized gold nanoparticles were active at only 0.5 μg/mL. Thus, amphotericin B thioglucose stabilized gold nanoparticles were more active in comparison to free amphotericin B against all tested strains of criptococcus.

TABLE 1

Minimum inhibitory concentration (MIC) of fluconazole, free amphotericin B and of amphotericin B thioglucose stabilized gold nanoparticles against different fungal isolates.

| | Minimum Inhibitory Concentration (MIC), μg/ml | | | |
|---|---|---|---|---|
| Fungal isolate | Fluconazole | Amphotericin B | Amphotericin B—thioglucose gold nanoparticles | Thioglucose gold nanoparticles |
| *Aspergillus fumigatus* NR-35303 | 128 | 2 | 1 | >16 |
| *Aspergillus fumigatus* NR-35304 | >128 | 2 | 1 | >16 |
| *Aspergillus fumigatus* NR-41312 | 128 | 2 | 1 | >16 |
| *Candida albicans* ATCC 10231 | 2 | 1 | 0.5 | >16 |
| *Candida albicans* ATCC 26790 | 1 | 1 | 1 | >16 |
| *Candida albicans* ATCC 64124 | 128 | 2 | 2 | >16 |
| *Candida albicans* NR 29446 | >128 | 0.5 | 0.5 | >16 |
| *Candida albicans* NR 29448 | >128 | 2 | 1 | >16 |
| *Candida albicans* SC5314 | 0.5 | 1 | 1 | >16 |
| *Candida auris* 381 | 1 | 0.5 | 0.5 | >16 |
| *Candida auris* 385 | >128 | 2 | 2 | >16 |
| *Candida auris* 386 | >128 | 2 | 2 | >16 |
| *Candida auris* 389 | >128 | 2 | 2 | >16 |
| *Candida auris* 390 | >128 | 2 | 2 | >16 |
| *Candida glabrata* ATCC 2001 | 4 | 1 | 1 | >16 |
| *Candida glabrata* ATCC 66032 | 8 | 1 | 1 | >16 |
| *Candida glabrata* ATCC MYA-2950 | 8 | 1 | 1 | >16 |
| *Candida glabrata* CAB 524041 | 4 | 1 | 1 | >16 |
| *Candida krusei* CAB 396420 | 16 | 2 | 2 | >16 |
| *Candida krusei* ATCC-14243 | 16 | 2 | 2 | >16 |
| *Candida krusei* ATCC-34135 | 16 | 2 | 2 | >16 |
| *Candida parapsilosis* CAB 502638 | 0.5 | 0.5 | 0.5 | >16 |
| *Candida parapsilosis* ATCC 22019 | 2 | 0.5 | 0.5 | >16 |
| *Candida tropicalis* ATCC 1369 | 0.5 | 2 | 1 | >16 |
| *Candida tropicalis* ATCC 13803 | 0.25 | 2 | 1 | >16 |
| *Cryptococcus gatti* NR-43208 | 8 | 1 | 0.5 | >16 |
| *Cryptococcus gatti* NR-43209 | 16 | 1 | 0.5 | >16 |
| *Cryptococcus gatti* NR-43210 | 16 | 1 | 0.5 | >16 |
| *Cryptococcus gatti* NR-43213 | 8 | 1 | 0.5 | >16 |
| *Cryptococcus neoformans* NR-41291 | 16 | 2 | 0.5 | >16 |
| *Cryptococcus neoformans* NR-41295 | 32 | 2 | 0.5 | >16 |
| *Cryptococcus neoformans* NR-41298 | 4 | 1 | 0.5 | >16 |
| *Cryptococcus neoformans* NR-48767 | 4 | 1 | 0.5 | >16 |

Example 8. Kinetics of Fungicidal Activity

Figure 10:
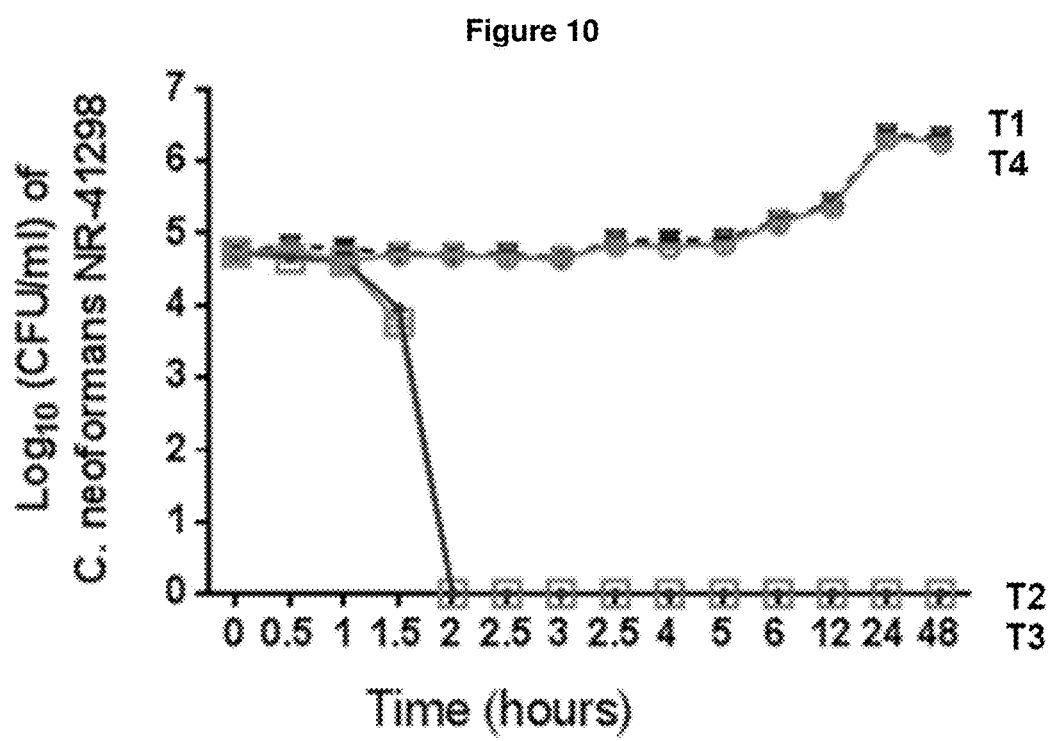
FIG. 10 Time-kill analysis for *C. neoformans* NR-41298 in presence of amphotericin B conjugated gold nanoparticles or of free amphotericin B, both at 2 µg/ml over a 48 hour incubation period at 35° C. The vehicle DMSO and the naked gold nanoparticles served as negative controls. 1=DMSO treated cells; 2=amphotericin B treated cells; 3=amphotericin B conjugated to gold nanoparticles; 4=naked gold nanoparticles. Error bars represent standard deviation values.

In order to check if conjugation of amphotericin B to thioglucose stabilized gold nanoparticles alters the rate of killing, we performed the time kill kinetics of *C. neoformans* NR41298 with amphotericin B bound thioglucose stabilized gold nanoparticles (FIG. 10). At 2 μg/mL, the kinetics of fungicidal activity of amphotericin B bound thioglucose stabilized gold nanoparticles was same as that of free amphotericin B. Within two hours, both amphotericin B bound thioglucose stabilized gold nanoparticles and free amphotericin B were able to bring down the fungal burden by 5 logarithmic scales (FIG. 10). Naked thioglucose stabilized gold nanoparticles had no effect on *C. neoformans*.

Example 9. Activity Against Preformed Biofilms of *C. neoformans* NR-41298

Figure 11:
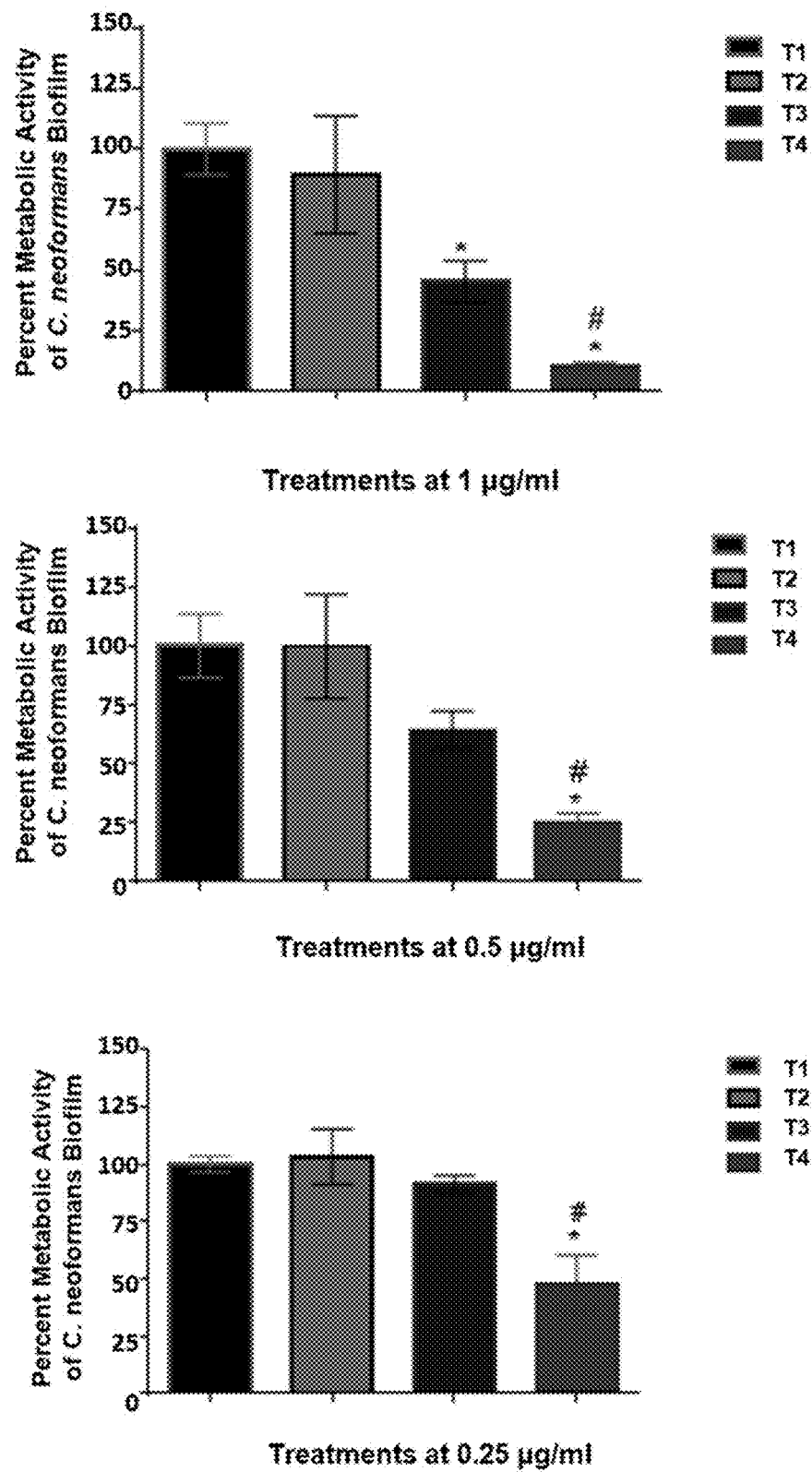
FIG. 11 Biofilm eradicating activity of amphotericin B conjugated gold nanoparticles against *C. neoformans* NR-41298 biofilm was evaluated by the XTT assay. Mature biofilms were treated with either amphotericin B conjugated gold nanoparticles (T4) or free amphotericin B (T3) at concentrations 0.25 µg/ml, 0.4 µg/ml and 1 µg/ml as indicated in the respective graphs, over a 24-hour period. The percent metabolic activity for each treatment was calculated relative to untreated wells. Results are shown as mean±standard deviation obtained from triplicates. T1=DMSO treated cells; T2=naked gold nanoparticles; T3=amphotericin B treated cells; T4=cells treated with amphotericin B conjugated to gold nanoparticles. Asterisk (*) denotes statistical difference between the tested treatments and the negative control (untreated wells), whereas hash (#) indicates a statistical significance between amphotericin B conjugated thioglucose stabilized gold nanoparticles and amphotericin B, The statistical analysis was evaluated using a One-way ANOVA, with post hoc Dunnet's multiple comparisons test ($P<0.05$).

As mentioned earlier, *C. neoformans* is notorious for forming biofilms and surviving therein. These biofilms, termed as cryptococcomas, are recalcitrant to antifungals and human immune response. We hypothesized that multivalent presentation and conjugation to thioglucose stabilized nanoparticles of the drug might render amphotericin B able to destroy biofilms of fungi more effectively than the unbound drug. In order to test this hypothesis, we subjected preformed biofilms of *C. neoformans* to treatment with the amphotericin B bound thioglucose stabilized gold nanoparticles or the free amphotericin B (FIG. 11).

Metabolic activity of the biofilms after 24 h indicated that even at concentrations as low as 0.25 μg/mL, amphotericin B bound to thioglucose stabilized gold nanoparticles was able to bring down the burden by 50%. Free amphotericin B was not very active at this concentration. As we moved to higher concentrations, the activity of both amphotericin B bound thioglucose stabilized gold nanoparticles and amphotericin B increased. When treated with 1 μg/mL of amphotericin B bound thioglucose stabilized gold nanoparticles, the metabolic activity of the biofilms was reduced by 80%. This further emphasizes that amphotericin B bound thioglucose stabilized gold nanoparticles has tremendous potential against biofilm infections of *C. neoformans*.

Example 10. Antifungal Activity Against Intracellular *C. neoformans*

Figure 12:
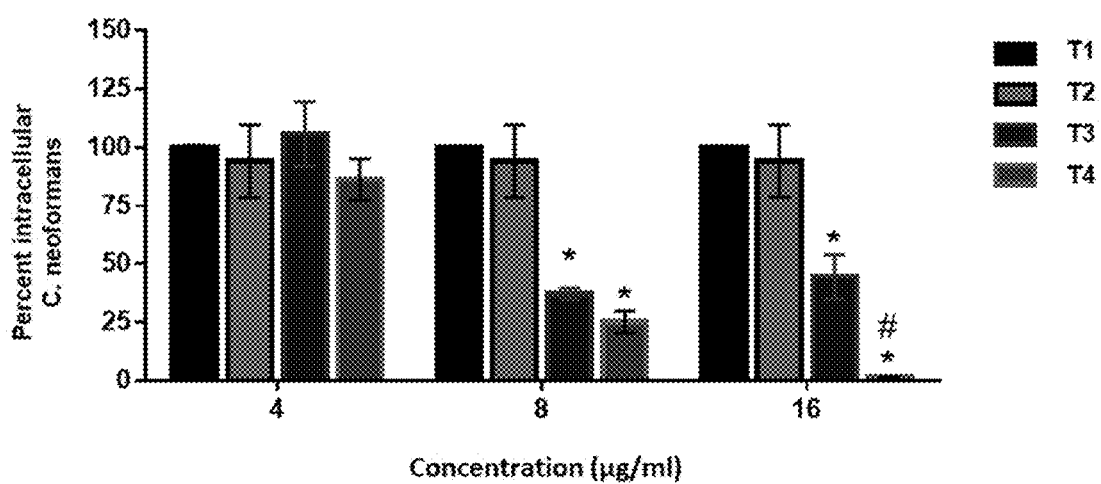
FIG. 12 Antifungal activity of amphotericin B conjugated gold nanoparticles against intracellular *Cryptococcus neoformans*. The J774 mouse macrophages were infected with *C. neoformans* NR-41291, washed to remove non adherent and non-phagocytosed cells, and incubated with fresh medium containing the different treatments: 1=DMSO treated cells; 2=naked gold nanoparticles; 3=amphotericin B treated cells; 4=cells treated with amphotericin B conjugated to gold nanoparticles. After 24 h, macrophages were lysed and the number of *C. neoformans* CFU per well was determined. An asterisk (*) denotes the statistical difference between amphotericin B conjugated gold nanoparticles and the untreated control group (DMSO), whereas hash (#) indicates a statistical significance between the amphotericin B conjugated gold nanoparticles and the free amphotericin B. Statistical significance was assessed with one-way ANOVA, with post hoc Dunnet's multiple comparisons test ($P<0.05$), utilizing GraphPad Prism 6.0 (GraphPad Software, La Jolla, CA).

*C. neoformans* are known to survive and replicate within immune cells. This form of the pathogen is extremely difficult to remove and there is no effective treatment against it. There have been a few attempts towards solving this problem but the clinically used antifungals are not known to be active against the intracellular form of the pathogen. As it can be seen from FIG. 12, amphotericin B bound thioglucose stabilized gold nanoparticles at 8 μg/mL is able to inhibit intracellular growth of *C. neoformans* by 75%. Although amphotericin B shows some effect, it is also toxic to the cells at this concentration. At 16 μg/mL, amphotericin B bound thioglucose stabilized gold nanoparticles were able to inhibit intracellular growth of *C. neoformans* by more than 90%.

Example 11. Activity Against *Leishmania* Parasites

Figure 13:
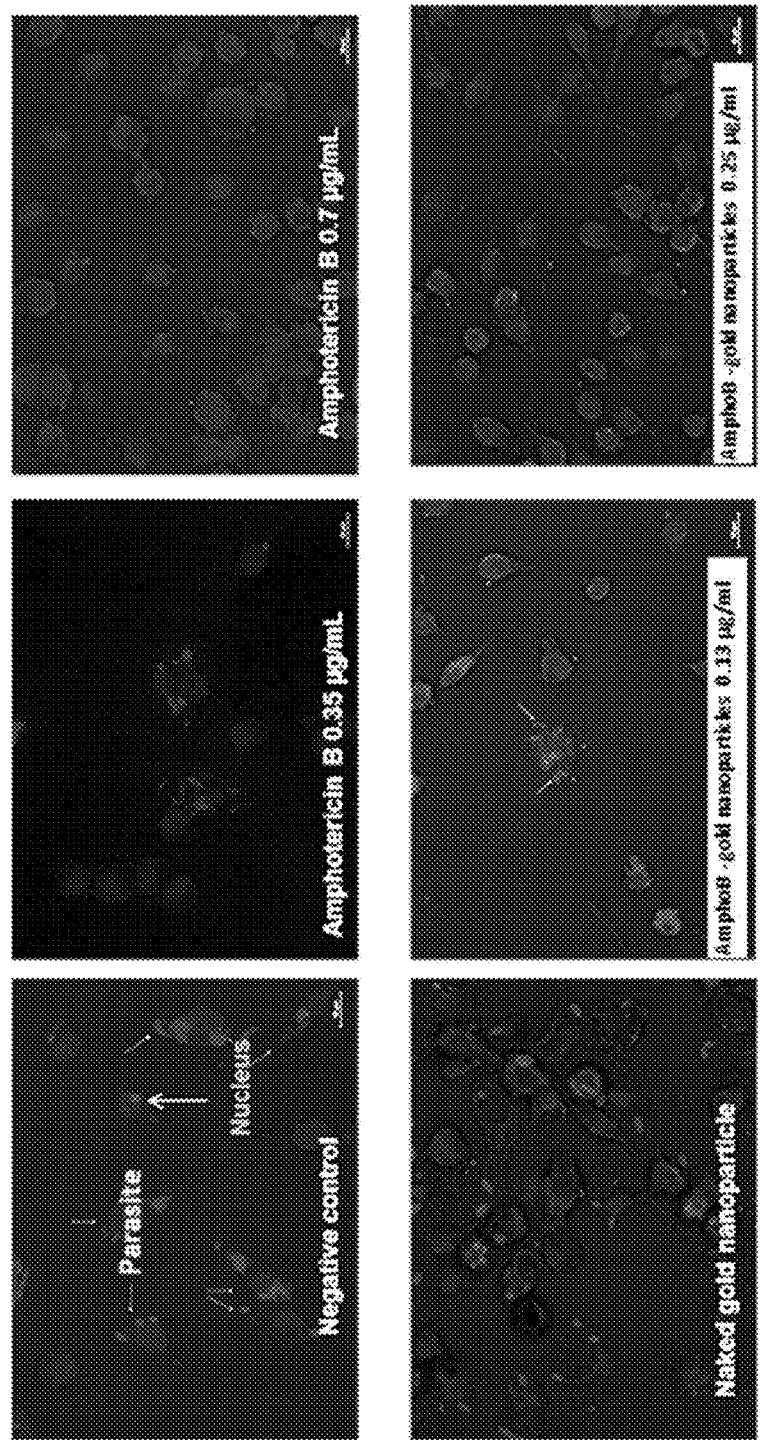
FIG. 13 Activity of amphotericin B and amphotericin B conjugated gold nanoparticles against intracellular *Leishmania mexicana* analysed by fluorescence colocalization microscopy analysis. Macrophage cells are stained with the nuclear dye DAPI, and the infected cells are recognized by the red fluorescence of the DSRed-expressing *Leishmania mexicana*.
Figure 14:
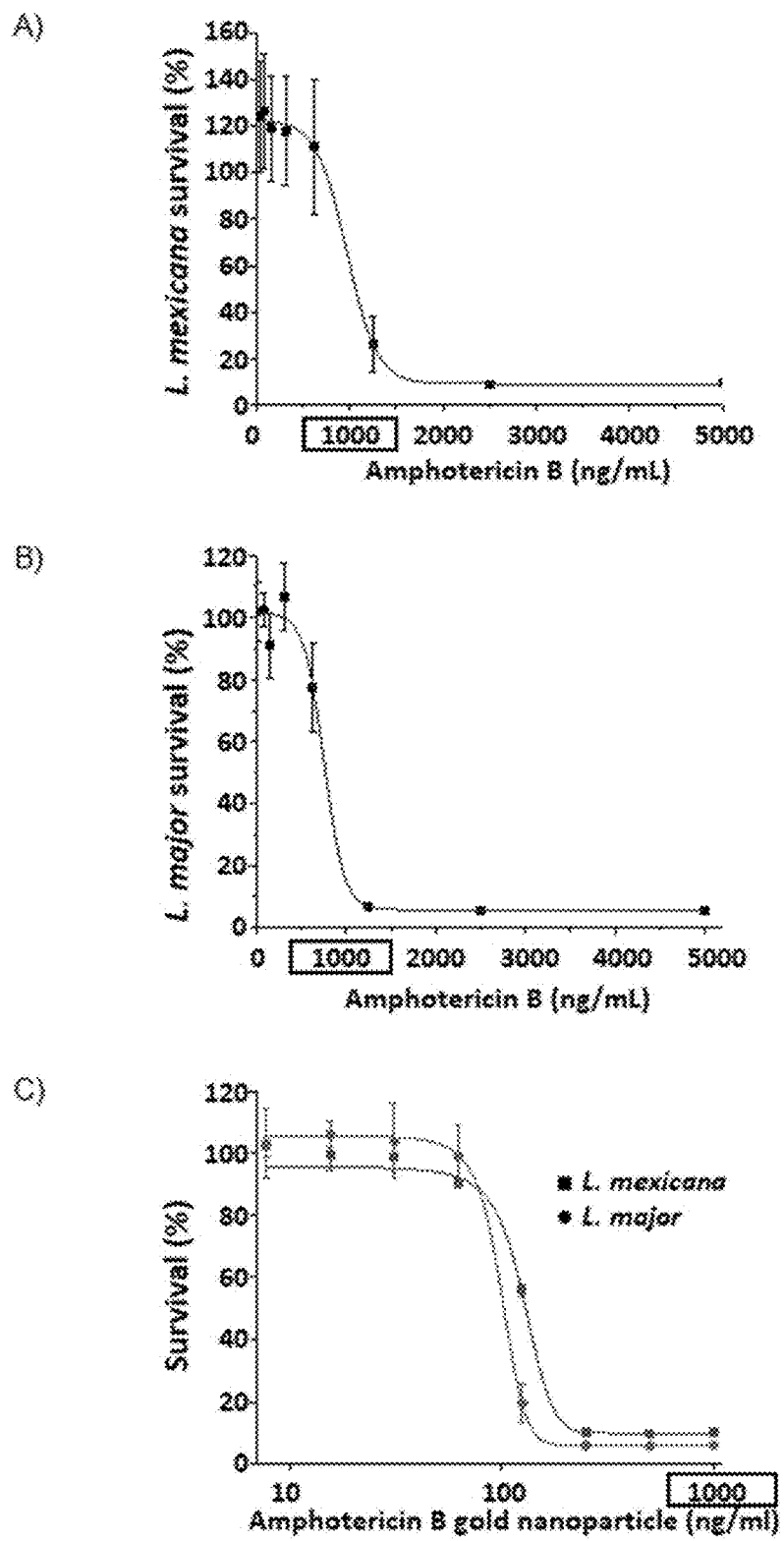
FIG. 14 Activity of amphotericin B and amphotericin B conjugated gold nanoparticles against extracellular *Leishmania mexicana* and *Leishmania major* analysed by Resazurin fluorescence. A) Amphotericin B against extracellular *Leishmania mexicana*, B) Amphotericin B against extracellular *Leishmania major*, C) amphotericin B conjugated gold nanoparticles against extracellular *Leishmania mexicana* and *Leishmania major*.

Growth of extracellular *L. mexicana* and *L. major* in presence and absence of amphotericin B bound to thioglucose stabilized gold nanoparticles or free amphotericin B was monitored for 48 hours to determine the leishmanacidal potency of the preparations. Complete inhibition of cell growth was observed at only 250-500 ng/mL of amphotericin B bound thioglucose stabilized gold nanoparticles against *L. mexicana* and *L. major* while amphotericin B active at higher concentrations of about 1000 ng/mL (FIG. 14). Next, the ability of nanoparticles to kill intracellular parasites was assessed. The intramacrophage activity of the nanoparticles was assessed after infection of macrophages with *Leishmania mexicana*. This genetically modified parasite fluoresces red and can be easily observed under a fluorescence microscope (FIG. 13). Upon staining the macrophage nuclei with DAPI, the intracellular parasites can be easily identified. In the negative control most of the macrophages (grey cells) contain parasites (light grey-white points). Amphotericin B showed some effect at 0.35 µg/mL, while it was completely effective at 0.7 µg/mL as no parasites could be observed in the treated macrophages. Some of the macrophages were still infected by the parasites when treated with amphotericin B bound thioglucose stabilized gold nanoparticles at 0.13 µg/mL while no parasites where found when the cells were treated with 0.25 µg/mL of amphotericin B bound thioglucose stabilized gold nanoparticles. Therefore, the drug was much more active when conjugated to the thioglucose stabilized gold nanoparticles.

Figure 15:
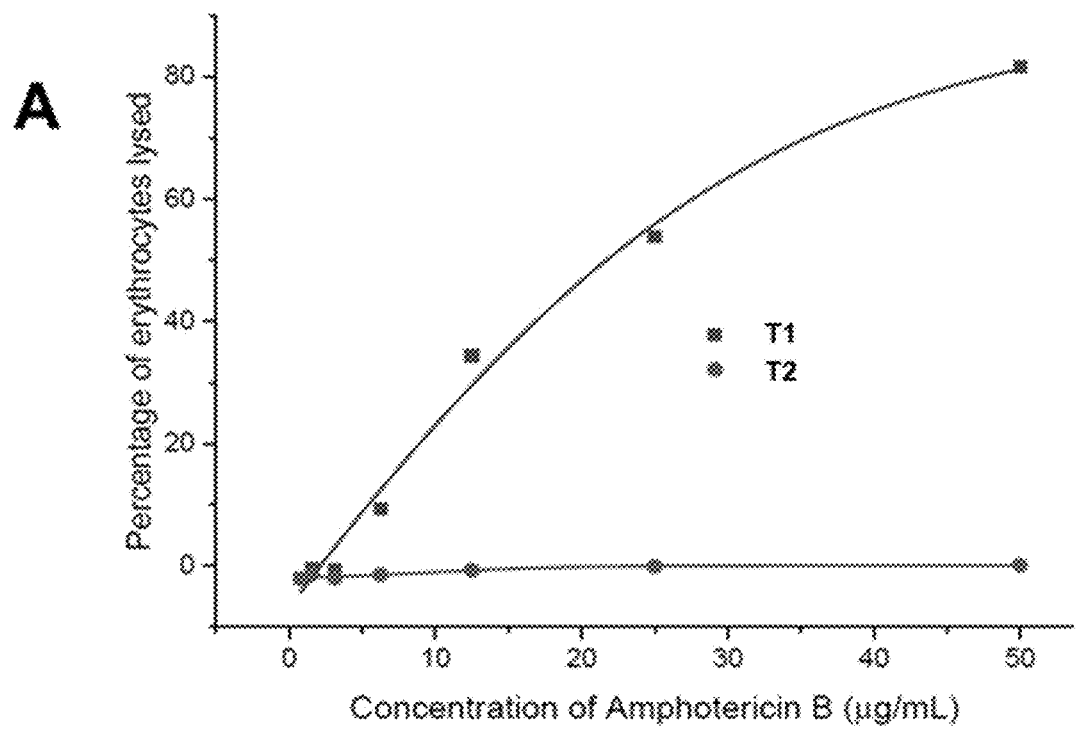
FIG. 15 (A) Haemolysis caused by amphotericin B (curve with squared point, 1) and by amphotericin B conjugated gold nanoparticles (curve with circle point, 2) at different concentrations. Whereas the hemolysis caused by amphotericin B increases proportionally with drug concentration, amphotericin B conjugated gold nanoparticles does not cause haemolysis up to the very high concentration of 64 µg/ml, while amphotericin B showed toxicity even at 12.5 µg/mL. (B) Visual representation of haemolysis: each tube 1-5 contains a blood sample subjected to the different treatments. Tube 1: negative control, not haemolytic; tube 2: amphotericin B conjugated gold nanoparticles added at amphotericin B concentrations of 64 µg/mL does not show substantial hemolysis; tube 3: free amphotericin B added at 12.5 µg/mL caused haemolysis; tube 4: naked gold nanoparticles; tube 5: blood sample treated with triton X as positive control, which causes 100% haemolysis.
Figure 15:
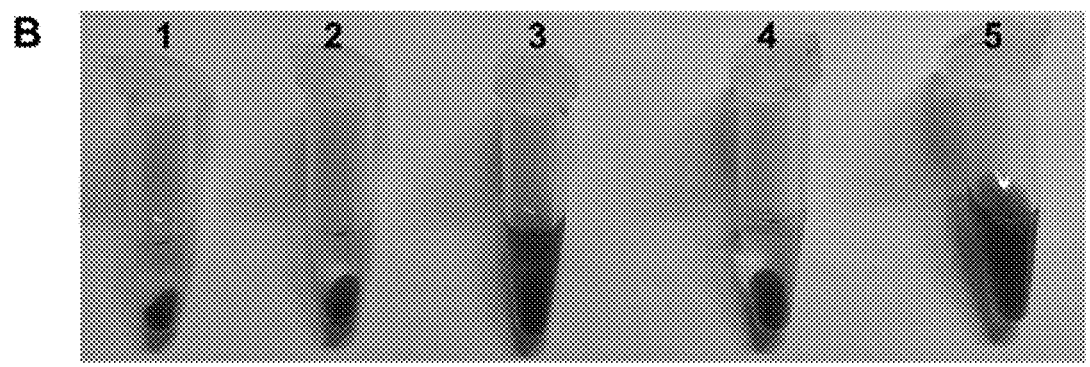

Example 12. Evaluation of Haemolytic Activity of the Amphotericin B Conjugated Gold Nanoparticles Against Human Red Blood Cells Next, the toxicity of the amphotericin B bound thioglucose stabilized gold nanoparticles against human erythrocytes was evaluated. Amphotericin B induced haemolysis at concentrations as low as 7.5 µg/mL, while amphotericin B bound thioglucose stabilized gold nanoparticles did not up to 50 µg/mL (FIG. 15A). As it can be seen in FIG. 15B, amphotericin B bound thioglucose stabilized gold nanoparticles did not induce significant haemolysis up to concentration of 64 µg/mL, while amphotericin B showed toxicity already at 12.5 µg/mL. Therefore, the amphotericin B bound thioglucose stabilized gold nanoparticles showed to be safe for mammals and in particular humans, and not toxic for the erythrocytes differently from the parent drug.

Figure 16:
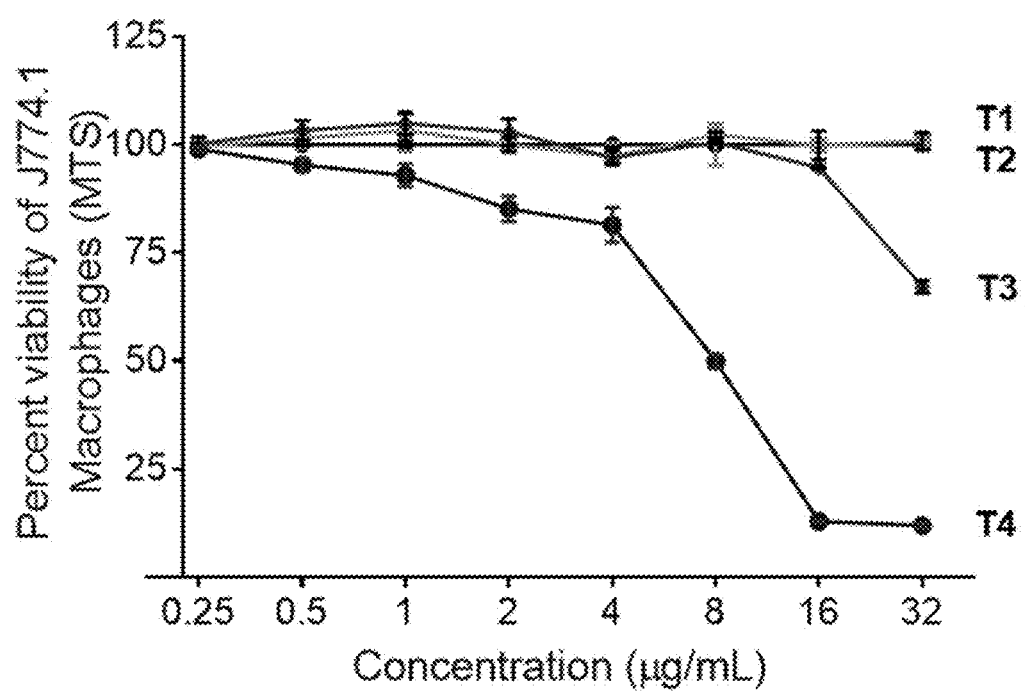
FIG. 16 Toxicity analysis for murine macrophage cells (J774.1) exposed to amphotericin B conjugated gold nanoparticles, free amphotericin B and the naked gold nanoparticles for 24 hours. 1=Control cells treated with DMSO; 2=cells treated with naked gold nanoparticles; 3=cells treated with amphotericin B conjugated gold nanoparticles; 4=cells treated with amphotericin B. Data represent percent viable cells after exposure to the tested treatments at a concentration range from 0.25 to 32 µg/mL using the MTS assay. Dimethyl sulfoxide (DMSO) was used as a negative control. Error bars represent standard deviation values.

Example 13. Evaluation of Toxicity of the Amphotericin B Conjugated Gold Nanoparticles Against Mammalian Cells One of the prominent disadvantages of amphotericin B is its toxicity towards mammalian cells. Hence, the effect of amphotericin nanoparticles on the viability of the J774A.1 murine macrophages, used as hosts for *C. neoformans*, was evaluated. As reported in FIG. 16, amphotericin B starts showing toxicity at concentrations as low as 2 µg/mL. At 8 µg/mL of amphotericin B, only 50% of the macrophages remain viable and at 16 µg/mL almost 80% of the cells are lysed. In comparison, upon treatment with 32 µg/mL of amphotericin B bound thioglucose stabilized gold nanoparticles, more than 70% of the cells are viable. No toxicity is observed till 16 µg/mL of amphotericin B bound thioglucose stabilized gold nanoparticles. This underscores the superiority of the nanoformulation over the naked drug. It has been shown that the toxicity of amphotericin B is related to its aggregation form.

Figure 18:
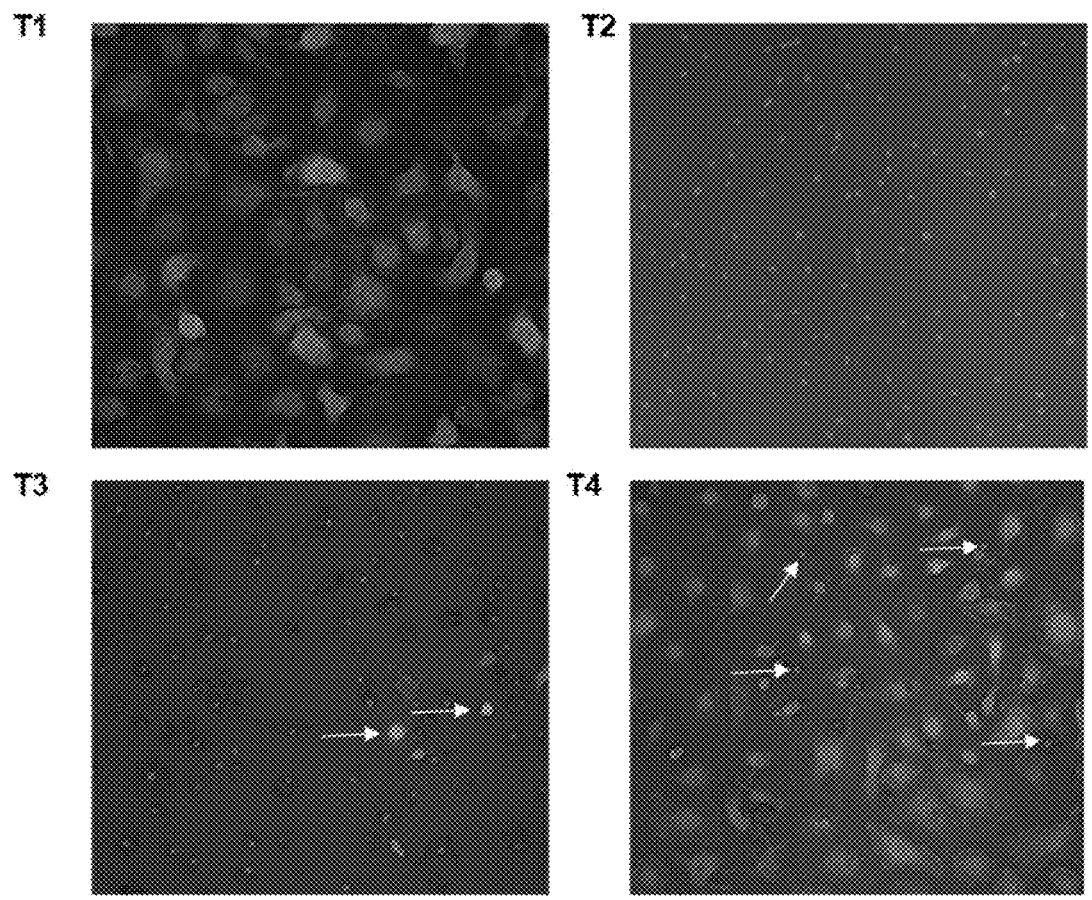
FIG. 18 Live/Dead staining to determine toxicity of amphotericin B conjugated gold nanoparticles against murine macrophages derived from C56BL/6 bone marrow cells. The fluorescence microscopy images show staining of macrophage cells after treatment with Triton X (T2) or without (T1, negative control), 16 µg/mL amphotericin B (T3), and 32 µg/mL amphotericin B conjugated gold nanoparticles (T4). Staining was done with fluorescein diacetate (staining intact vital cells in green) and propidium iodide (staining dead cells in red). Figures show that most of the cells treated with amphotericin B conjugated gold nanoparticles (T4) are green and only four cells (arrow) stain red, whereas most of the cells treated with amphotericin B (T3) are red and only two stain (arrow) green.

Interestingly, the toxicity of the amphotericin B conjugated gold nanoparticles was even lower when measured on primary macrophages derived from bone marrow of C57BL/6 mice, which served as hosts for *L. mexicana*. In this experiment, toxicity was investigated by using a LIVE/DEAD staining with a mixture of fluorescein diacetate (FDA) and propidium iodide (PI). Fluorescein diacetate is a non-fluorescent, cell-permeant dye, which is converted to fluorescein intracellularly by esterases released by viable cells. The resultant green fluorescence is an indicator of cell-viability. In contrast, propidium iodide is non-permeant across cells and stains the nucleus of membrane-compromised cells. As can be seen from FIG. 18, when untreated murine macrophages were stained with the mixture of dyes, only green fluorescence was observed. Upon treatment with Triton X, the cells were compromised allowing propidium iodide to stain them red. Similarly at 16 µg/mL, amphotericin B was toxic to the cells while amphotericin B conjugated gold nanoparticles were not toxic even at 32 µg/mL. Indeed, as shown in FIG. 18, most of the cells treated with amphotericin B conjugated gold nanoparticles were stained green and only four cells (arrow) were stained red, whereas most of the cells treated with amphotericin B were stained red and only two were stained stain (arrow) green. Thus it can be concluded that amphotericin B conjugated gold nanoparticles are not associated toxicity at therapeutically relevant concentrations.

Example 14. Determination of Gold Concentration

The concentration of gold in the prepared samples of amphotericin B conjugated gold nanoparticles was measured with Inductively Coupled Plasma Optical Emission Spectrometer (ICP-OES) (Optima 8000; Perkin Elmer, Massachusetts; USA). To this aim, an external calibration series from 0.1 mg/L to 5 mg/L was prepared using a gold standard solution.

The results were expressed as the ratio between concentration of amphotericin B in the sample and the concentration of gold (Au) in the sample: [concentration of amphotericin B]/[concentration of gold]. The measurement was performed on three different samples independently prepared on three different days. The ratio [concentration of amphotericin B]/[concentration of gold] varied between 1.6 to 3.7 and the average value obtained was of 2.7±1.08.

What is claimed is:

1. Amphotericin B conjugated gold nanoparticles, comprising:
    a gold nanoparticle core having a surface,
    thiohexuronic acid or thiopenturonic acid molecules connected to the surface of the gold nanoparticle core and stabilizing the gold nanoparticle core,
    at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the amphotericin B conjugated gold nanoparticles are produced by reduction of aurochloric acid in presence of thiohexuronic acid or thiopenturonic acid, wherein the amphotericin B conjugated gold nanoparticles are water dispersible, and wherein the amphotericin B conjugated gold nanoparticles have a particle size range comprised between 5 nm-12 nm.

2. The amphotericin B conjugated gold nanoparticles according to claim 1, wherein the thiohexuronic acid molecule is selected from the group consisting of thioalluronic acid, thioaltruronic acid, thioguluronic acid, thiotaluronic acid, thiogalacturonic acid, thioiduronic acid, thioglucuronic acid, and thiomannuronic acid, or wherein the thiopenturonic acid molecule is selected from the group consisting of thioarabinuronic acid, thioxyluronic acid, thiolyxuronic acid, and thioriburonic acid.

3. The amphotericin B conjugated gold nanoparticles according to claim 1, wherein the thiohexuronic acid is thioglucuronic acid.

4. The amphotericin B conjugated gold nanoparticles according to claim 1, wherein the thiohexuronic acid is thiomannuronic acid.

5. A method for the treatment of a fungal infection in a patient, comprising administering to a patient having said fungal infection a therapeutically effective amount of amphotericin B conjugated gold nanoparticles according to claim 1, comprising:

a gold nanoparticle core having a surface, thiohexuronic acid or thiopenturonic acid molecules connected to the surface of the gold nanoparticle core, and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the amphotericin B conjugated gold nanoparticles are water dispersible, wherein the amphotericin B conjugated gold nanoparticles have a particle size range comprised between 5 nm-12 nm, wherein the treatment results in reduction of the fungal infection from the level existing at the time of treatment.

6. The method according to claim 5, wherein the fungal infection is selected from the group consisting of *Aspergillus fumicatus* infection, *Candida albicans* infection, *Candida auris* infection, *Candida glabrata* infection, *Candida krusei* infection, *Candida parapsilosis* infection, *Candida tropicalis* infection, *Cryptococus gatti* infection, *Cryptococcus neoformans* infection.

7. The method according to claim 5, wherein the fungal infection is selected from the group consisting of *Aspergillus fumicatus* infection, *Candida auris* infection, *Candida glabrata* infection, *Candida krusei* infection, *Candida parapsilosis* infection, *Candida tropicalis* infection, *Cryptococus gatti* infection, *Cryptococcus neoformans* infection.

8. A method for the treatment of a *leishmania* infection in a patient, comprising administering to a patient having said *leishmania* infection a therapeutically effective amount of amphotericin B conjugated gold nanoparticles according to claim 1, comprising:

a gold nanoparticle core having a surface, thiohexuronic acid or thiopenturonic acid molecules connected to the surface of the gold nanoparticle core and stabilizing the gold nanoparticle core, at least one amphotericin B molecule, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein the amphotericin B conjugated gold nanoparticles are water dispersible, wherein the amphotericin B conjugated gold nanoparticles have a particle size range comprised between 5 nm-12 nm, wherein the treatment results in reduction of the *leishmania* infection from the level existing at the time of treatment.

9. The method according to claim 8, wherein the *leishmania* infection is selected from the group consisting of *Leishmania tropica* infection, *Leishmania major* infection, *Leishmania aethiopic* infection, *Leishmania infantum* infection, *Leishmania donovani* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

10. The method according to claim 8, wherein the *leishmania* infection is selected from the group consisting of *Leishmania tropica* infection, *Leishmania major* infection, *Leishmania aethiopic* infection, *Leishmania infantum* infection, *Leishmania mexicana* infection, *Leishmania amazonensis* infection, *Leishmania venezuelensis* infection, *Leishmania* (Viannia) *braziliensis* infection, *Leishmania* (Viannia) *guyanensis* infection, *Leishmania* (Viannia) *panamensis* infection, *Leishmania* (Viannia) *peruviana* infection, *Leishmania chagasi* infection.

11. A pharmaceutical composition comprising the amphotericin B conjugated gold nanoparticles according to claim 1, together with at least one pharmaceutically acceptable vehicle, excipient and/or diluent.

12. The pharmaceutical composition according to claim 11, further comprising a second drug.

13. The pharmaceutical composition according to claim 12, wherein the second drug is selected from flucytosine, fluconazole, paromomycin.

14. The amphotericin B conjugated gold nanoparticles according to claim 1, wherein the amphotericin B conjugated gold nanoparticles have a Zeta potential ranging from −25 to −35 mV.

15. A process for producing amphotericin B conjugated gold nanoparticles as defined in claim 1, comprising the steps:

a) mixing an aqueous solution of aurochloric acid with a thiohexose or a thiopentose, to form a gold nanoparticle core having a surface, and thiohexuronic or thiopenturonic acid molecules connected to said surface, b) mixing the thiohexuronic or thiopenturonic acid coated gold nanoparticles with (1-ethyl-3-(3-dimethylaminopropyl) carbodiimide)/sulpho-N-hydroxysuccinamide, and sonicating the mixture, c) adding a solution of amphotericin B and sonicating the obtained mixture, d) obtaining the amphotericin B conjugated gold nanoparticles, wherein one amphotericin B molecule is covalently bound to one of the thiohexuronic acid or thiopenturonic acid molecules via covalent linkage of the amino group of the amphotericin B molecule and the carboxylic acid group of the thiohexuronic acid or thiopenturonic acid molecule, wherein step a) comprises reducing aurochloric acid in presence of thiohexuronic acid or thiopenturonic acid.

* * * * *